(12) United States Patent
Stavchansky

(10) Patent No.: US 10,891,984 B2
(45) Date of Patent: *Jan. 12, 2021

(54) SYSTEM AND METHOD FOR AUTOMATING THE CONFIGURATION AND SEQUENCING OF TEMPORAL ELEMENTS WITHIN A DIGITAL VIDEO COMPOSITION

(71) Applicant: Dataclay, LLC, Austin, TX (US)

(72) Inventor: Arie L. Stavchansky, Austin, TX (US)

(73) Assignee: DATACLAY, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,571

(22) Filed: Sep. 25, 2019

(65) Prior Publication Data
US 2020/0020359 A1 Jan. 16, 2020

Related U.S. Application Data

(63) Continuation of application No. 15/689,752, filed on Aug. 29, 2017, now Pat. No. 10,515,665.

(60) Provisional application No. 62/381,882, filed on Aug. 31, 2016.

(51) Int. Cl.
*G11B 27/036* (2006.01)
*G11B 27/00* (2006.01)
*G11B 27/34* (2006.01)

(52) U.S. Cl.
CPC .......... *G11B 27/036* (2013.01); *G11B 27/002* (2013.01); *G11B 27/005* (2013.01); *G11B 27/34* (2013.01)

(58) Field of Classification Search
CPC ........................... G11B 27/036; G11B 27/002
See application file for complete search history.

(56) References Cited

U.S. PATENT DOCUMENTS

| | | | |
|---|---|---|---|
| 5,872,564 A | 2/1999 | Snibbe et al. |
| 5,917,549 A | 6/1999 | Simons et al. |
| 5,919,249 A | 7/1999 | Herbstman et al. |
| 5,929,867 A | 7/1999 | Herbstman et al. |
| 6,084,597 A | 7/2000 | Herbstman et al. |
| 6,115,051 A | 9/2000 | Simons et al. |
| 6,683,613 B1 | 1/2004 | Herbstman et al. |
| 6,809,745 B1 | 10/2004 | O'Donnell et al. |
| 7,102,652 B2 | 9/2006 | O'Donnell et al. |
| 7,103,839 B1 | 9/2006 | Natkin et al. |

(Continued)

OTHER PUBLICATIONS

Xerox XMPie®, retrieved from <<https://www.xerox.com/digital-printing/workflow/printing-software/xmpie/enus.html>>, 4 pages, Copyright 2017.

(Continued)

*Primary Examiner* — Girumsew Wendmagegn
(74) *Attorney, Agent, or Firm* — Sprinkle IP Law Group

(57) ABSTRACT

Systems and methods for digital compositing platforms that utilize time-sculpting rules with respect to one or more layers of a composition are disclosed. Such time-sculpting rules may enable layers of a composition to be temporally linked or modified in a content agnostic manner. In this way, content can easily be manipulated, substituted, altered, etc. and the composition automatically modified based on the set of time-sculpting rules to ensure that the resulting composition is coherent and cogent, despite the alterations to the layers or the source of content thereof.

21 Claims, 85 Drawing Sheets

(56) References Cited

U.S. PATENT DOCUMENTS

| | | |
|---|---|---|
| 7,446,781 B2 | 11/2008 | O'Donnell et al. |
| 8,290,253 B1 | 10/2012 | Wang et al. |
| 8,358,691 B1 | 1/2013 | Wang et al. |
| 8,520,975 B2 | 8/2013 | Wang et al. |
| 8,532,421 B2 | 9/2013 | Wang et al. |
| 8,666,226 B1 | 3/2014 | Kalish et al. |
| 8,731,329 B2 | 5/2014 | Simons et al. |
| 8,792,718 B2 | 7/2014 | Bai et al. |
| 8,831,348 B2 | 9/2014 | Wilk et al. |
| 8,897,562 B2 | 11/2014 | Bai et al. |
| 8,971,584 B2 | 3/2015 | Wang et al. |
| 9,208,577 B2 | 12/2015 | Acquavelta et al. |
| 9,299,160 B2 | 3/2016 | Acquavella et al. |
| 9,697,229 B2 | 7/2017 | Masinter et al. |
| 10,515,665 B1 * | 12/2019 | Stavchansky .......... G11B 27/34 |
| 2014/0255009 A1 | 9/2014 | Svendsen et al. |

OTHER PUBLICATIONS

CompsFromSpreadsheets, retrieved from <<http://aescripts.com/compsfromspreadsheet/>>, 4 pages, Copyright 2017.

Open Sesame, retrieved from <<http://aescripts.com/pt_opensesame/>>, 3 pages, Copyright 2017.

Office Action issued for U.S. Appl. No. 15/689,752, dated Oct. 30, 2018, 6 pages.

Office Action issued for U.S. Appl. No. 15/689,752, dated May 15, 2019, 6 pages.

Notice of Allowance issued for U.S. Appl. No. 15/689,752, dated Aug. 16, 2019, 16 pages.

* cited by examiner

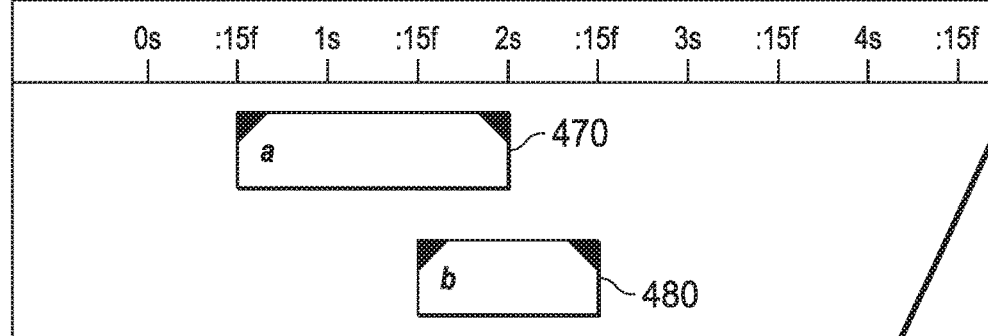
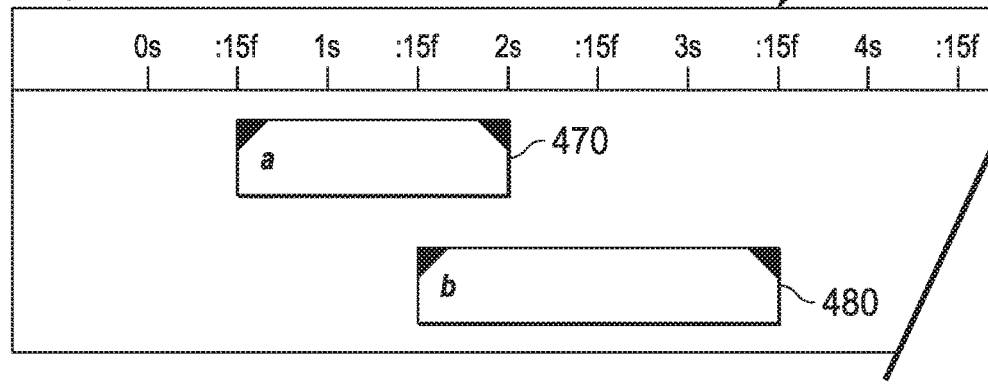
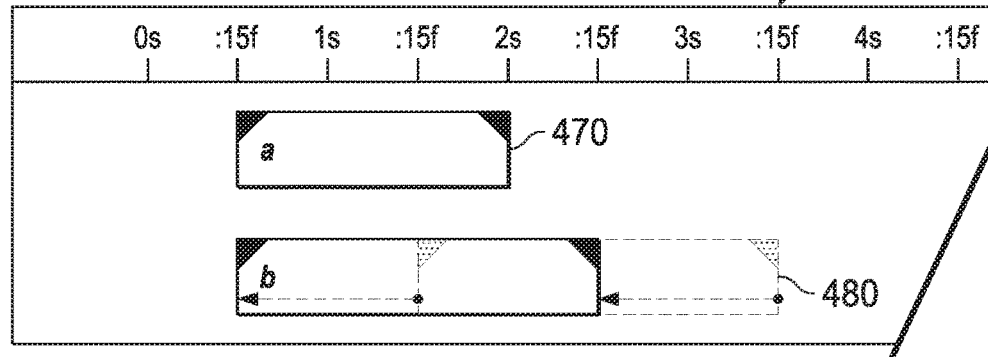
FIG. 4B

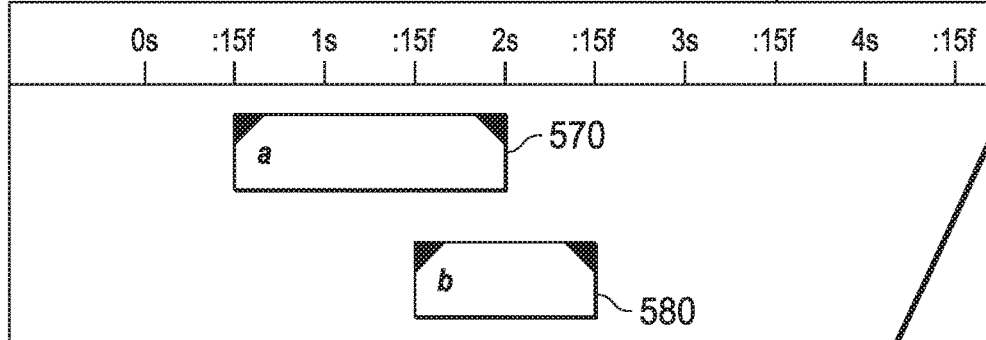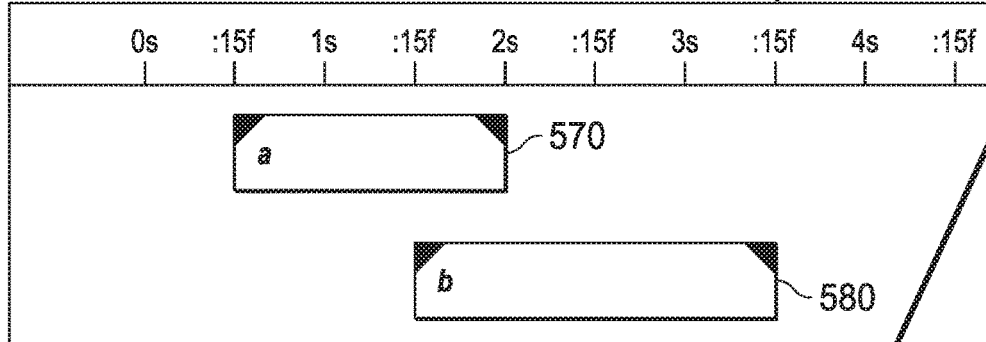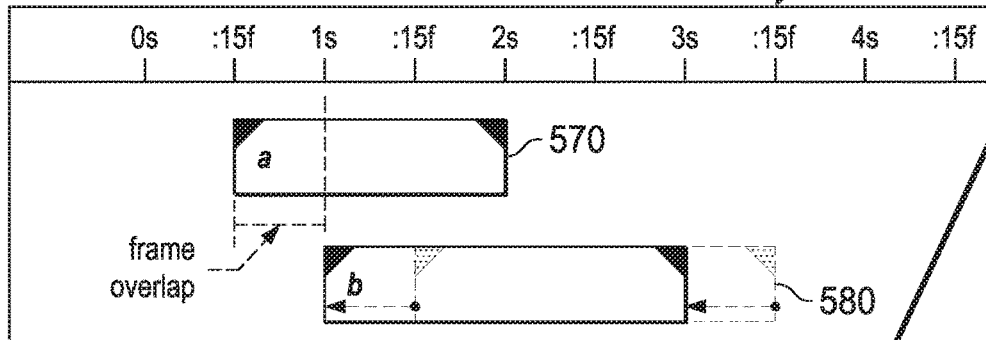
FIG. 5B

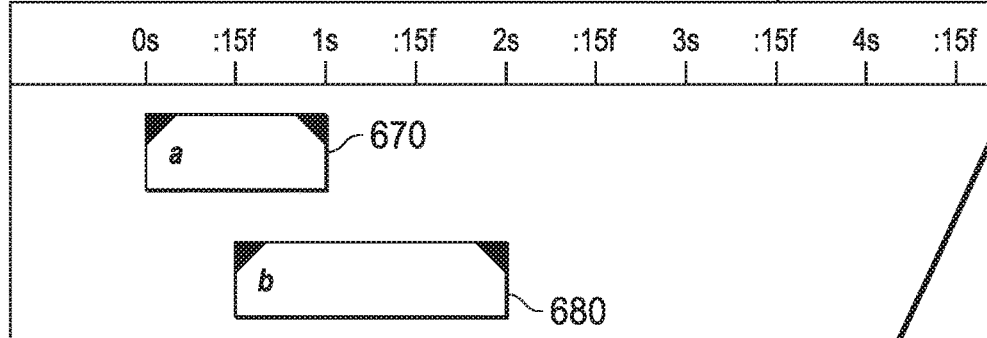
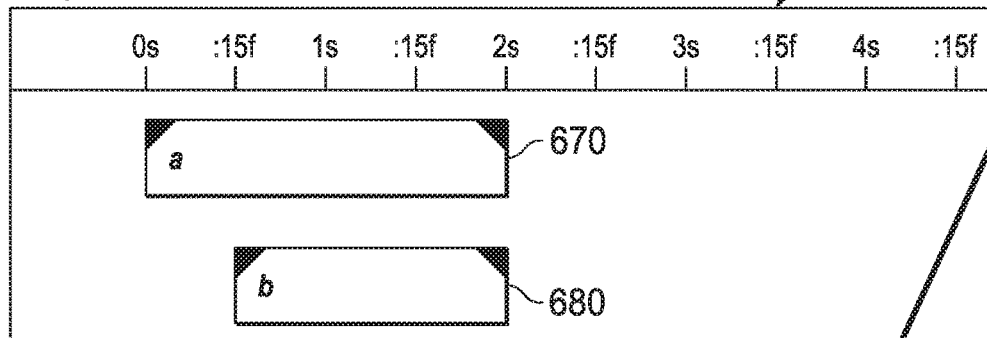
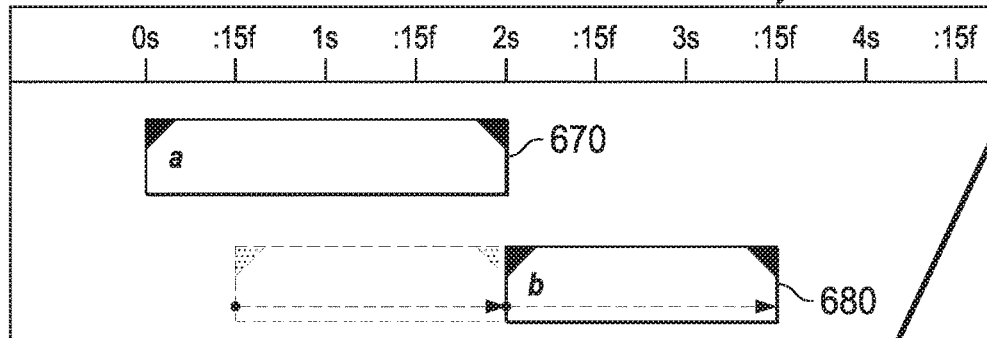
FIG. 6B

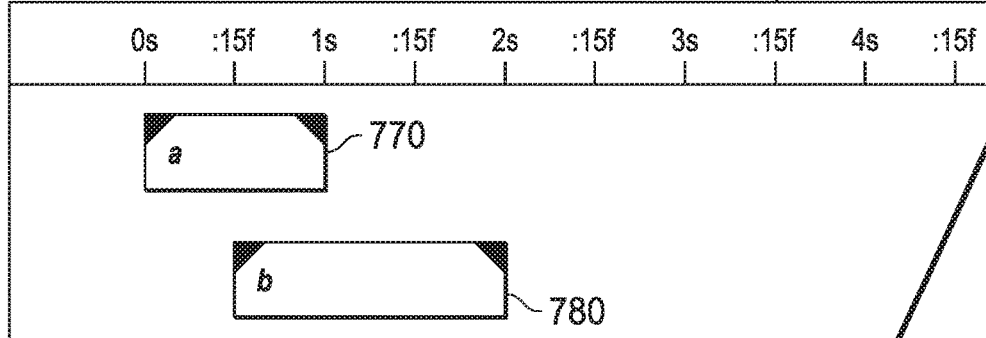
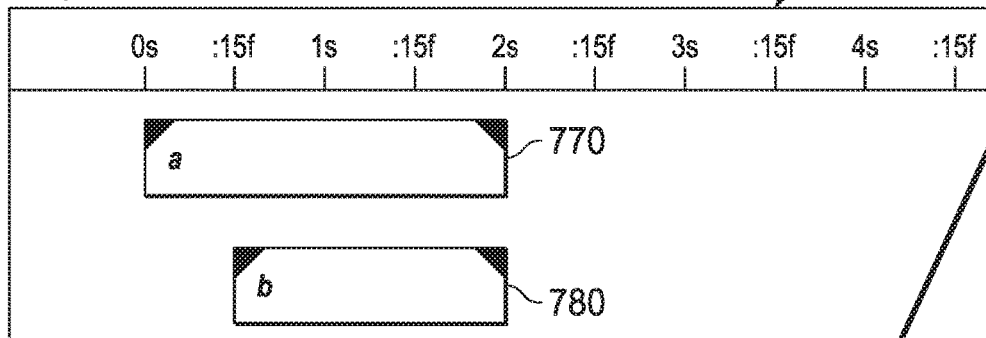
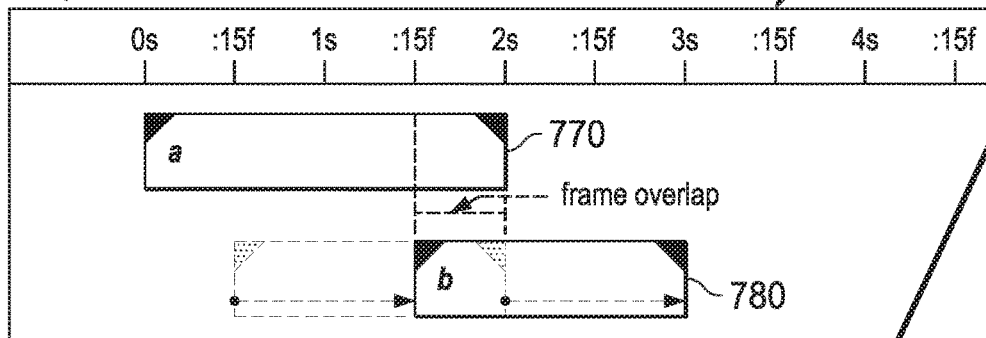
FIG. 7B

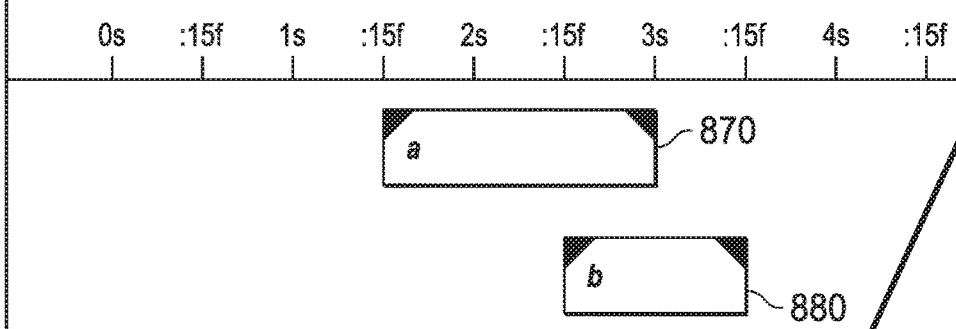
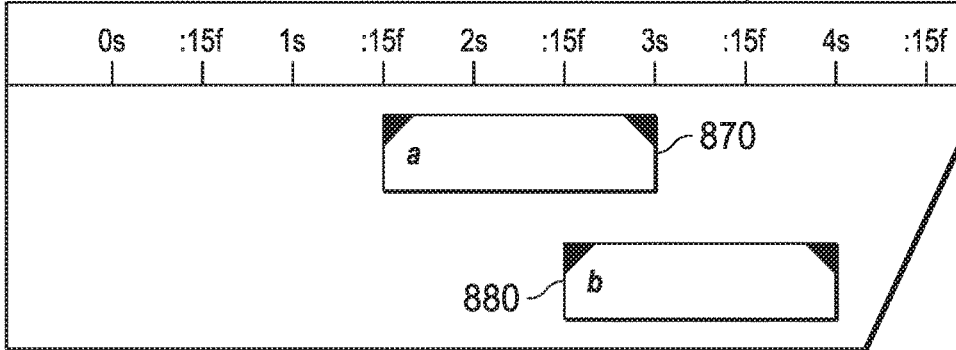
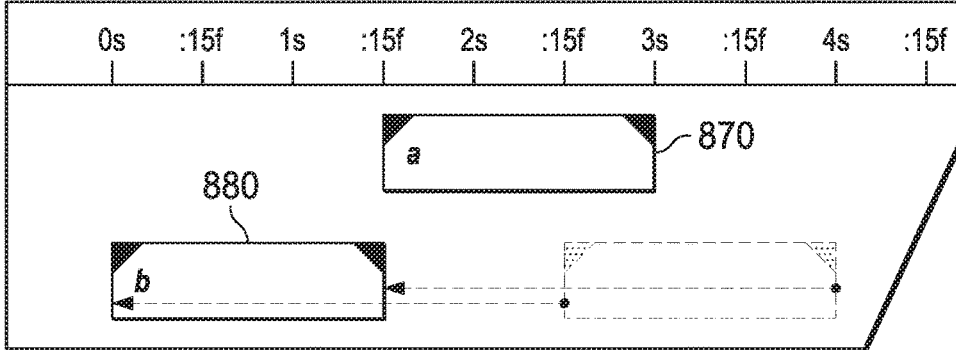
FIG. 8B

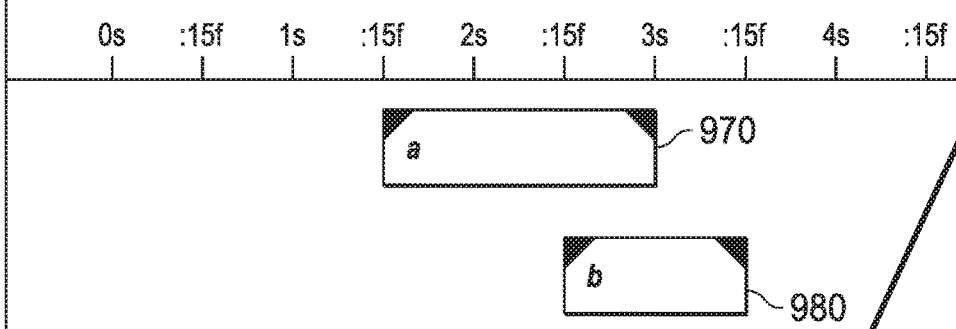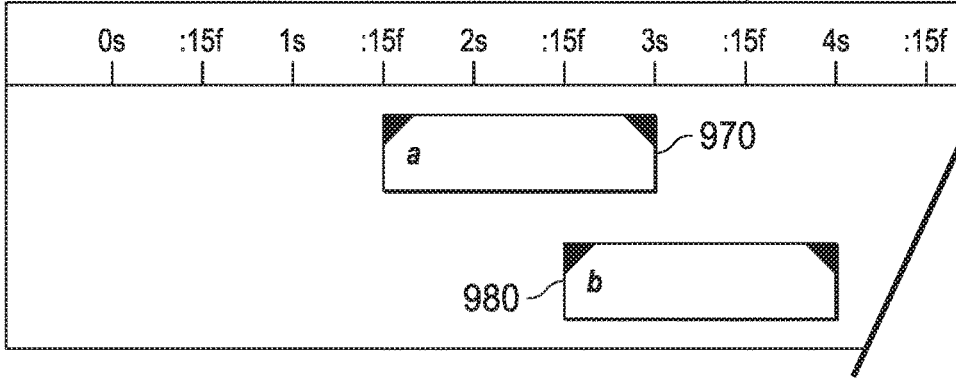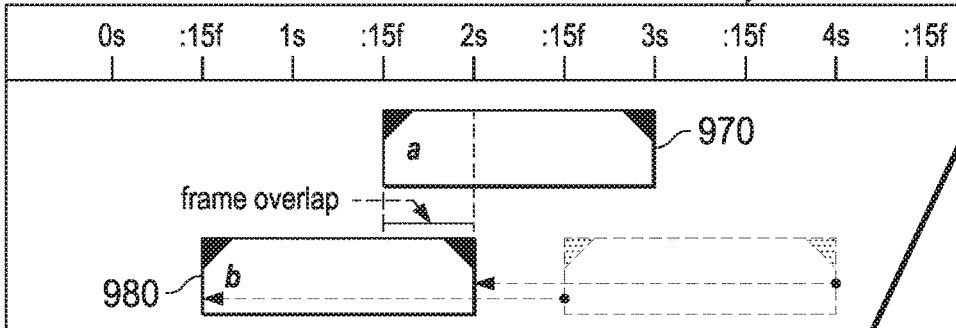
FIG. 9B

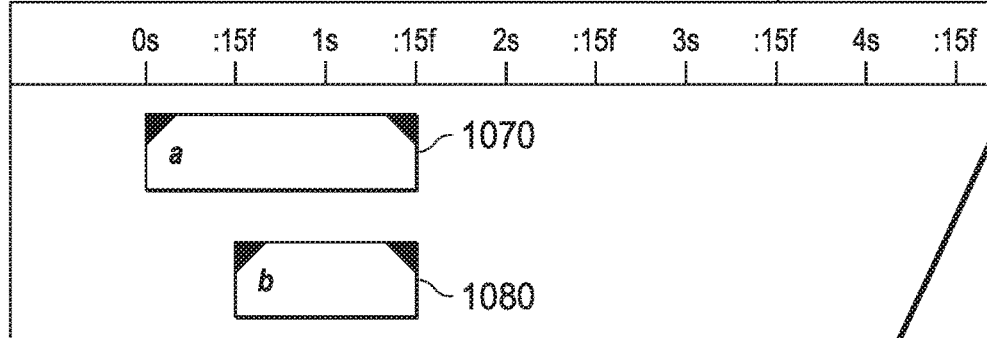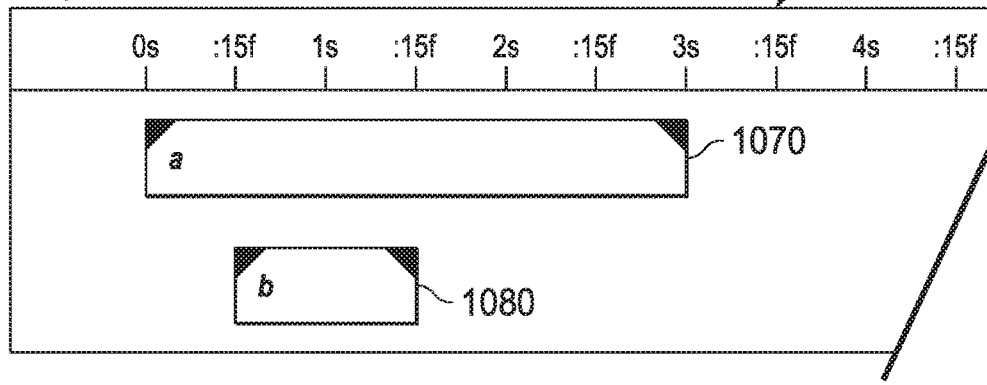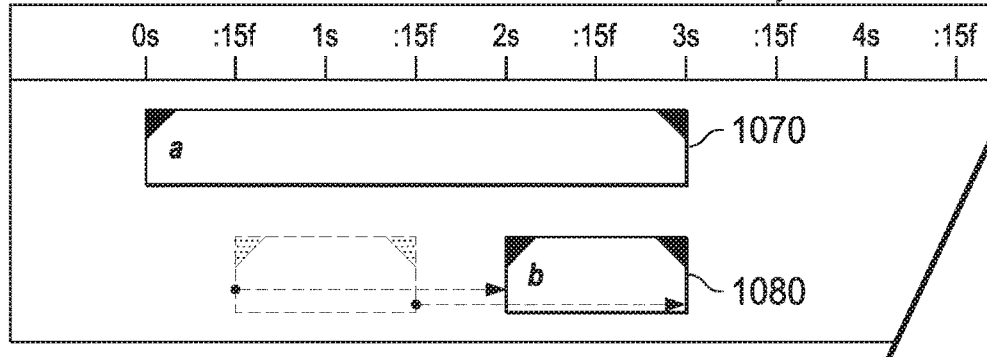
FIG. 10B

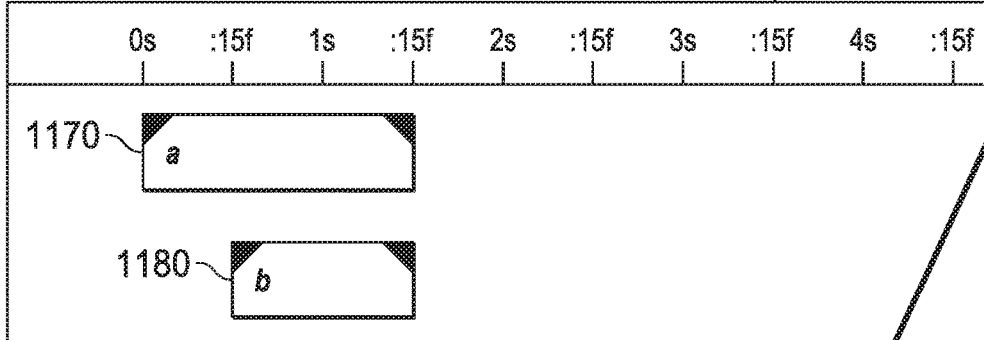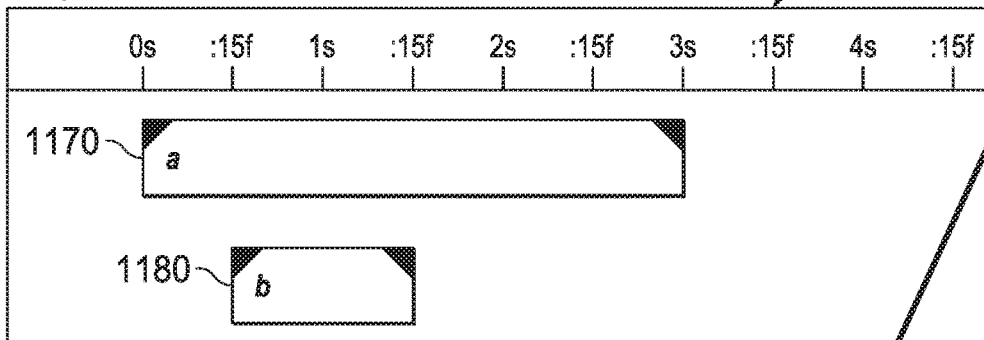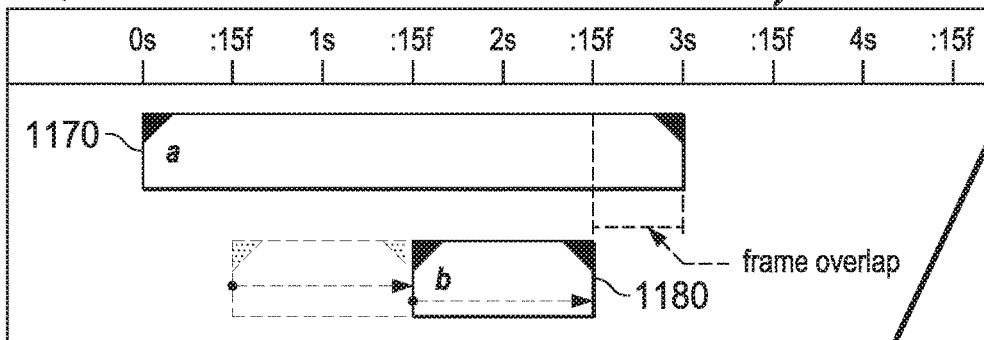
FIG. 11B

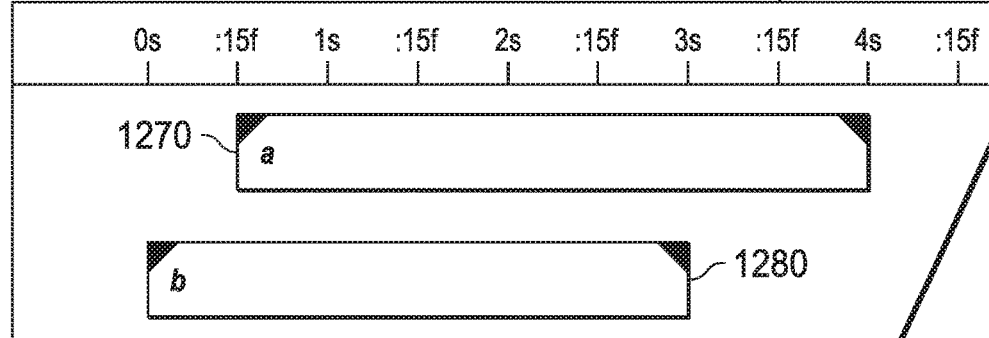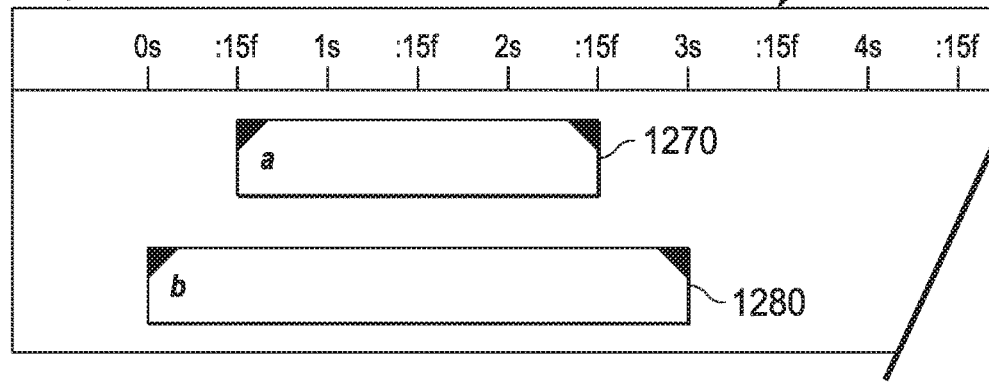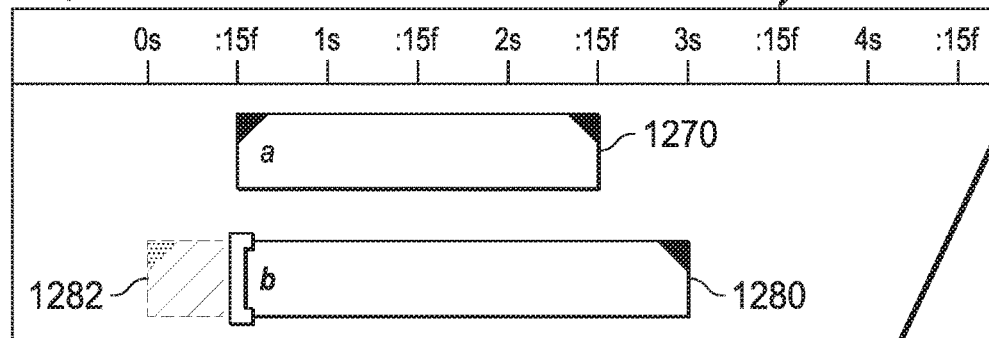
FIG. 12B

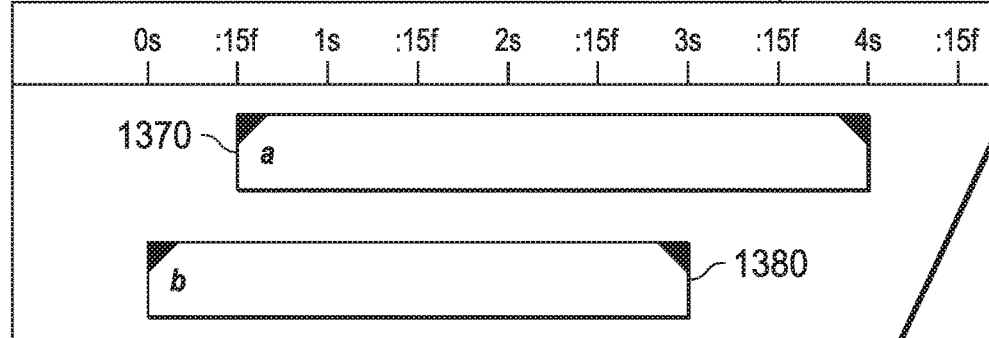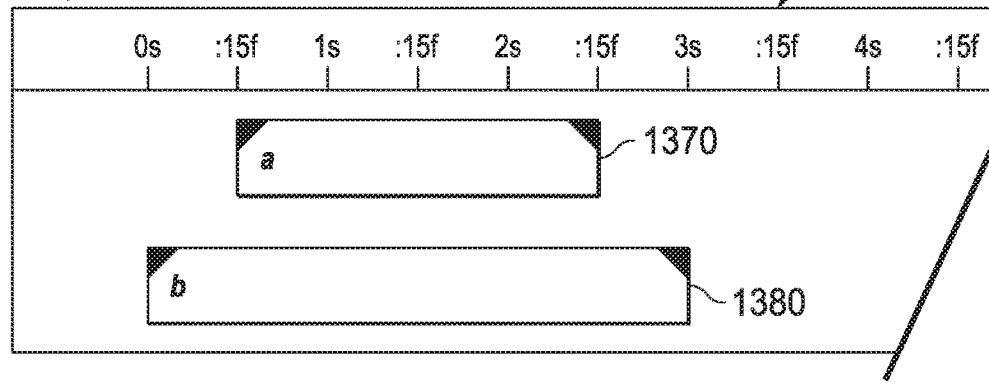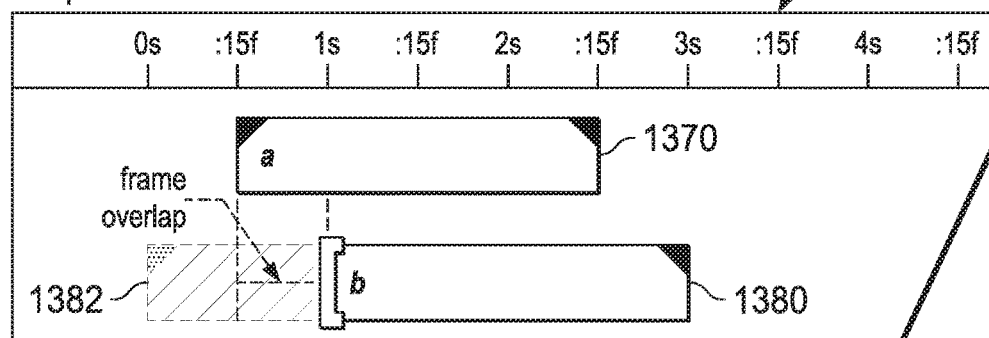
FIG. 13B

In-point trims to Out-point

Comp State 0 — 1460a 1470 a
1480 b

Layer *a* composited atop layer *b* . . .

Comp State 1 — 1460b 1470 a
1480 b

. . . then source of *a* changes . . .

Comp State 2 — 1460c 1470 a
1482 / 1480 b

. . . then In-point of *b* trims to match Out-point of *a*

FIG. 14B

In-point trims to Out-point with Overlap

Comp State 0 — 1560a (timeline 0s to 4s:15f)

1570 a 1580 b

Layer *a* composited atop layer *b* . . .

Comp State 1 — 1560b 1570 a 1580 b

. . . then source of *a* changes . . .

Comp State 2 — 1560c 1570 a frame overlap 1582 (hatched) b 1580

. . . then In-point of *b* trims to match Out-point of *a* with frame overlap

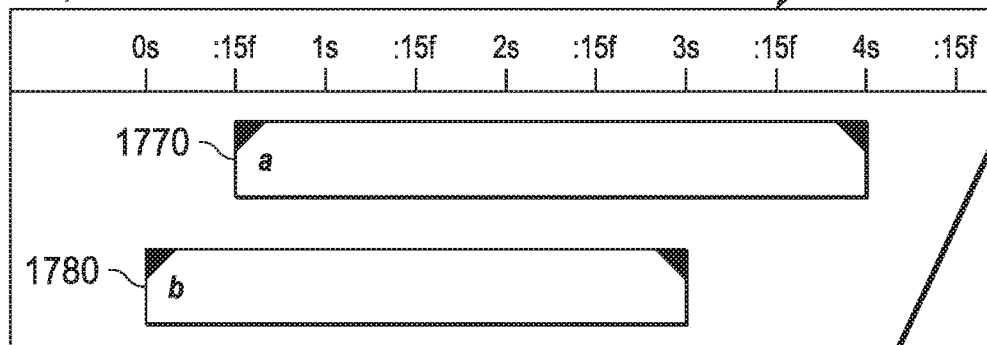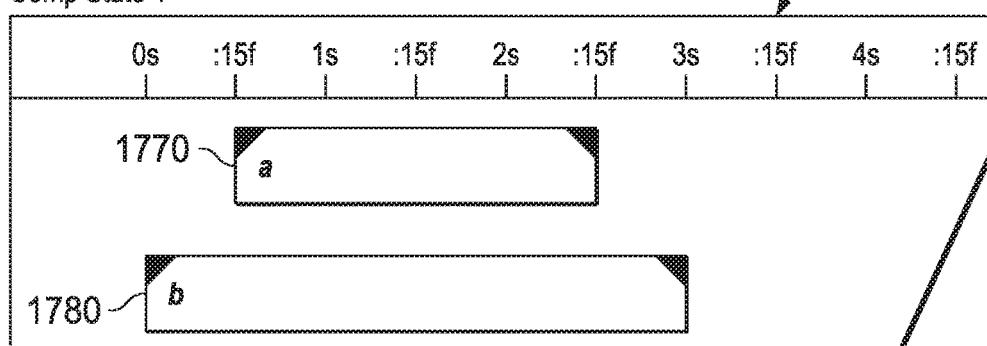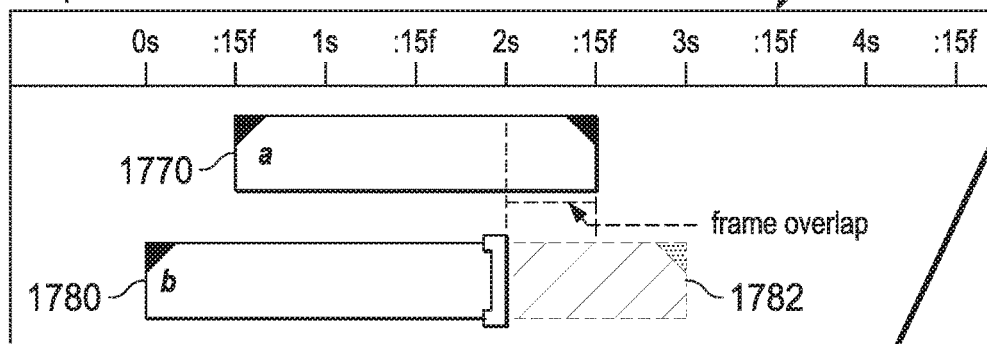
FIG. 17B

Out-point trims to In-point

Comp State 0 — 1860a

1870 — a
1880 — b

Layer *a* composited atop layer *b* . . .

Comp State 1 — 1860b

1870 — a
1880 — b

. . . then source of *a* changes . . .

Comp State 2 — 1860c

1870 — a
1880 — b , 1882

. . . then Out-point of *b* trims to match In-point of *a*

FIG. 18B

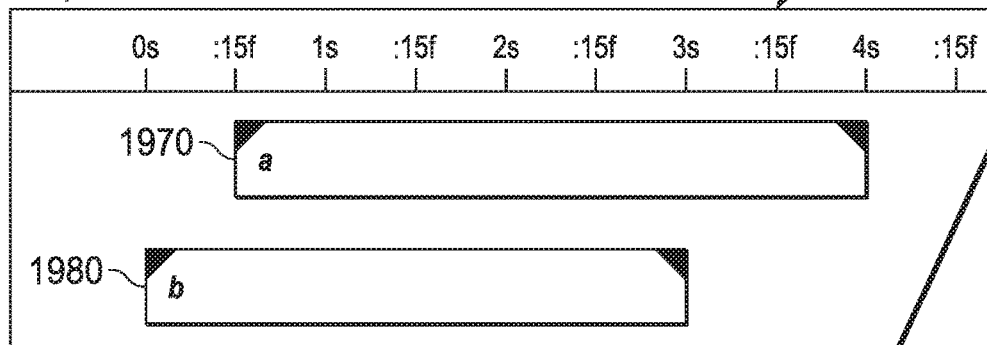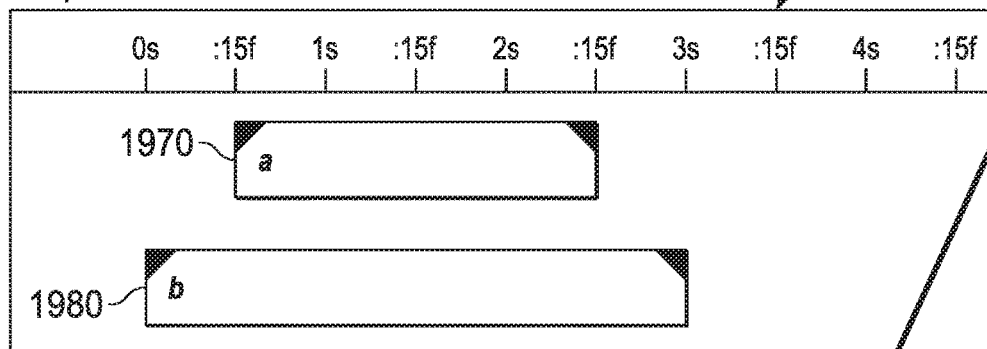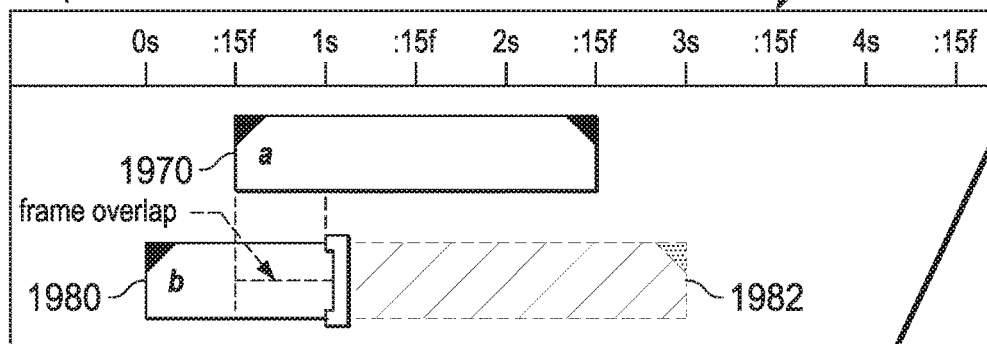
FIG. 19B

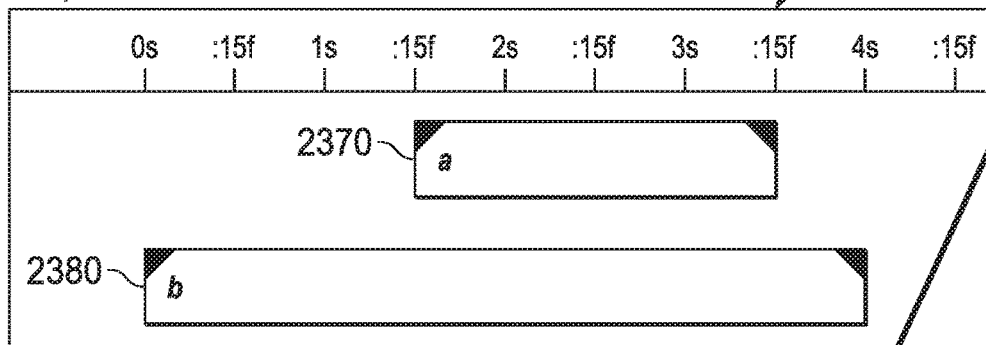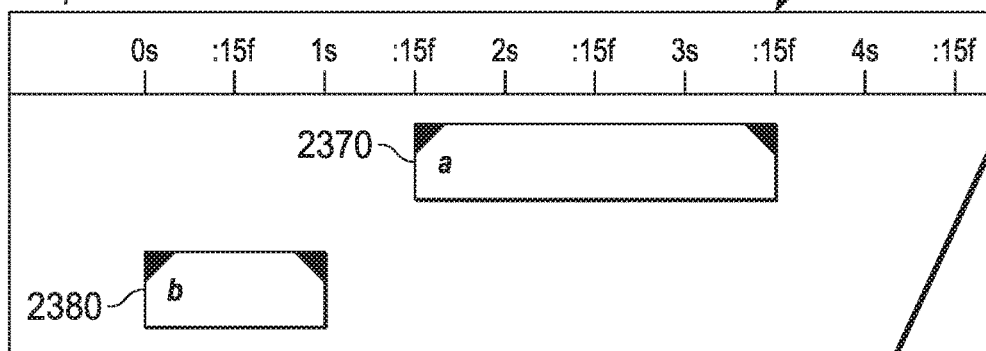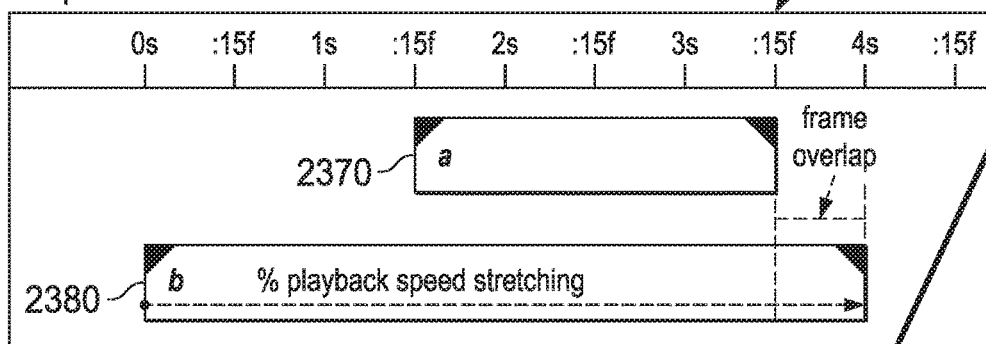
FIG. 23B

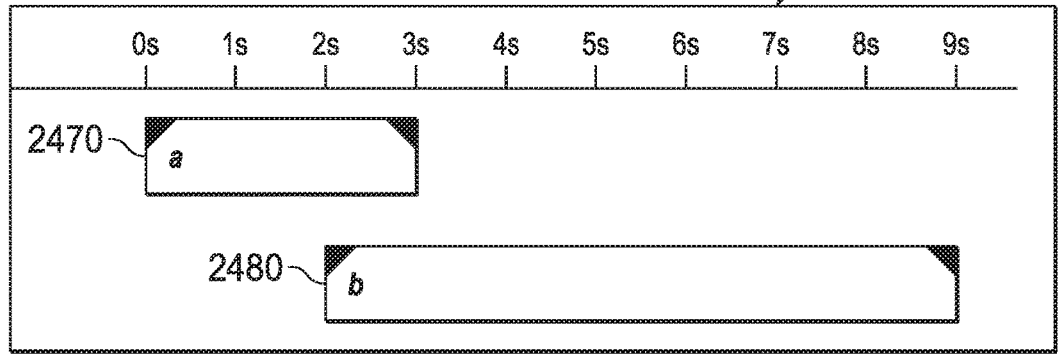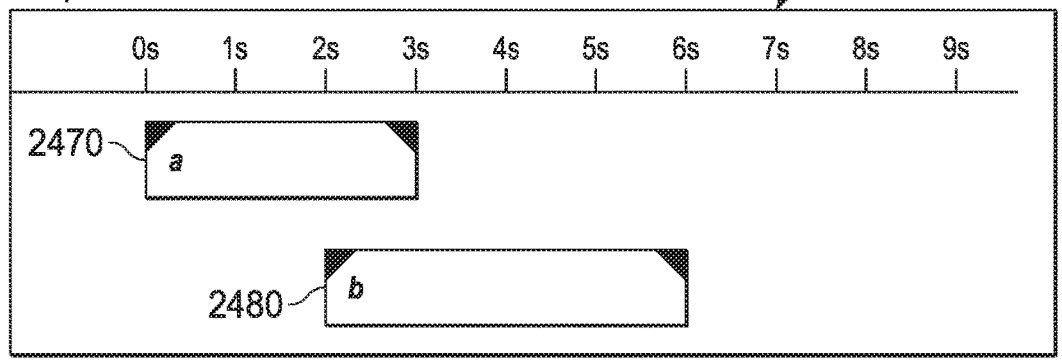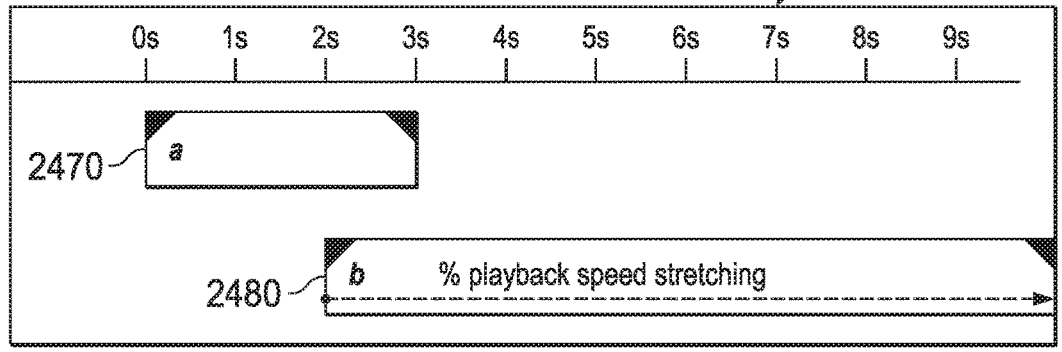
FIG. 24B

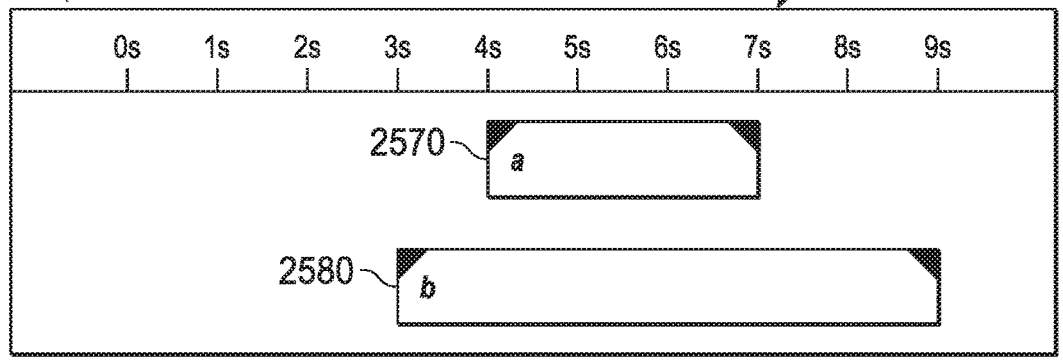
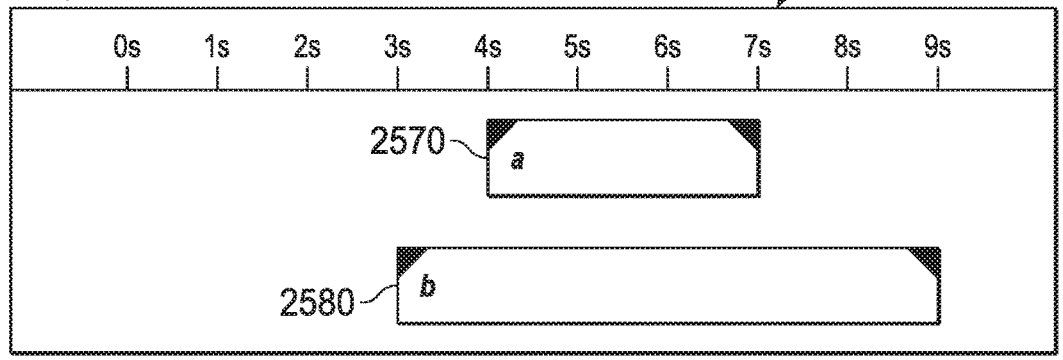
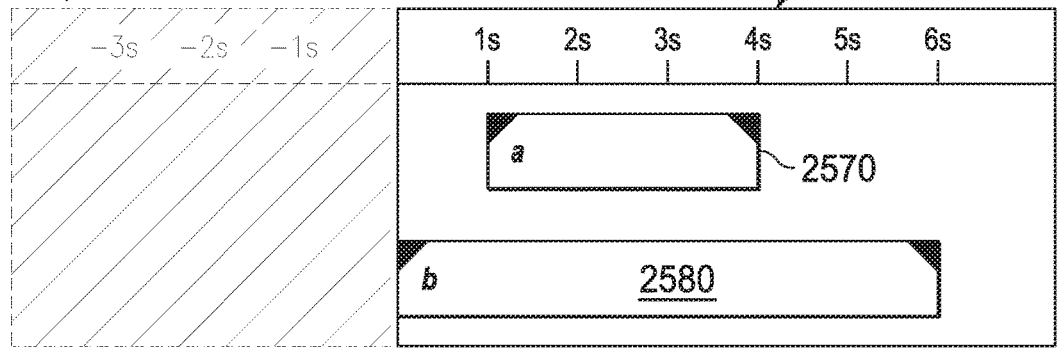
FIG. 25B

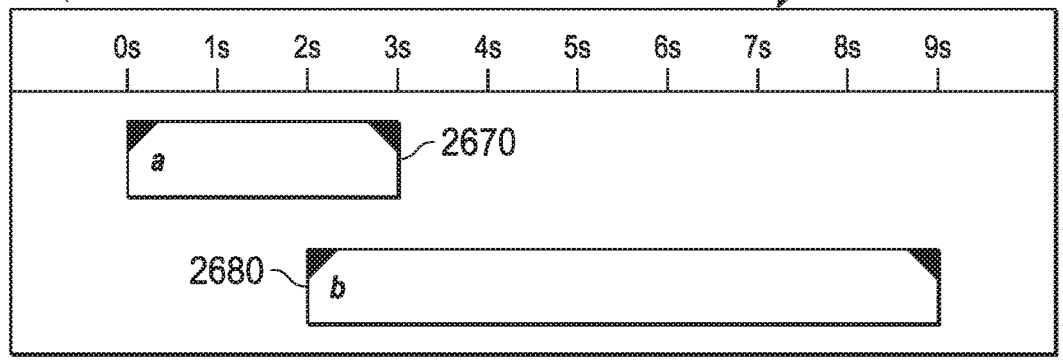
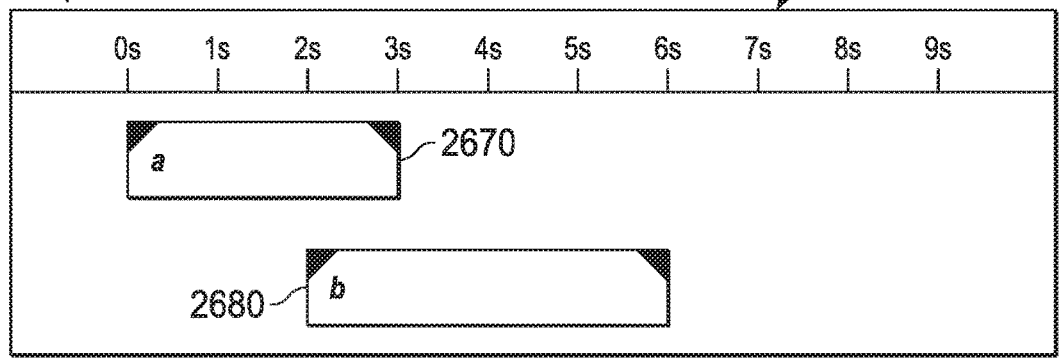
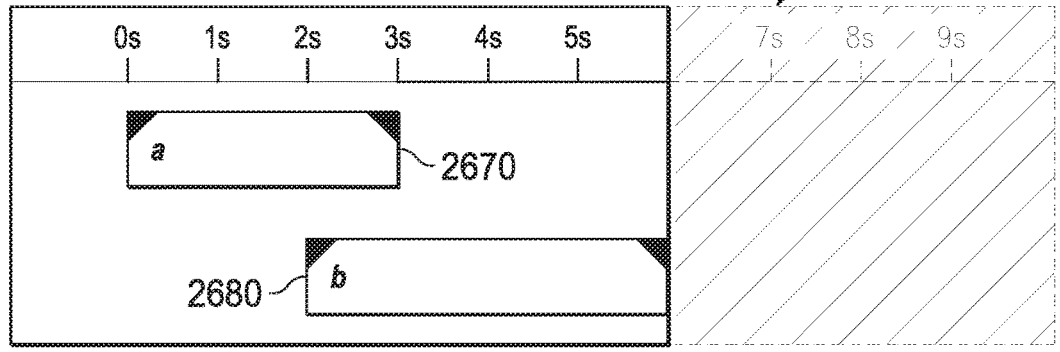
FIG. 26B

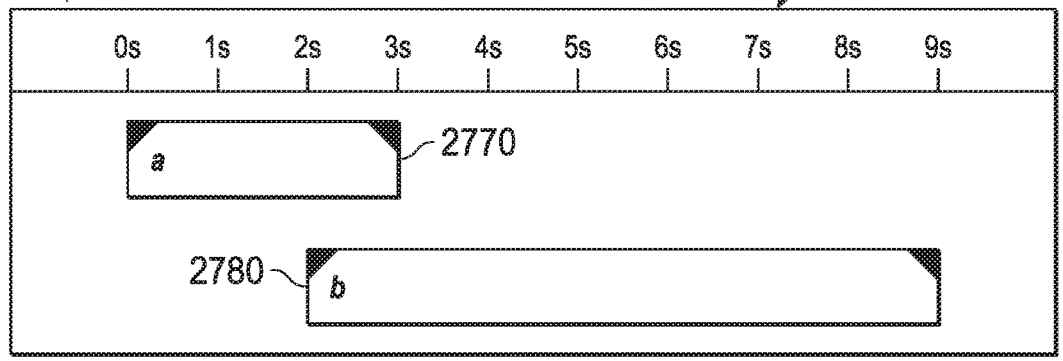
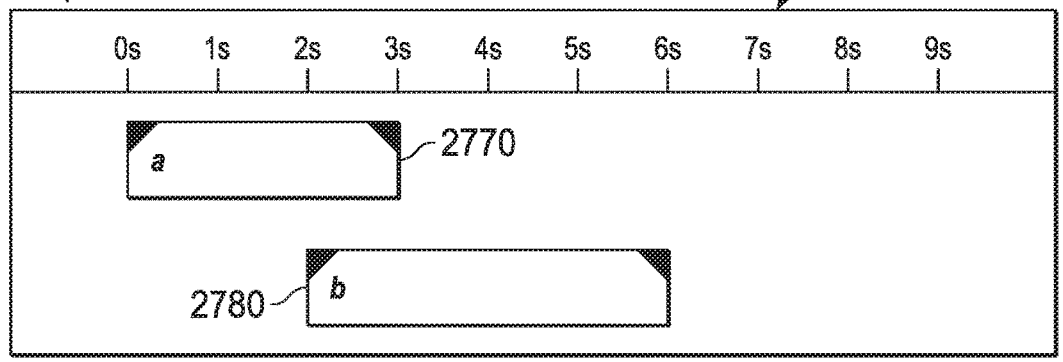
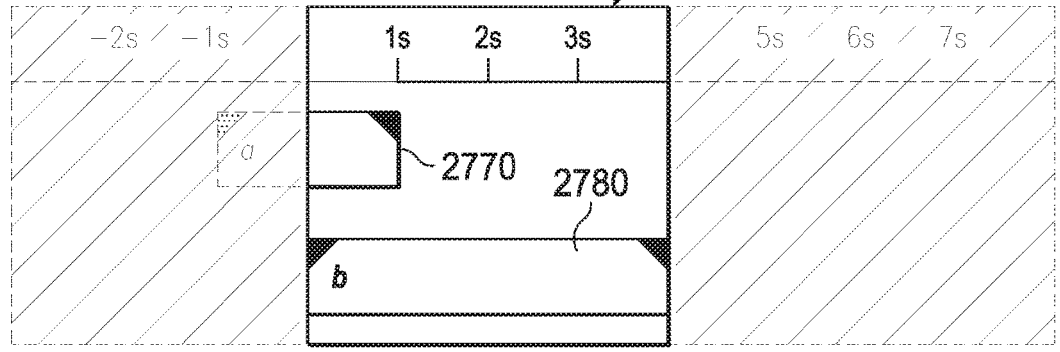
FIG. 27B

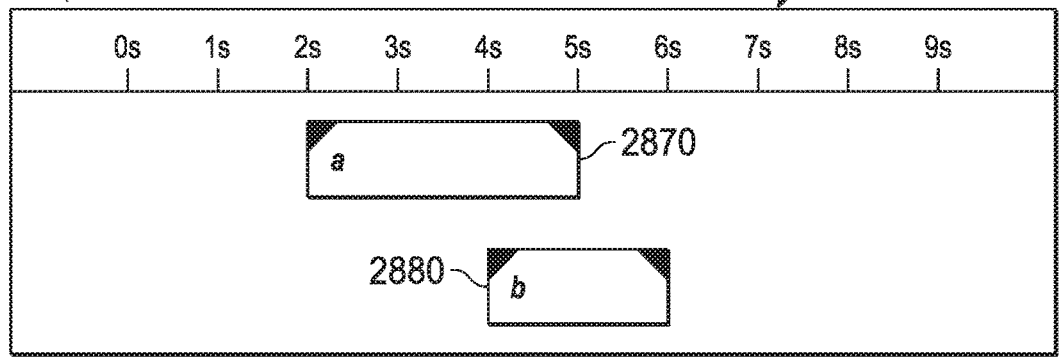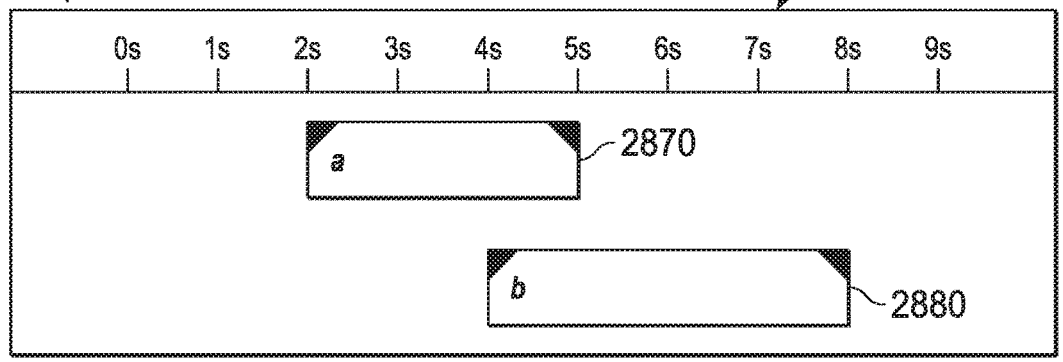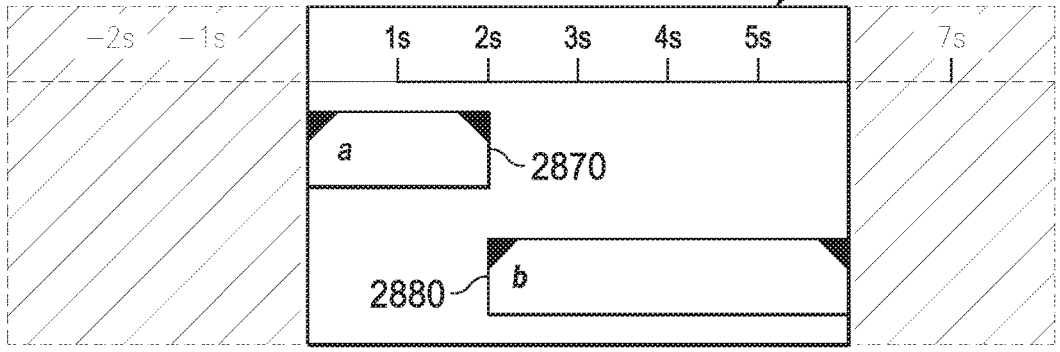
FIG. 28C

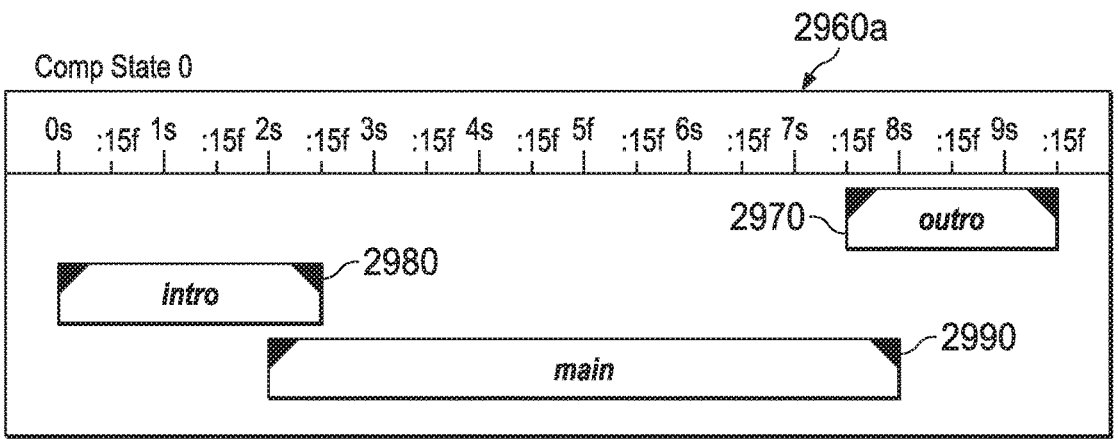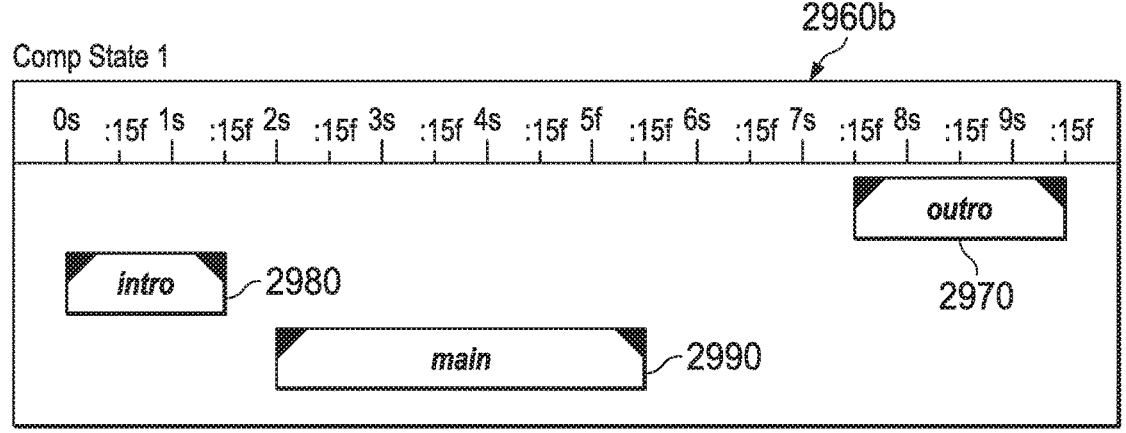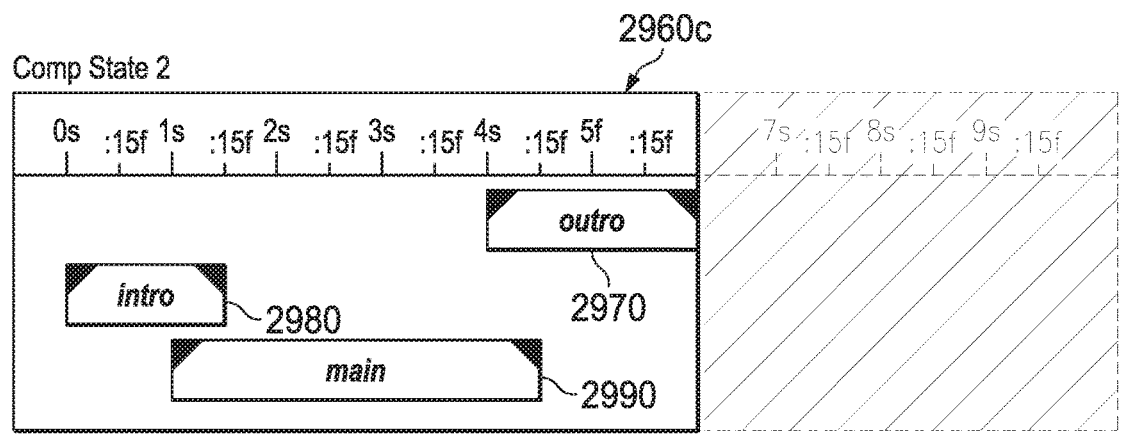
FIG. 29C

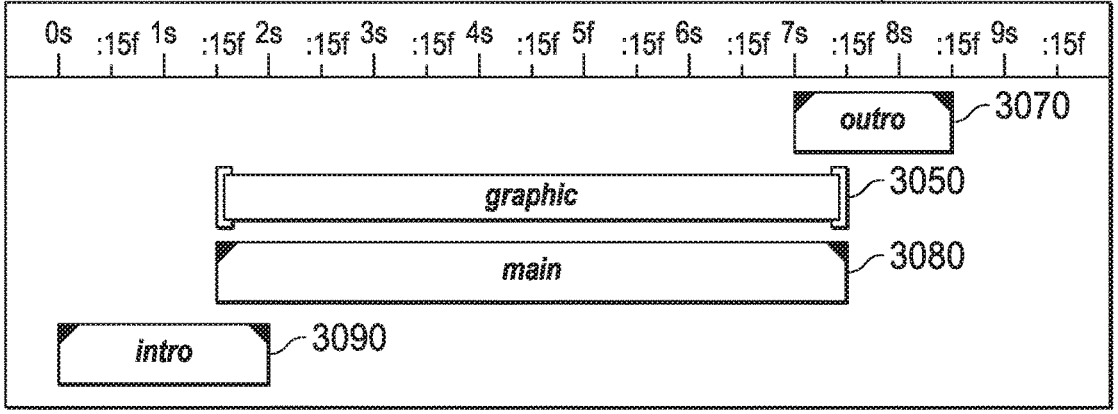
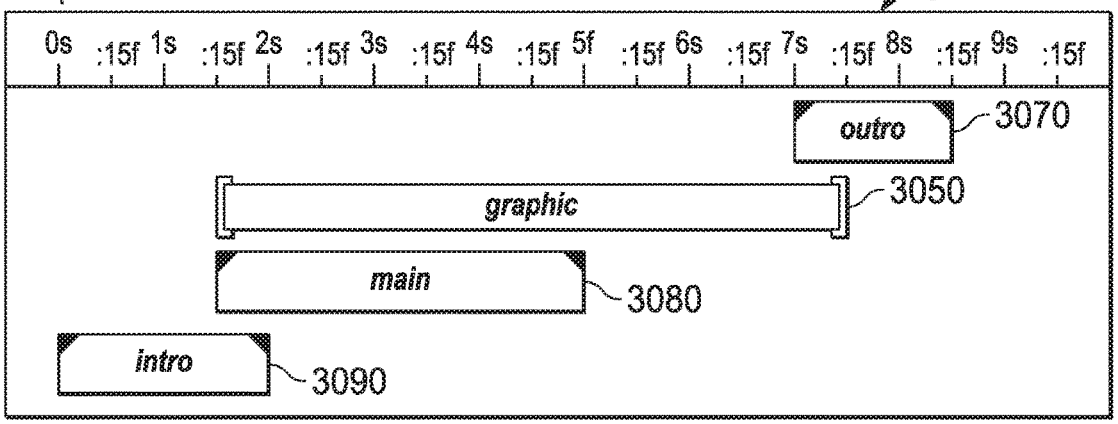
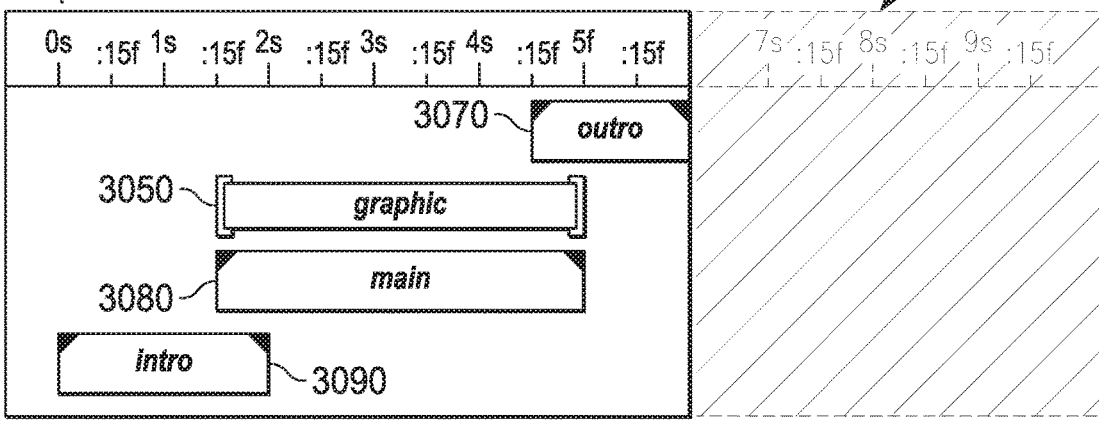
FIG. 30C

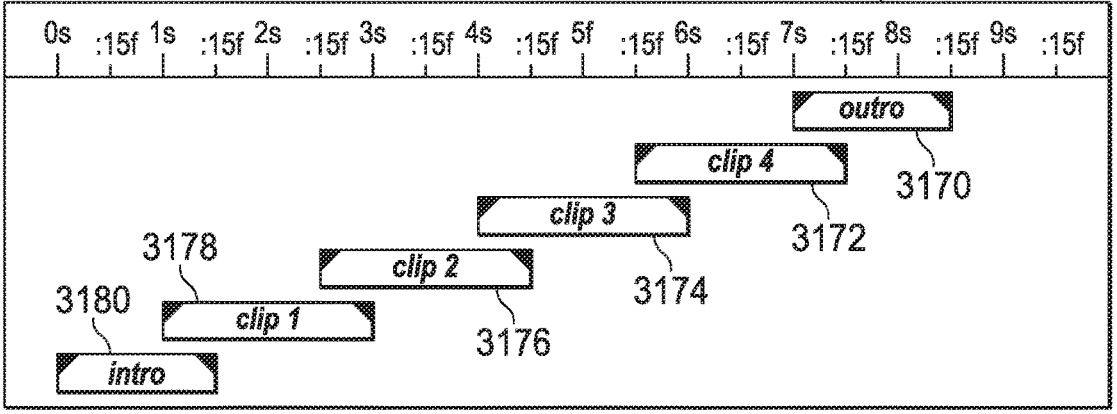
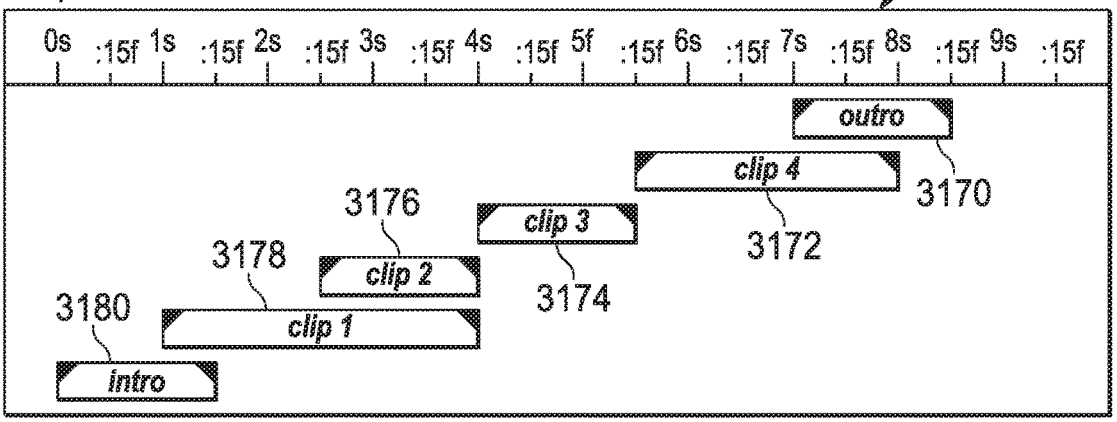
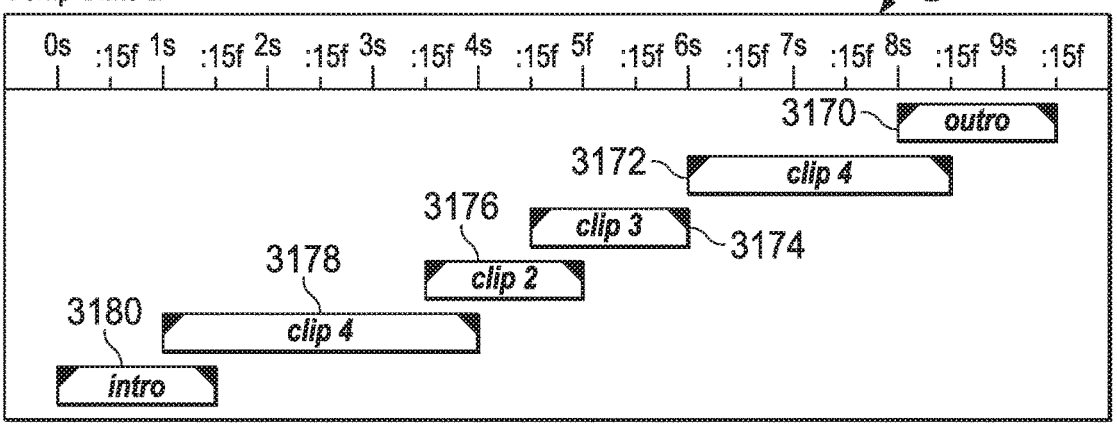
FIG. 31F

|   | A | B | C | D |
|---|---|---|---|---|
| 1 | clip-1 | clip-2 | clip-3 | clip-4 |
| 2 | 2SEC-FLAMINGOS.mp4 | 8SEC-FRAN.mp4 | 4SEC-MODEL-TRAINSET.mp4 | 12SEC-ACAPULCO-CLIFFS.mp4 |
| 3 | 4SEC-MEX-DF-CROWD.mp4 | 2SEC-REFRACTION.mp4 | 12SEC-MODEL-TRAINSET.mp4 | 8SEC-BEACH-SUNSET.mp4 |
| 4 | 8SEC-LAJOLLA.mp4 | 4SEC-DIGITAL-SIGNAGE.mp4 | 2SEC-SPEED-RACING.mp4 | 12SEC-CHOCO-FOUNTAIN.mp4 |
| 5 |   |   |   |   |
| 6 |   |   |   |   |
| 7 |   |   |   |   |
| 8 |   |   |   |   |
| 9 |   |   |   |   |
| 10 |   |   |   |   |
| 11 |   |   |   |   |
| 12 |   |   |   |   |
| 13 |   |   |   |   |
| 14 |   |   |   |   |
| 15 |   |   |   |   |
| 16 |   |   |   |   |

SYSTEM AND METHOD FOR AUTOMATING THE CONFIGURATION AND SEQUENCING OF TEMPORAL ELEMENTS WITHIN A DIGITAL VIDEO COMPOSITION

CROSS-REFERENCE TO RELATED APPLICATIONS

This application is a continuation of, and claims a benefit of priority under 35 U.S.C. 120 of the filing date of U.S. patent application Ser. No. 15/689,752, filed Aug. 29, 2017, entitled "SYSTEM AND METHOD FOR AUTOMATING THE CONFIGURATION AND SEQUENCING OF TEMPORAL ELEMENTS WITHIN A DIGITAL VIDEO COMPOSITION," which claims the benefit of priority under 35 U.S.C. § 119 to U.S. Provisional Application No. 62/381,882, filed Aug. 31, 2016, entitled "SYSTEM AND METHOD FOR AUTOMATING THE CONFIGURATION AND SEQUENCING OF TEMPORAL ELEMENTS WITHIN A VIDEO COMPOSITION," the entire contents of which are hereby expressly incorporated by reference for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates to the field of digital video compositing, including editing or post-production. Specifically, this disclosure relates to methods and systems for establishing and applying rules in the context of authoring, editing or processing video compositions. Even more particularly, this disclosure relates to methods and systems for establishing and applying temporal sculpting rules in the context of compositing, authoring, editing or processing video compositions where the rules may be useful in the context of, for example, content development for digital signage, broadcast graphics, ecommerce video, personalized video messaging or localization of video content, among others.

BACKGROUND

Digital compositing is the process of digitally assembling multiple pieces of content to make a final piece of content (referred to as a composition), typically for motion pictures (i.e., video). It is the digital analogue of optical film compositing. In particular, layer-based compositing represents each piece of digital content (e.g., media object) in a composite (or composition) as a separate layer within a timeline, each with its own time bounds, effects, keyframes, etc. All the layers are stacked, one above the next, in any desired order; and the bottom layer is usually rendered as a base in the resultant final content, with each higher layer being progressively rendered on top of the previously composited of layers, moving upward until all layers have been rendered into the final composite content.

Layer-based compositing sometimes becomes complex in the cases where a large number of layers are utilized. A partial solution to this problem is the ability of some digital compositing programs to view the composite-order of elements (such as images, effects, or other attributes) with a visual diagram to nest compositions, or "comps," directly into other compositions, thereby adding complexity to the render-order by first compositing layers in the beginning composition, then combining that resultant image with the layered images from the proceeding composition, and so on. Thus, each digital video composition can have a series of layers—one stacked on atop another—resting in a timeline.

A digital compositing platform that allows users to digitally composite content, and include nested compositions, is Adobe's After Effects product. Other examples of digital compositing programs or platforms are Blender, Cinelerra, Kdenlive, Natron, OpenShot, Shotcut, Apple Motion, Autodesk 3ds Max, Autodesk Inferno, Flame and Flint (IFF), Autodesk Maya, Autodesk Smoke, CompTime (ILM), FXhome HitFilm, Saber (ILM), Houdini, Blackmagic Fusion, Mistika, Nuke, Piranha, SilhouetteFX, Assimilate, Scratch, Sony Vegas Pro, or the like.

In the main, these types of digital compositing platforms (also known as post-production or editing applications or platforms) present a user with an interface by which a user may select and define layers, and the corresponding source of content for each layer. The interface may also present a graphical depiction of the time line of the composition and allow a user of the digital compositing program to order the layers. Additionally, when a digital compositor (e.g., user) works with a post-production application, the application typically offers a suite of effects that can be applied to the various individual layers that are in the composition's timeline. These effects may be applied or defined using, for example, a "plug-in" to the digital compositing platform. Such plug-ins may be a component that provides a particular feature (e.g., one or more effects) in association with a computing program (e.g., a digital compositing platform). These plug-ins may utilize an extensible architecture offered by the "host" computing program (e.g., a plug-in architecture such as a set of Application Programming Interfaces (API) or the like).

There are a number of complexities when it comes to layer-based digital compositing, however. These complexities result at least in part from the fact that each layer of a composition may include content with no inherent duration (e.g., an image or text) or, conversely, may include content that does have inherent duration (e.g., a video file). Thus, for layers including content with inherent duration there may be a start and end to the content comprising that layer, but there may also be an in-point and out-point defined with respect to the content for that layer, where the in-pint and out-point may not be the same as the start point or end point of the content. Accordingly, the entire duration of the content of the layer may not be shown in the resulting (rendered) composition.

Additionally, problems may arise because digital compositing platforms may allow different pieces of content to be easily swapped. Thus, once a composition is defined (e.g., the set of layers, the content for each of the set of layers, the in-point and out-points for each layer, the temporal arrangement of each layer and the like defined), another source of content may be "swapped" for the current source for the layer, or the original content may be modified. As may be imagined, in the case of content with a particular duration, the original content for a layer may not be of the same duration as the swapped or modified content that replaces it. This situation can cause a number of adverse effects, including dead space in a composition, improper or unwanted display of certain layers together in the composite, the curtailing of the display of the composition, or other undesirable effects. These adverse effects may be exacerbated when layers of a composition are nested, such that one or more layers of a composition is itself a composition comprised of layers having content with an inherent duration.

What is desired therefore, are digital compositing platforms enabled to allow automatic temporal adjustment of a composition or layers thereof.

SUMMARY

To those ends, among many others, systems and methods for implementing rules in a digital compositing platform are disclosed herein. Specifically, certain embodiments provide for the implementation of time-sculpting rules that enable the layers of a video composition to be temporally linked or modified in a content agnostic manner. In this way, content can easily be manipulated, substituted, altered, etc. and the composition automatically modified by the digital compositing platform based on the set of time-sculpting rules to ensure that the resulting composition is coherent and cogent, despite the alterations to the layers or the source of content thereof. These types of rules may thus be advantageously utilized in the authoring, editing or processing video compositions, including in the context of content development for digital signage, broadcast graphics, ecommerce video, personalized video messaging, localization of video content, among others.

In particular, embodiments disclosed herein provide systems, methods, and computer program products for a digital video compositing platform for automatic temporal adjustment of a digital composition may include a data store with a project defining a composition arranged according to a first temporal arrangement including a timeline and having a set of layers. The set of layers of the composition are arranged according to the first temporal arrangement and each layer is associated with corresponding digital content. The digital compositing platform may also include a temporal sculpting module for allowing a user to define a set of temporal sculpting rules including a first temporal sculpting rule associated with a first layer of the composition. The first temporal rule may be one of a target rule establishing a temporal link between the first layer and a target layer or a cropping rule establishing a temporal link between the composition and the first layer.

The set of temporal rules can be stored in the data store in association with the composition, including storing the first temporal sculpting rule in association with the first layer. The temporal sculpting module includes a rules engine for determining that the digital content corresponding to the first layer or the digital content corresponding to the target layer has changed and automatically adjusting the composition from the first temporal arrangement to a second temporal arrangement to conform with the first temporal sculpting rule without user involvement. Adjusting the temporal arrangement can comprise modifying the project to temporally arrange the first layer or target layer within the composition based on the temporal link between the first layer and target layer or cropping the timeline of the composition based on the temporal link between the composition and the first layer.

In one embodiment, the first temporal sculpting rule is a shifting rule and temporally arranging the first layer or target layer within the composition comprises shifting the first layer relative to the timeline based on a target point in the target layer specified in the first temporal sculpting rule.

In another embodiment, the first temporal sculpting rule is a trimming rule and temporally arranging the first layer or target layer within the composition comprises modifying an in-point or out-point of the first layer relative to the timeline based on a target point in the target layer specified in the first temporal sculpting rule.

In other embodiments, the first temporal sculpting rule is a stretching rule and temporally arranging the first layer or target layer within the composition comprises modifying a playback speed of the first layer based on a target point in the target layer or the composition specified in the first temporal sculpting rule.

In certain embodiments, the first temporal sculpting rule is a time cropping rule and temporally cropping the timeline of the composition based on the temporal link between the composition and the first layer comprises modifying a start time or end time of the composition based on a target point in the first layer specified in the temporal sculpting rule.

In a particular embodiment, automatically adjusting the first temporal arrangement to a second temporal arrangement of the composition may be accomplished by determining an ordered set of dynamic layers of the composition, including the first layer and the target layer, resetting the playback speed of each of the set of dynamic layers and arranging the set of dynamic layers according to the set of temporal sculpting rules. The arrangement of the set of dynamic layers may include determining a maximum nested depth of the composition, evaluating each of the ordered set of dynamic layers sequentially in a forward order according to the set of temporal sculpting rules, evaluating each of the ordered set of dynamic layers in reverse order according to the set of temporal sculpting rules, and repeating both these evaluation steps a number of times equal to the maximum nested depth of the composition.

Thus, in one embodiment, the set of rules that may be utilized by a user are target (or anchor) point based rules that link one layer to another layer through the use of target points in the linked layer. In particular, these target based rules may allow one layer to be time shifted, stretched or trimmed based on one or more target points defined with respect to another layer. The set of rules may also include time cropping rules that allow a user to define time cropping points with respect to a layer, such that when a layer changes, the in-point and out-point of the entire composition are altered based on the in-point or out-point of the layer.

Accordingly, in certain embodiments, if a video composition contains a layer that is itself a separate composition which contains a layer marked for variable footage duration, then the timeline of the video composition can be reconfigured according to the duration of the footage layers. Users may consequently have the capability to nest dynamic layers of variable time duration within each other. The cumulative effect of processing content utilizing rules applicable to nested layers of variable time duration is that the overall length of the output changes based on the variable length of sub-layers.

Accordingly, embodiments may provide advantages by allowing users of digital compositing platforms to be able to define time-sculpting rules with respect to one or more layers of a composition, where those time-sculpting rules enable the layers to be temporally linked or modified in a content agnostic manner. In this way, content can easily be manipulated, substituted, altered, etc. and the composition automatically modified based on the set of time-sculpting rules to ensure that the resulting composition is coherent and cogent, despite the alterations to the layers or the source of content thereof.

Moreover, embodiments may provide advantages related to the speed and processing efficiency of computer systems, including digital processing platforms that implement such time-sculpting rules. Such efficiencies may be especially realized in the context of applying such time-sculpting rules to video compositions that are nested (e.g., where a layer of the composition is itself a composition) and particularly in the context of video compositions that include multiple levels of nesting. These efficiencies may result at least from an initial determination of the level or depth of nesting of such video composition (e.g., before time-sculpting rules are applied) and the use of this depth of nesting as a parameter in determining the processing of the layers of the video composition. Specifically, in certain embodiments, these efficiencies may result from limiting the number of times the layers of a composition are processes based on the depth of the nesting of a video composition.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 4A-11B are block diagrams depicting embodiments of shifting rules and interfaces for defining such shifting rules.

FIGS. 12A-19B are block diagrams depicting embodiments of trimming rules and interfaces for defining such trimming rules.

FIGS. 25A-26B are block diagrams depicting embodiments of cropping rules and interfaces for defining such cropping rules.

FIGS. 27A and 27B are block diagrams depicting an embodiment of cropping rules and interfaces for defining such cropping rules.

FIGS. 28A-28C are block diagrams depicting an embodiment of cropping rules and interfaces for defining such cropping rules.

FIGS. 29A-29C are block diagrams depicting an example of the application of time sculpting rules and interfaces for defining such time sculpting rules.

FIGS. 30A-30C are block diagrams depicting an example of the application of time sculpting rules and interfaces for defining such time sculpting rules.

FIGS. 31A-31F are block diagrams depicting an example of the application of time sculpting rules and interfaces for defining such time sculpting rules.

DETAILED DESCRIPTION

Figure 1:
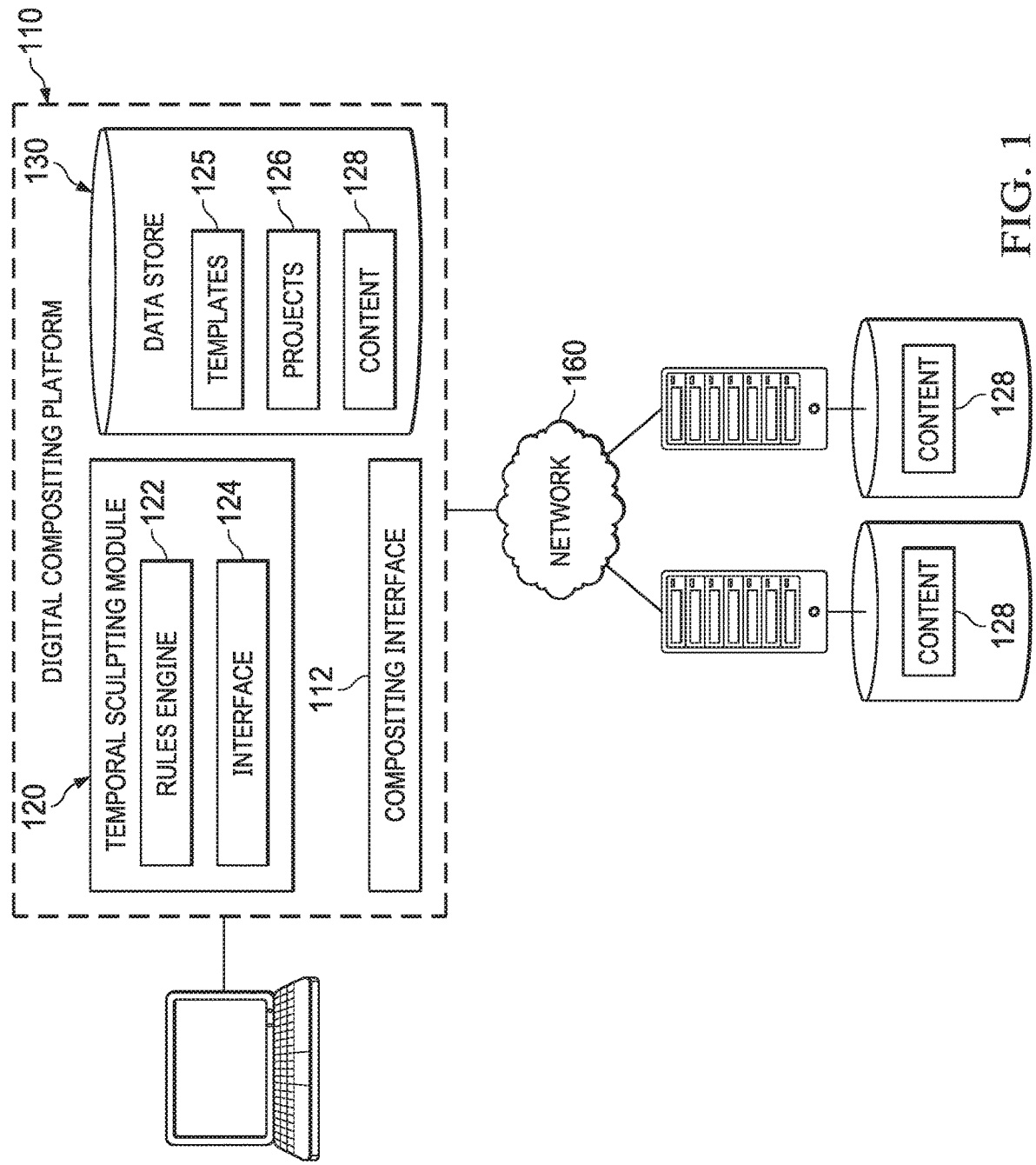
FIG. 1 is a block diagram depicting one embodiment of an architecture including a digital compositing platform.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

A brief discussion of a context in which embodiments as disclosed herein may be effectively utilized may be useful before delving into embodiments in more detail. As will be recalled from the above discussion, digital compositing is the process of digitally assembling multiple pieces of content to make a composition, typically for motion pictures (i.e., video). In particular, layer-based compositing represents each piece of content (e.g., media object) in a composite (or composition) as a separate layer within a timeline, each with its own time bounds, effects, keyframes, etc. All the layers are stacked, one above the next, in any desired order; and the bottom layer is usually rendered as a base in the resultant final content, with each higher layer being progressively rendered on top of the previously composited of layers, moving upward until all layers have been rendered into the final composite content. In addition, compositions may be nested, where the layer of a composition is itself a composition including layers, where these layers may, in turn, include a composition, etc.

There are a number of complexities when it comes to layer-based digital compositing, however. These complexities result at least in part from the fact that each layer may include content with no inherent duration (e.g., an image or text) or that does have inherent duration (e.g., a video file). Thus, for content layers with inherent duration there may be a start and end to the content comprising a layer, but there may also be a "in-point" and "out-point" defined with respect to the content for that layer, where the in-pint and out-point may not be the same as the start point or end of the content. Accordingly, the entire duration of the content may not be shown in the resulting composition.

Additionally, problems may arise because digital compositing platforms may allow different pieces of content to be easily swapped. Thus, once a composition is defined (e.g., the set of layers, the content for each of the set of layers, the in-point and out-points for each layer, the temporal arrangement of each layer and the like defined), another piece of content may be "swapped" for the current source for the layer or the original content may be modified. As may be imagined, in the case of content with a particular duration, the original content for a layer may not be of the same duration as the swapped or modified content that replaces it. This situation can cause a number of adverse effects, including dead space in a composition, improper or unwanted display of certain layers together in the compositing, the curtailing of the display of the composition, or other undesirable effects. These adverse effects may be exacerbated when layers of a composition are nested, such that one or more layers of a composition is itself a composition comprised of layers having content with an inherent duration.

What is desired therefore, is to allow users of digital compositing platforms to be able to define time-sculpting rules with respect to one or more layers of a composition, where those time-sculpting rules enable the layers to be temporally linked or modified in a content agnostic manner. In this way, content can easily be manipulated, substituted, altered, etc. and the composition automatically modified based on the set of time-sculpting rules to ensure that the resulting composition is coherent and cogent, despite the alterations to the layers or the source of content thereof.

Embodiments of the systems and method for implementing time-sculpting rules in a layer based digital compositing application as disclosed herein may do just that, among other advantages and capabilities. Embodiments of these time-sculpting rules may be modifiers a user may assign to one or more layers that exist within the timeline of a video composition. The time-sculpting rules provided by embodiments may allow users to define video composition templates with layers of variable time duration. These rules can be evaluated when a digital compositing platform creates a composition based on the layers and rules defined for the composition. In this manner, the time sculpting of digital compositions can be automated by applying those rules to the layers (including nested compositions) of a composition. This automated time sculpting may be especially useful in cases where the content comprising a layer (e.g., the source of content for the layer) has been altered.

For example, in one embodiment, the set of rules that may be utilized by a user are target (or anchor) point based rules that link one layer to another layer through the use of target points in the linked layer. In particular, these target based rules may allow one layer to be time shifted, stretched or trimmed based on one or more target points defined with respect to another layer.

In other embodiments, the set of rules are time cropping rules that allow a user to define time cropping points with respect to a layer of a composition, such that when a layer changes, the in-point and out-point of the entire composition are altered based on the in-point or out-point of the layer.

Accordingly, in certain embodiments, if a video composition contains a layer that is itself a separate composition which includes a layer to which a rule has been applied, the timeline of the video composition can be reconfigured according to the duration of the layers. Users may consequently have the capability to nest dynamic layers of variable time duration within each other. The cumulative effect of processing content utilizing rules applicable to nested layers of variable time duration is that the overall length of the composition may change based on the variable length of sub-layers.

In certain embodiments, these rules may be incorporated into a host digital compositing platform. For example, in certain embodiments, a temporal sculpting module may be, included in, or installed as an addition or plug-in to a digital compositing program such as Adobe's After Effects. In particular, when a digital compositor works with their post-production application, they typically have a suite of effect plug-ins they can apply to various, individual, layers that exist in a composition's timeline. A typical compositor's workstation will have a suite of plug-ins installed and each have a unique set of controls. Users may install a temporal sculpting module as a plug-in to an existing or pre-installed video compositing platform. Users can then apply the temporal sculpting plug-in effect to any layer in a video composition being composited in the host compositing platform. The effect's "controls" are where the user's configure rules. These controls may be thought of as styling declarations not unlike those found in a Cascading Style Sheet (CSS) for a website.

By installing a temporal sculpting module as plug-in to a digital compositing program such as After Effects, or providing a temporal sculpting module in such a digital compositing platform, embodiments of the systems and methods disclosed may allow a user of such a program to utilize an "effect" to mark variable footage layers in a manner that follows and fits into the normal workflow to which digital compositors are accustomed. That is, a user can select a layer, apply an effect to the layer, and then configure the effect's controls. Accordingly, the user experience of setting up the system of time sculpting rules according to embodiments may be intuitive, as it operates within a framework with which users are accustomed to interacting.

In one embodiment, when compositing, the user may define a template based on the time-sculpting rules using the plug-in for the digital compositing platform. The template may follow the format of the host digital compositing platform. Thus, for example, in one embodiment the template file format may follow the After Effects Project (.aep) file format specification. In other words, the definition of time-sculpting rules for one or layers of a composition of a project file may result in the definition of a template. A template may thus be an instance of, or included within, a project file. It will be understood that the term project as used herein is used in a general sense to refer to any file or storage format for a digital video composition or a template and in should not in any way be taken as a limitation on the embodiments as disclosed herein.

Once the templates are created, they are processed to alter the composition or layers thereof to ensure that the rules are met. This processing of the template may also be triggered by another event, such as the modification, alteration, substitution, removal, etc. of one or more layers of the composition. For example, in one embodiment, a user sets up versioning data and prepares a template for versioning data. The user can then link the versioning data to a particular project (e.g., .aep) file. User then selects a "target" composition to re-version and render. A rendering operation (e.g., a batch rendering operation) can then be initiated. During the rendering process, a processing loop can occur where the versioning data is ingested and the host digital compositing application's project and compositions are invalidated with new data (e.g., text, footages, and solid colors). The host digital compositing application (e.g., After Effects) can then render the target composition. This loop is repeated and may be recursive or nested such that compositions that comprise layers of a deeper, nested, level may be processed or rendered in accordance with the rules before higher-level layers. In some embodiments, the processing may be repeated according to a depth of nesting of compositions within the project.

It will now be helpful to discuss embodiments of such a digital compositing platform with a temporal sculpting module. Turning then FIG. 1, one embodiment of an architecture including a digital compositing platform 110 including a temporal sculpting module 120 is depicted. Temporal sculpting module 120 may be implemented as a plug-in to the digital compositing platform 110 or may be built into the digital compositing platform 110. As discussed, one example of a digital compositing platform 110 is Adobe After Effects, and in one embodiment, temporal sculpting module 120 may be implemented as a plug-in to Adobe After Effects or another digital composing platform that provides a plug-in architecture. It will be understood, however, that embodiments as disclosed herein may be equally effectively implemented or utilized in conjunction with almost any digital compositing platform desired including those listed above or others.

Digital compositing platform 110 may present a user with an interface 112 by which a user may select and define layers, and the corresponding source of content for each layer. The interface may also present a graphical depiction of the time line of the composition and allow a user of the digital compositing program 110 to temporally order the layers. Additionally, when a digital compositor (e.g., user) works with their post-production application, they typically have a suite of effect plug-ins they can apply to the various individual layers that are in the composition's timeline.

In particular, when a user is utilizing the digital compositing platform 110 he may be presented with an interface which allows him to see a timeline for a composition he is editing along with depictions of the various layers within that composition. The user can use the interface to associate content 128 (stored locally in data store 130 or remotely on sources accessible across computer network 160) with each of the layers. This association may be defined by a supplying a source for the content 128 to associate with the layer. The visual interface may also allow the user to nest compositions, directly into other compositions. Thus, each video composition can have a series of layers—one stacked one atop another—according to a timeline, where those layers may themselves be compositions.

The digital compositing platform 110 may define and store one or more files 126 (generally referred to herein as projects) associated with the composition being defined by the user. A project file may store one or more compositions (e.g., collection of layers) and references to the content 128 (e.g., the source of content 128) for each of the layers of the composition. Moreover, the project 126 may include data regarding the compositions or layers comprising the compositions, including, for example, a temporal arrangement of the layers such as the duration, playback speed, in-point, out-points or other data regarding the layers and compositions.

Users can apply temporal sculpting rules (or effects) (e.g., which may be named Templater Settings or the like) to any layer in a video composition being composited using digital compositing platform 110 utilizing temporal sculpting module 120. Specifically, an interface 124 of the temporal sculpting module may be presented in association with the interface of the digital compositing platform 110. The interface 124 of the temporal sculpting module 120 may include a set of "controls" where the user may configure such rules. Embodiments may, for example, be usefully utilized in association with the Templater product of Dataclay, LLC of Austin, Tex.

In particular, in one embodiment, the temporal sculpting module 120 may have an interface component 124 which allows a menu to be presented in association with the interface of the digital compositing platform 110 to present the user with controls for the temporal sculpting module 120. Using this interface 124 the user may specify rules associated with the composition of the project 126 and thus define a template 125 for the composition of the project file 126 including one or more rules for the composition. The project 126 may thus include the defined template 125, or set of rules. In one embodiment, the set of rules defined by the user may be stored in the project 126 being edited by the user through the digital compositing platform 110. In this manner, the template 125 may be included in the project 126, or stored in association with the project 126, as the defined set of rules. These rules may establish temporal links between one or more layers or between a composition and a layer.

The rules engine 122 of the temporal sculpting module 120 can then evaluate the composition (e.g., the project file 126 for the composition) based on the template 125 associated with the project 126 to conform the project 126 to those rules such that when the digital compositing platform 110 renders the composition of the project 126 it is rendered in accordance with those rules to temporally sculpt the resulting rendered composition. Specifically, in one embodiment, the rules engine 122 may evaluate the rules defined in the template 125 and adjust the temporal arrangement of the composition by adjusting the data (e.g., the in-point, out-point, start time, end time, playback speed, etc.) associated with one or more dynamic layers in, or the composition of, the project 126. Such an adjustment may, for example, be done automatically without further user involvement based on one or more occurrences such as replacement or alteration of the source of content of a layer, or another occurrence. In this manner, layers within a composition can be made to automatically interact with one another in a final composition with respect to start or end time, playback speed, in-point, out-points or other data regarding the layers and compositions.

In one embodiment, the rules engine 122 may evaluate the layers of a composition in a number of passes based on a depth of nesting of layers of the composition when applying the rules of the template 125 to the layers of the composition (s) of the project 126. Specifically, in one embodiment, to adjust the temporal arrangement of the composition or layers to conform the layers of the project 126 to the template 125, the rules engine 122 may process the project file to determine the layers of the composition(s) of the project that are dynamic. These dynamic layers (which may themselves be a composition) are those layers in the composition of the project 126 which have one or more associated time-sculpting rules as defined in template 125 using temporal sculpting module 120. Each of these dynamic layers may be placed in an array or other data structure (generically referred to herein as an array). In one embodiments, placing the layer in the array may include placing a reference to the layer in the project 126 in the array. The array thus includes references to each dynamic layer and the associated data or properties of that layer such as the start time, end time, in-point, out-point, playback speed, etc.

Each of the dynamic layers referenced in the array may be initialized and reset by the rules engine 122 by defining the layer's playback to normal speed (e.g., 100%) and setting the in-points or out-points of the layer if needed. The maximum nested depth of the composition of the project 126 can then be determined by the rules engine 122. For each level of depth, the layers of the project 126 can then be arranged according to the time-sculpting rules defined for those layers according to the template 125. This arrangement may include trimming one or more of the layers (e.g., setting a layer's in-point or out-point in the project based on a target layer's in-point or out-point); shifting one or more of the layers (e.g., setting a layer's start time or end time in the project so the layer's in-point or out-point reaches a target layer's in-point or out-point); cropping one or more layers (which may be compositions) (e.g., by adjusting the duration of the composition in the project where the beginning of a composition starts at a layer's in-point or the end of a composition ends at a layer's out-point, or both); or stretching one or more layers (e.g., by changing the duration of a layer in the project by adjusting the layer's playback speed until the layer's out-point reached the in-point or out-point of a target layer, or the end of the layer's containing composition).

Figure 2:
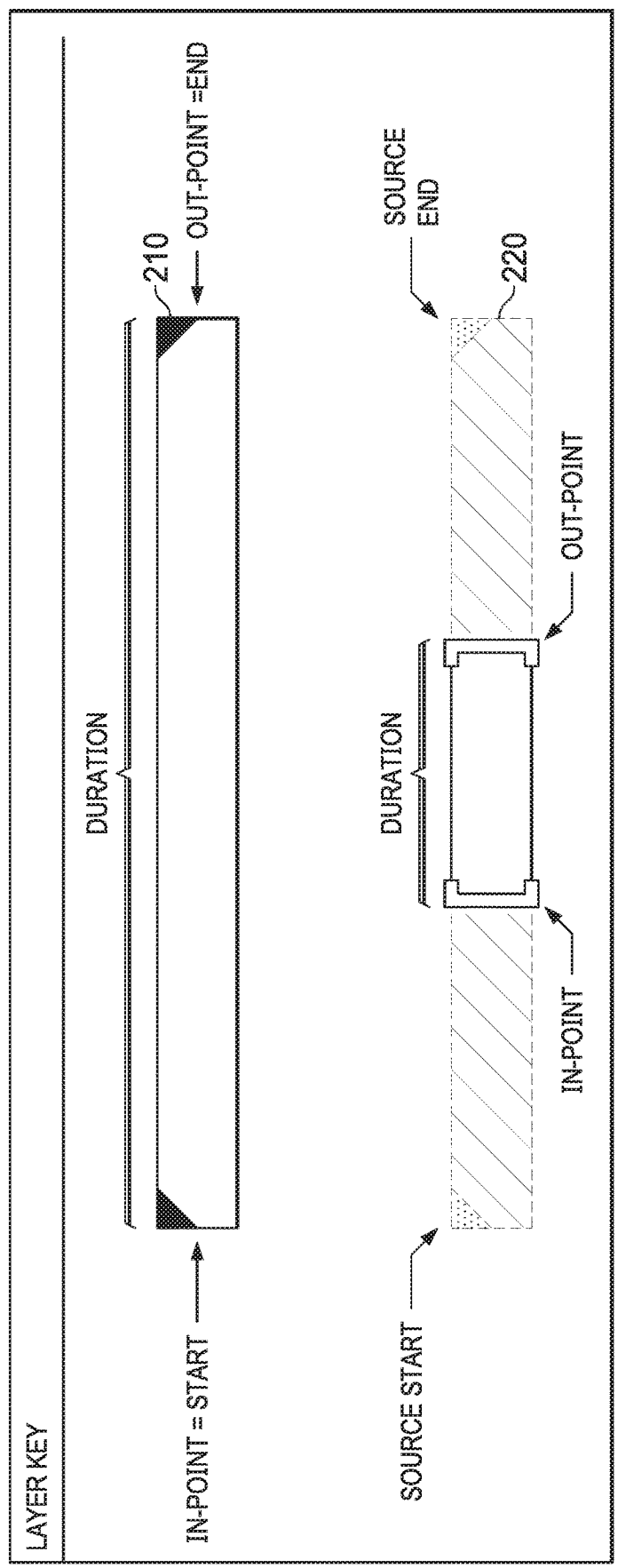
FIG. 2 is a block diagram depicting a key for a layer.

It is useful at this point to illustrate types of rules that may be implemented by embodiments of the temporal sculpting module and digital compositing platform described herein. Before discussing these rules in detail, attention is directed to FIGS. 2 and 3 which are block diagrams depicting keys that will be useful in understanding the graphic depiction of the rules that follow. FIG. 2 depicts a key for a layer. Thus, a layer may be represented by a rectangle or block 210, 220. Time is depicted as running from left to right when viewing the FIGURES. The content for the layer may have a start denoted by a triangle on the left of the rectangle representing the layer and an end denoted by the triangle on the right. The duration for the layer 210 (e.g., the amount of time the source content of the layer appears in the containing composition) is thus equal to the duration of the source content Thus, the example layer 210 is a layer whose in-point and out-point are equal to the start and end of the source content for the layer. In example layer 220, however, note that the in-point (denoted by a right-facing bracket) and an out-point (denoted by a left-facing bracket) of a layer with respect to a composition may not be the same as the start and end of the layer. In this case, then, the entire content for the layer is not presented in the containing composition. Instead, the content of the layer is displayed in the composition beginning at the in-point (right-facing bracket) and ending at the out-point (left-facing bracket). The greyed out portion of the rectangle representing the layer indicates that this portion of the content of the layer (e.g., the greyed out portion) will not be displayed in the composition. The duration of this layer (vis-à-vis the containing composition) will thus be the portion of the content of the layer between the in-point (right-facing bracket) and the out-point (left-facing bracket).

Figure 3:
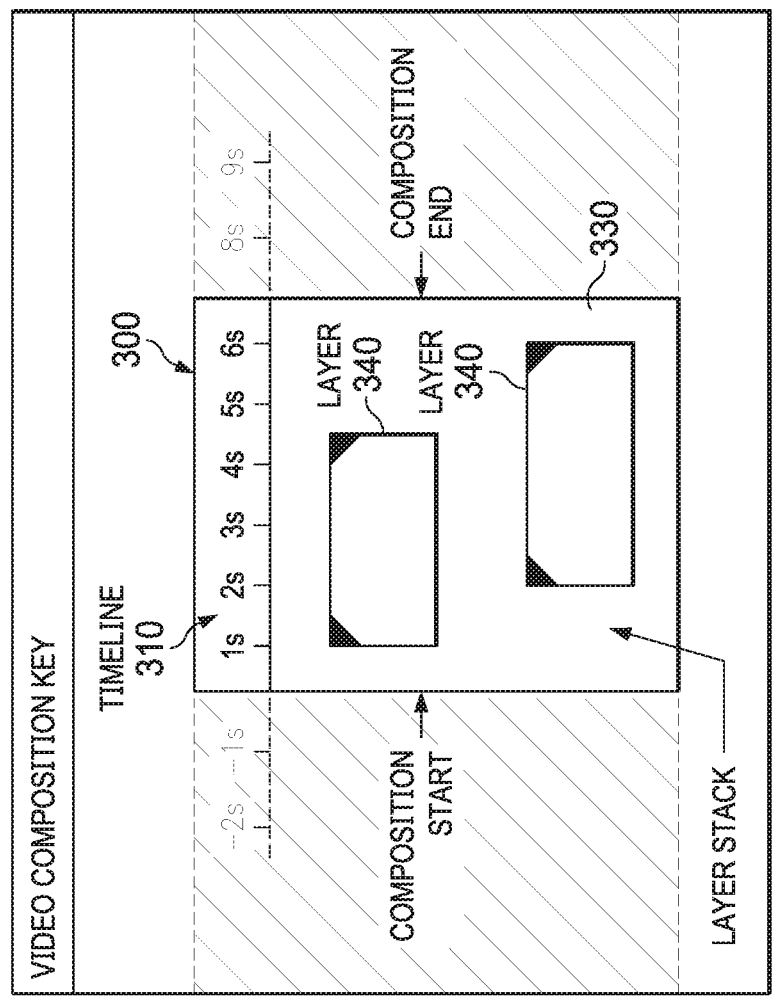
FIG. 3 is a block diagram depicting a key for understanding a depiction of a video composition.

FIG. 3 depicts a block diagram of key for understanding the depiction of video compositions and their parts in the following FIGURES. A composition 300 is represented by a rectangle where the left border of the rectangle represents the start of the composition 300 and the right side of the triangle represents the end of the composition 300. A timeline 310 of the composition is represented across the top of the composition 300. Underneath the timeline 310 of the composition 300 the layer stack 330 include each of the layers 340 contained by the composition 300. The layers are depicted as discussed in FIG. 2 and arrayed with respect to the timeline 310 based on the data (e.g., start time, end time, in-point, out-point, etc.) associated with that layer 340 for the composition.

With those depictions and representations in mind, attention is now directed to the types of rules that may be implemented by embodiments of the temporal sculpting module and digital compositing platform described herein. As discussed, a layer which has a time-sculpting rule assigned to it, or associated with it, may be referred to as a "dynamic layer". In other words, the layer (or an associated layer) may change based on some criteria. A target layer can also be dynamic or have other target layers. In one embodiment, the set of rules that may be utilized by a user are target (or anchor) point based rules that link one layer to another layer through the use of target points in the linked or targeted layer. The anchors or targets within a target layer could be start points or end points, in-points or out-points, key-frames within a layer, etc. Generally, a target point may be some reference point within a target layer that could be identified (e.g., in the case where one layer is replaced with another layer). These target based rules may allow one layer to be time shifted, stretched, trimmed or otherwise temporally arranged based on one or more target points defined with respect to another layer. Additionally, an "overlap" may be specified (usually with respect to a target point). This overlap may include a number of frames or time period (e.g., later or earlier) than a target point.

Specifically, in one embodiment, time shifting rules may allow a layer to be temporally arranged by being moved along a composition's timeline based on a temporal link established with a target point within a target layer such that when a layer is modified (e.g., altered, substituted, swapped, etc.) a layer may be time shifted based on the modified layer. Embodiments of these types of shifting rules may be better understood with reference to FIGS. 4A-11B.

Figure 4A:
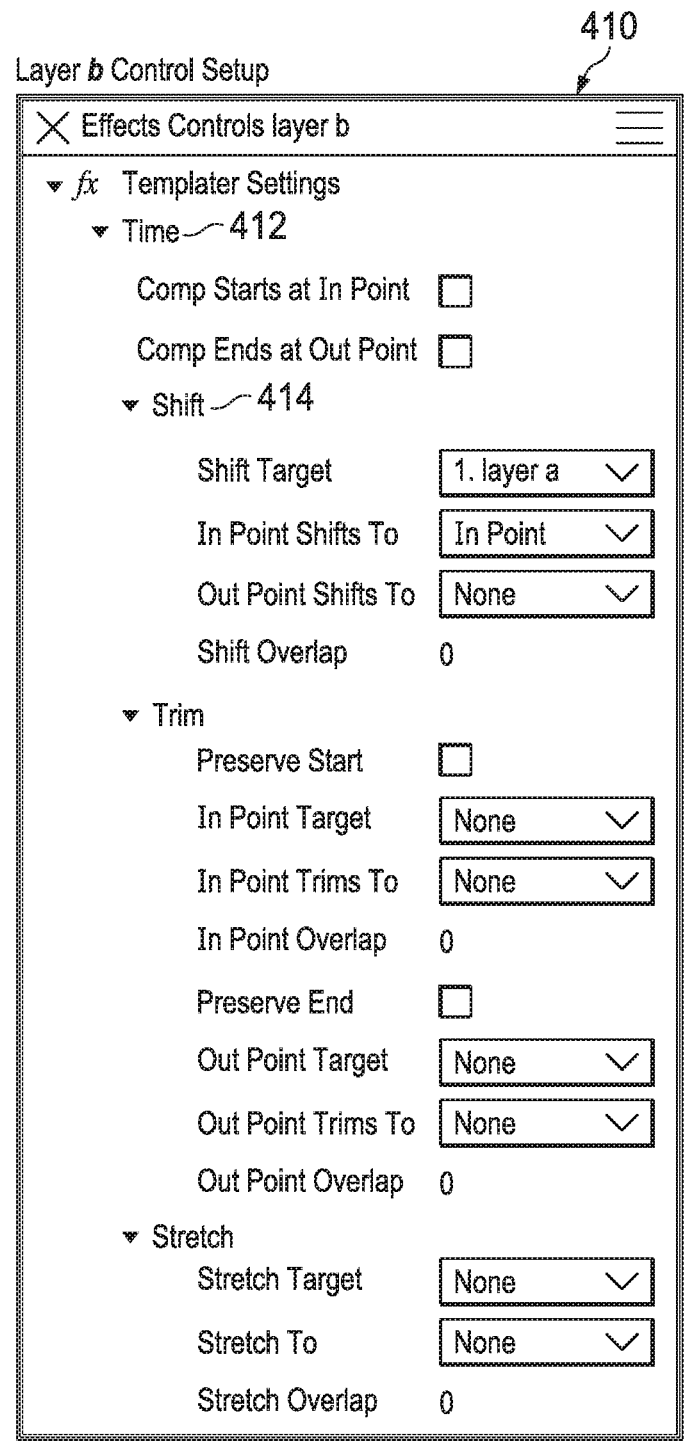

First, referring to FIG. 4A a block diagram depicting one embodiment of an interface for allowing a user to define an "in-point shifts to in-point" rule is shown. Such a rule may specify that when a layer (here layer b) changes duration (e.g., because the source changes or the content from the source changed), that layer's in-point will shift to the same position in time as a target layer's (here layer a) in-point. Thus, such an interface may be presented by a temporal sculpting module when a user is defining effects for layer b in a digital compositing platform. In particular, interface 410 may allow a user to specify control parameters for a layer (the "controlled layer", here layer b). Interface 410 provides a time menu 412 for the controlled layer including controls allowing a user to define one or more time-sculpting rules with respect to that layer. This time menu may include shift menu 414 where the shift target (e.g. here layer a) may be specified, along with the rule that the in-point for the controlled layer (layer b) should be shifted to the in-point of the target layer (layer a).

FIG. 4B is a block diagram depicting the one embodiment of the effect of applying an in-point shifts to in-point rule as defined in FIG. 4A to the controlled layer (layer b). Composition 460a depicts an initial state of the composition 460. Initially then, layer a 470 is composited atop layer b 480 and layer b 480 has a first source of content. Composition 460*b* depicts a state of composition 460 after the source of content of layer b 480 changes, before the application of the in-point shifts to in-point rule defined for layer b 480. Composition 460*c* depicts the state of the composition 460 after the application of the in-point shifts to in-point rule defined in FIG. 4A. Thus, for example, a rules engine of a temporal sculpting module may evaluate the rules associated with composition 460 as defined in the project for the composition when the source of content for layer b 480 changes, and apply the in-point shifts to in-point rule specified for layer b 480 in the project for composition 460 (e.g., by changing the data associated with layer b 480 in the project). Notice here that the application of the in-point shifts to in-point rule shifts the in-point of layer b 480 and the out-point of layer b by the same amount of time to cause the in-point of layer b 480 to reach (e.g., be the same point in time in the composition as) layer a's in-point.

Figure 5A:
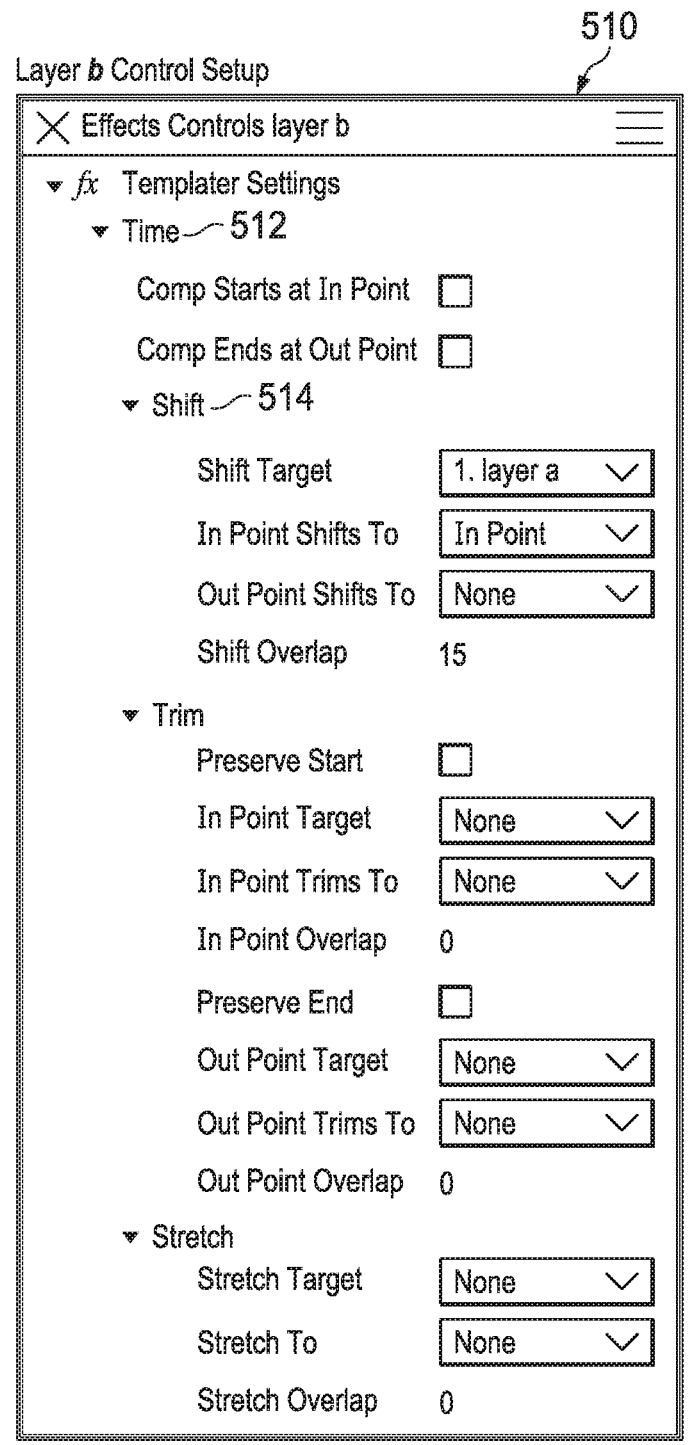

Similarly, in FIG. 5A a block diagram depicting one embodiment of an interface for allowing a user to define an "In-point shifts to In-point with overlap" rule is shown. Such a rule may specify that when a layer (here layer b) changes duration, that layer's in-point will shift to the same position in time as a target layer's (here layer a) in-point plus some amount of frames. Such an interface may be presented by a temporal sculpting module when a user is defining effects for layer b in a digital compositing platform. Interface 510 may allow a user to specify control parameters for the controlled layer (here layer b) by providing a time menu 512 for the controlled layer including controls allowing a user to define one or more time-sculpting rules with respect to that layer. This time menu 512 may include shift menu 514 where the shift target (e.g. here layer a) may be specified, along with the rule that the in-point for the controlled layer (layer b) should be shifted to the in-point of the target layer (layer a) with an overlap of a certain number of frames (here 15).

FIG. 5B is a block diagram depicting one embodiment of the effect of applying an in-point shifts to in-point rule plus overlap as defined in FIG. 5A to the controlled layer (layer b). Composition 560*a* depicts an initial state of the composition 560. Initially then, layer a 570 is composited atop layer b 580 and layer b 580 has a first source of content. Composition 560*b* depicts a state of composition 560 after the source of content of layer b 580 changes, before the application of the in-point shifts to in-point plus overlap rule defined for layer b 480. Composition 560*c* depicts the state of the composition 560 after the application of the in-point shifts to in-point rule plus overlap defined in FIG. 5A. Thus, for example, a rules engine of a temporal sculpting module may evaluate the rules associated with composition 560 as defined in the project for the composition when the source of content for layer b 580 changes, and apply the in-point shifts to in-point plus overlap rule specified for layer b 580 in the project for composition 560 (e.g., by changing the data associated with layer b 580 in the project). Notice here that the application of the in-point shifts to in-point plus overlap rule shifts the in-point of layer b 580 and the out-point of layer b by the same amount of time to cause the in-point of layer b 580 to be a point in time in the composition defined by layer a's in-point plus the number of frames specified as the overlap (e.g., in this example 15 frames).

Figure 6A:
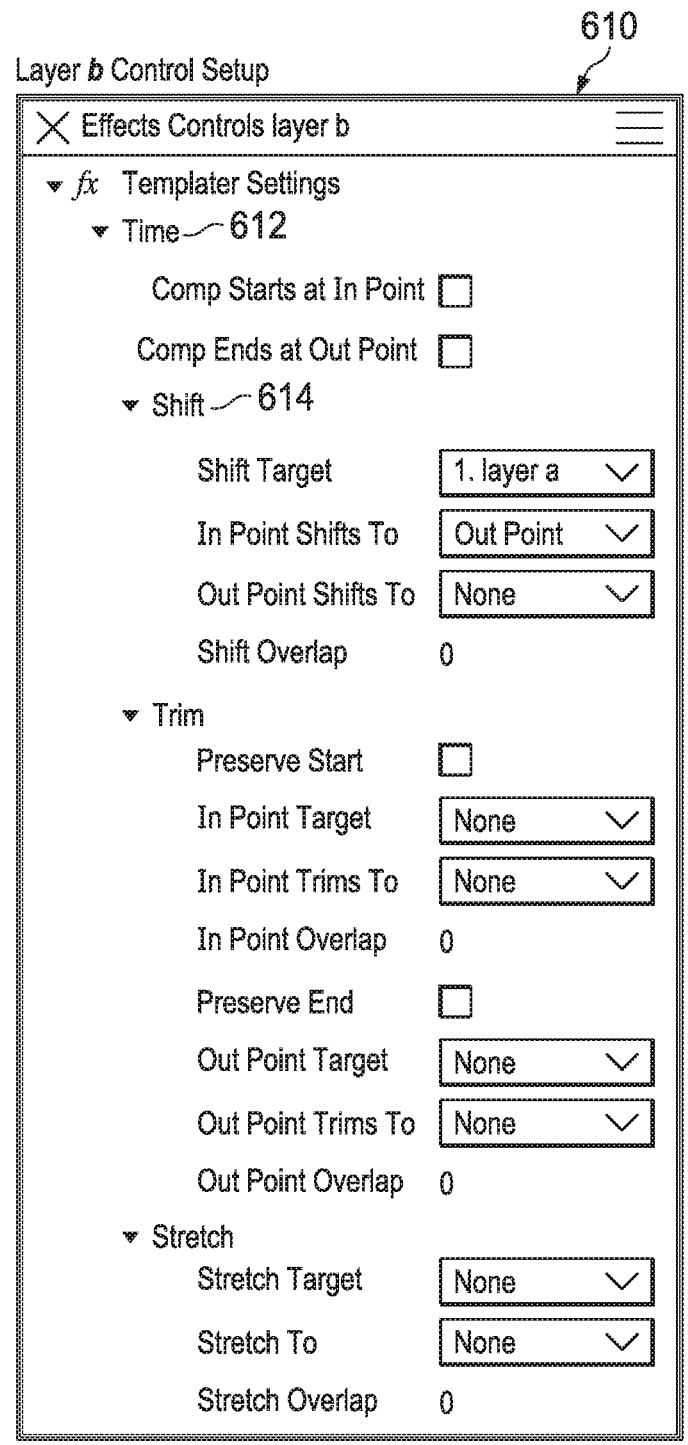

Moving to FIG. 6A a block diagram depicting one embodiment of an interface for allowing a user to define an "in-point shifts to out-point" rule is shown. Such a rule may specify that when a target layer (here layer a) changes duration, the control layer's in-point will shift to the same position in time as the target layer's (here layer a) out-point. Thus, such an interface may be presented by a temporal sculpting module when a user is defining effects for layer b in a digital compositing platform. In particular, interface 610 may allow a user to specify control parameters for the controlled layer (here layer b). Interface 610 provides a time menu 612 for the controlled layer including controls allowing a user to define one or more time-sculpting rules with respect to that layer. This time menu may include shift menu 614 where the shift target (e.g. here layer a) may be specified, along with the rule that the in-point for the controlled layer (layer b) should be shifted to the out-point of the target layer (layer a).

FIG. 6B is a block diagram depicting one embodiment of the effect of applying an in-point shifts to out-point rule as defined in FIG. 6A to the controlled layer (layer b). Composition 660*a* depicts an initial state of the composition 660. Initially then, layer a 670 is composited atop layer b 680 and layer a 670 has a first source of content. Composition 660*b* depicts a state of composition 660 after the source of content of layer a 670 changes, before the application of the in-point shifts to out-point rule defined for layer b 680. Composition 660*c* depicts the state of the composition 660 after the application of the in-point shifts to out-point rule defined in FIG. 6A. For example, a rules engine of a temporal sculpting module may evaluate the rules associated with composition 660 as defined in the project for the composition when the source of content for layer a 670 changes, and apply the in-point shifts to out-point rule specified for layer b 680 in the project for composition 660 (e.g., by changing the data associated with layer b 680 in the project). Notice here that the application of the in-point shifts to out-point rule shifts the in-point of layer b 680 and the out-point of layer b by the same amount of time to cause the in-point of layer b 680 to reach (e.g., be the same point in time in the composition as) layer a's out-point.

Figure 7A:
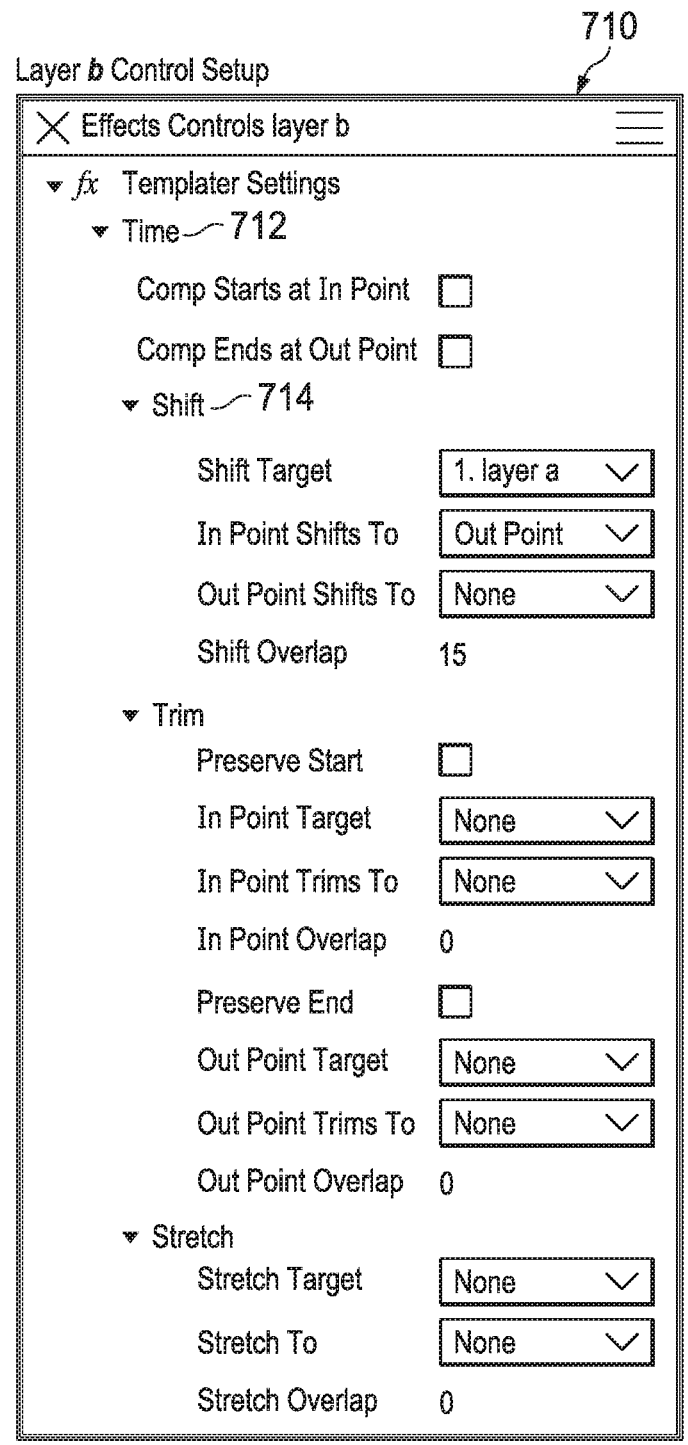

Similarly, in FIG. 7A a block diagram depicting one embodiment of an interface for allowing a user to define an "in-point shifts to out-point with overlap" rule is shown. Such a rule may specify that when a target layer (here layer a) changes duration, a controlled layer's in-point will shift to the same position in time as the target layer's (here layer a) out-point minus (e.g., earlier in time by) some amount of frames. Such an interface may be presented by a temporal sculpting module when a user is defining effects for layer b in a digital compositing platform. Interface 710 may allow a user to specify control parameters for the controlled layer (here layer b) by providing a time menu 712 for the controlled layer including controls allowing a user to define one or more time-sculpting rules with respect to that layer. This time menu 712 may include shift menu 714 where the shift target (e.g. here layer a) may be specified, along with the rule that the in-point for the controlled layer (layer b) should be shifted to the out-point of the target layer (layer a) minus an overlap of a certain number of frames (here 15).

It will be noted that while the overlap of a certain number of frames has been defined as being plus or minus that number of frames with respect to certain rules this should not be taken as a limitation on other embodiments of similar rules and that whether an overlap is defined to be plus or minus the defined number of frames may depend on the rule or another condition such as a user selection. Additionally, it should be noted that while overlap has been specified according to certain embodiments based on a number of frames, other methods of specifying overlap (e.g., amount of time) may also be utilized and are fully contemplated herein.

FIG. 7B is a block diagram depicting one embodiment of the effect of applying an in-point shifts to out-point rule with overlap as defined in FIG. 7A to the controlled layer (layer b). Composition 760*a* depicts an initial state of the composition 760. Initially then, layer a 770 is composited atop layer b 780 and layer b 780 has a first source of content. Composition 760*b* depicts a state of composition 760 after the source of content of layer b 780 changes, before the application of the in-point shifts to out-point with overlap rule defined for layer b 780. Composition 760*c* depicts the state of the composition 760 after the application of the in-point shifts to out-point rule with overlap defined in FIG. 7A. For example, a rules engine of a temporal sculpting module may evaluate the rules associated with composition 760 as defined in the project for the composition when the source of content for layer a 770 changes, and apply the in-point shifts to out-point with overlap rule specified for layer b 780 in the project for composition 760 (e.g., by changing the data associated with layer b 780 in the project). Notice here that the application of the in-point shifts to out-point with overlap rule shifts the in-point of layer b 780 and the out-point of layer b by the same amount of time to cause the in-point of layer b 780 to be a point in time in the composition defined by layer a's out-point minus the number of frames specified as the overlap (e.g., in this example 15 frames). In other words, the in-point of layer b 780 may be defined to be the number of overlap frames earlier than the out-point of layer a 770.

Figure 8A:
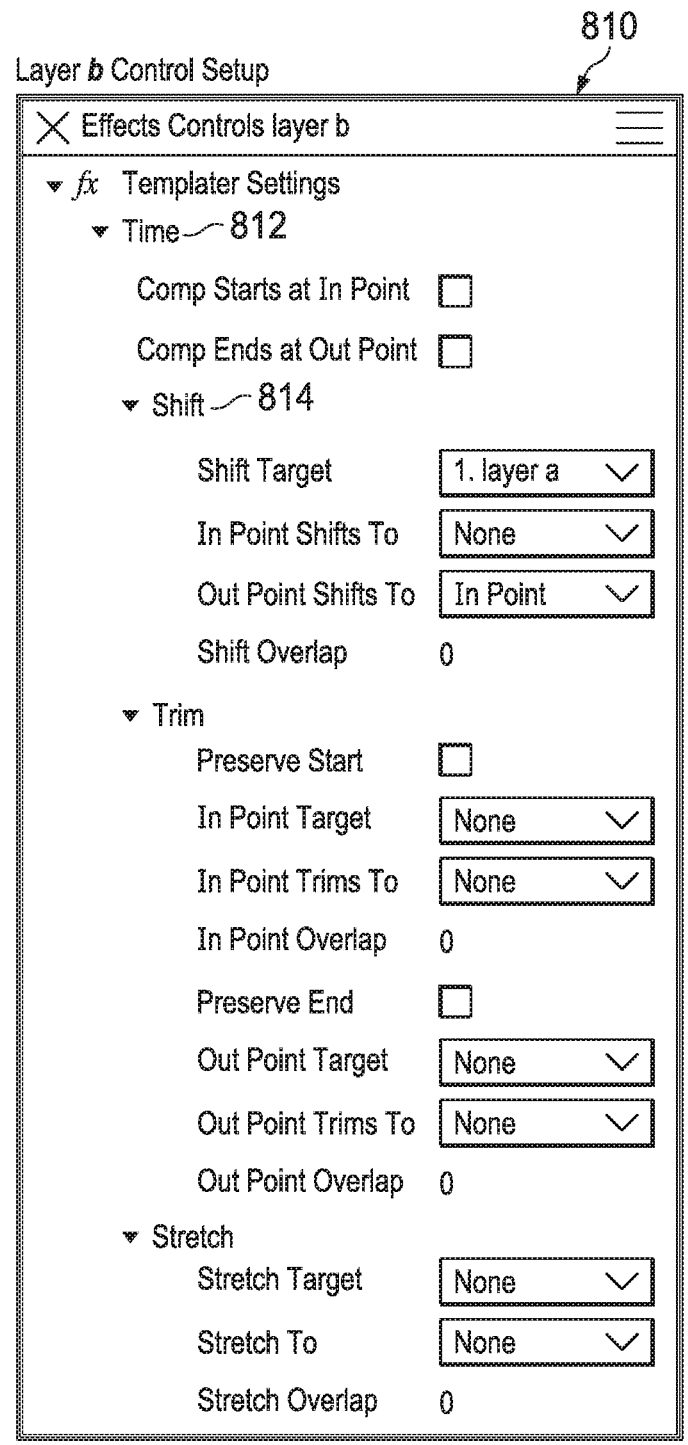

Now looking at FIG. 8A, a block diagram depicting one embodiment of an interface for allowing a user to define an "out-point shifts to in-point" rule is shown. Such a rule may specify that when a layer (here layer b) changes duration, that layer's out-point will shift to the same position in time as a target layer's (here layer a) in-point. Thus, such an interface may be presented by a temporal sculpting module when a user is defining effects for layer b in a digital compositing platform. In particular, interface 810 may allow a user to specify control parameters for a layer (the "controlled layer", here layer b). Interface 810 provides a time menu 812 for the controlled layer including controls allowing a user to define one or more time-sculpting rules with respect to that layer. This time menu may include shift menu 814 where the shift target (e.g. here layer a) may be specified, along with the rule that the out-point for the controlled layer (layer b) should be shifted to the in-point of the target layer (layer a).

FIG. 8B is a block diagram depicting one embodiment of the effect of applying an out-point shifts to in-point rule as defined in FIG. 8A to the controlled layer (layer b). Composition 860*a* depicts an initial state of the composition 860. Initially then, layer a 870 is composited atop layer b 880 and layer b 880 has a first source of content. Composition 860*b* depicts a state of composition 860 after the source of content of layer b 880 changes, before the application of the out-point shifts to in-point rule defined for layer b 880. Composition 860*c* depicts the state of the composition 860 after the application of the in-point shifts to in-point rule defined in FIG. 8A. Thus, for example, a rules engine of a temporal sculpting module may evaluate the rules associated with composition 860 as defined in the project for the composition when the source of content for layer b 880 changes, and apply the out-point shifts to in-point rule specified for layer b 880 in the project for composition 860 (e.g., by changing the data associated with layer b 880 in the project). Notice here that the application of the out-point shifts to in-point rule shifts the in-point of layer b 880 and the out-point of layer b by the same amount of time to cause the out-point of layer b 880 to reach (e.g., be the same point in time in the composition as) layer a's in-point.

Figure 9A:
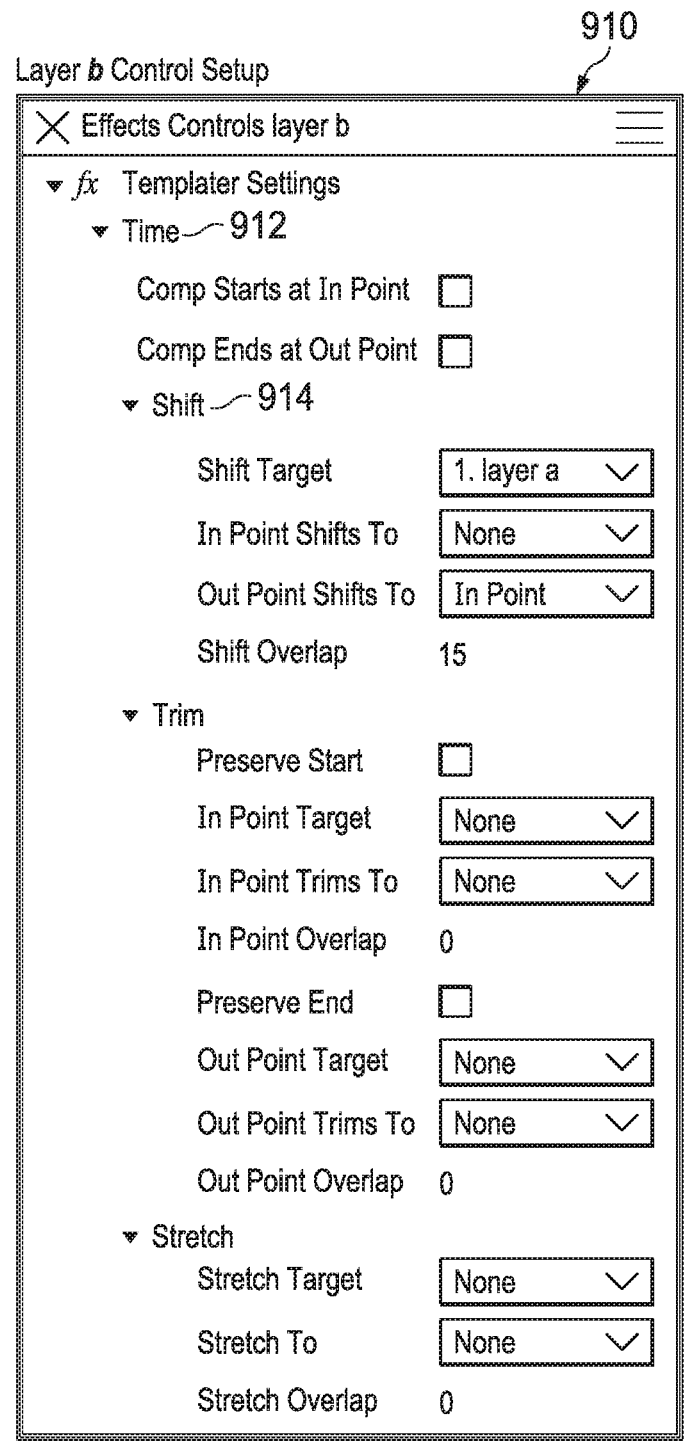

FIG. 9A is a block diagram depicting one embodiment of an interface for allowing a user to define an "out-point shifts to In-point with overlap" rule is shown. Such a rule may specify that when a layer (here layer b) changes duration, that layer's out-point will shift to the same position in time as a target layer's (here layer a) in-point plus some amount of frames. Such an interface may be presented by a temporal sculpting module when a user is defining effects for layer b in a digital compositing platform. Interface 910 may allow a user to specify control parameters for the controlled layer (here layer b) by providing a time menu 912 for the controlled layer including controls allowing a user to define one or more time-sculpting rules with respect to that layer. This time menu 912 may include shift menu 914 where the shift target (e.g. here layer a) may be specified, along with the rule that the out-point for the controlled layer (layer b) should be shifted to the in-point of the target layer (layer a) with an overlap of a certain number of frames (here 15).

FIG. 9B is a block diagram depicting one embodiment of the effect of applying an in-point shifts to in-point rule plus overlap as defined in FIG. 9A to the controlled layer (layer b). Composition 960*a* depicts an initial state of the composition 960. Initially then, layer a 970 is composited atop layer b 980 and layer b 980 has a first source of content. Composition 960*b* depicts a state of composition 960 after the source of content of layer b 980 changes, before the application of the out-point shifts to in-point with overlap rule defined for layer b 980. Composition 960*c* depicts the state of the composition 960 after the application of the out-point shifts to in-point rule with overlap defined in FIG. 9A. Thus, for example, a rules engine of a temporal sculpting module may evaluate the rules associated with composition 960 as defined in the project for the composition when the source of content for layer a 970 changes, and apply the out-point shifts to in-point with overlap rule specified for layer b 980 in the project for composition 960 (e.g., by changing the data associated with layer b 980 in the project). Notice here that the application of the out-point shifts to in-point with overlap rule shifts the in-point of layer b 980 and the out-point of layer b by the same amount of time to cause the out-point of layer b 980 to be a point in time in the composition defined by layer a's in-point plus the number of frames specified as the overlap (e.g., in this example 15 frames).

Figure 10A:
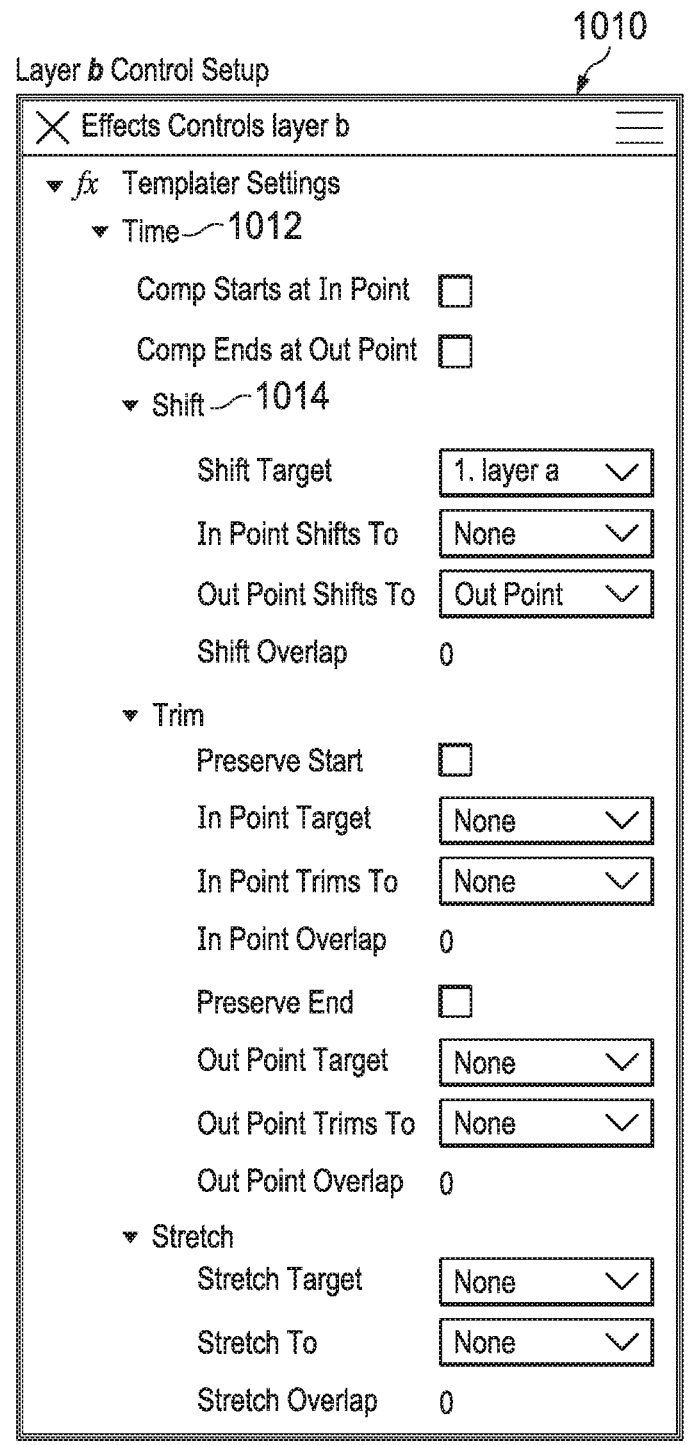

Referring to FIG. 10A now, a block diagram depicting one embodiment of an interface for allowing a user to define an "out-point shifts to out-point" rule is shown. Such a rule may specify that when a target layer (here layer a) changes duration, the control layer's out-point will shift to the same position in time as the target layer's (here layer a) out-point. Thus, such an interface may be presented by a temporal sculpting module when a user is defining effects for layer b in a digital compositing platform. In particular, interface 1010 may allow a user to specify control parameters for the controlled layer (here layer b). Interface 1010 provides a time menu 1012 for the controlled layer including controls allowing a user to define one or more time-sculpting rules with respect to that layer. This time menu may include shift menu 1014 where the shift target (e.g. here layer a) may be specified, along with the rule that the out-point for the controlled layer (layer b) should be shifted to the out-point of the target layer (layer a).

FIG. 10B is a block diagram depicting one embodiment of the effect of applying an out-point shifts to out-point rule as defined in FIG. 10A to the controlled layer (layer b). Composition 1060*a* depicts an initial state of the composition 1060. Initially then, layer a 1070 is composited atop layer b 1080 and layer a 1070 has a first source of content. Composition 1060b depicts a state of composition 1060 after the source of content of layer a 1070 changes, before the application of the out-point shifts to out-point rule defined for layer b 1080. Composition 1060c depicts the state of the composition 1060 after the application of the out-point shifts to out-point rule defined in FIG. 10A. For example, a rules engine of a temporal sculpting module may evaluate the rules associated with composition 1060 as defined in the project for the composition when the source of content for layer a 1070 changes, and apply the out-point shifts to out-point rule specified for layer b 1080 in the project for composition 1060 (e.g., by changing the data associated with layer b 1080 in the project). Notice here that the application of the out-point sifts to out-point rule shifts the in-point of layer b 1080 and the out-point of layer b by the same amount of time to cause the out-point of layer b 1080 to reach (e.g., be the same point in time in the composition as) layer a's out-point.

Figure 11A:
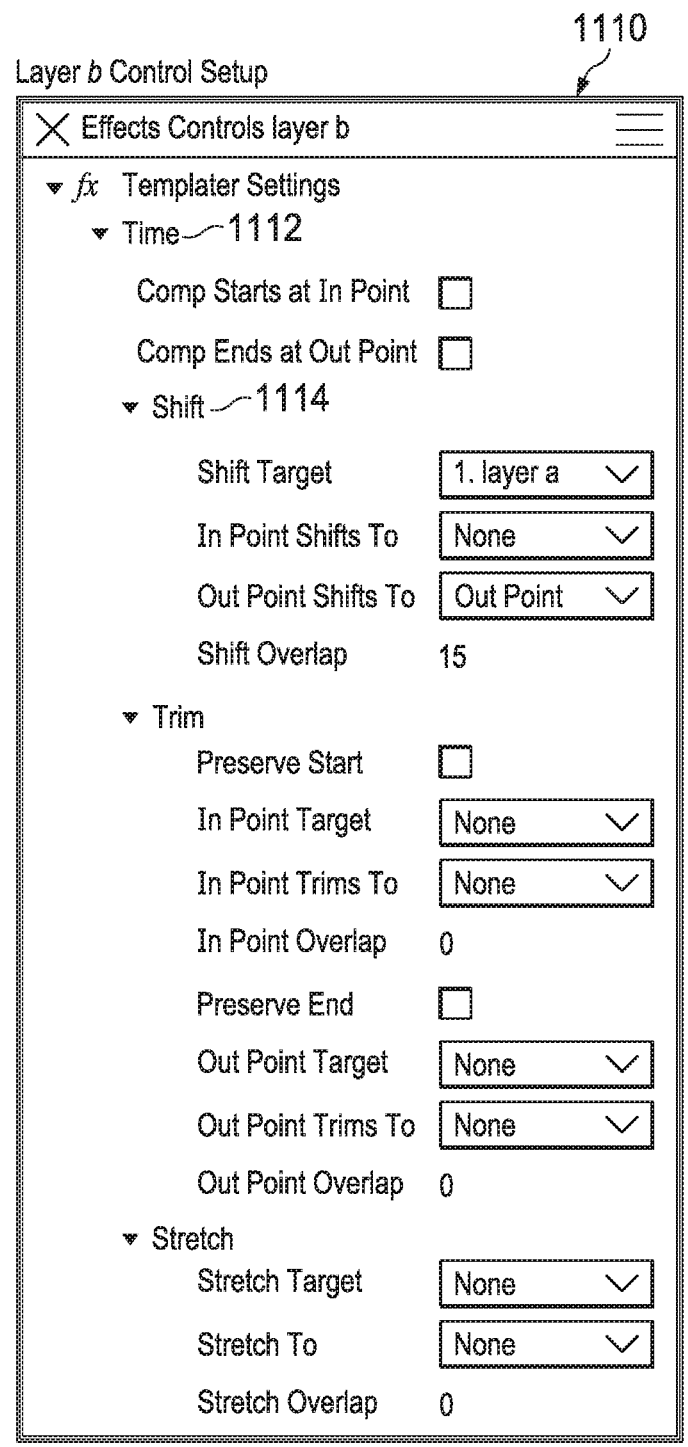

Similarly, in FIG. 11A a block diagram depicting one embodiment of an interface for allowing a user to define an "out-point shifts to out-point with overlap" rule is shown. Such a rule may specify that when a target layer (here layer a) changes duration, a controlled layer's out-point will shift to the same position in time as the target layer's (here layer a) out-point minus (e.g., earlier in time by) some amount of frames. Such an interface may be presented by a temporal sculpting module when a user is defining effects for layer b in a digital compositing platform. Interface 1110 may allow a user to specify control parameters for the controlled layer (here layer b) by providing a time menu 1112 for the controlled layer including controls allowing a user to define one or more time-sculpting rules with respect to that layer. This time menu 1112 may include shift menu 1114 where the shift target (e.g. here layer a) may be specified, along with the rule that the out-point for the controlled layer (layer b) should be shifted to the out-point of the target layer (layer a) minus an overlap of a certain number of frames (here 15).

FIG. 11B is a block diagram depicting one embodiment of the effect of applying an out-point shifts to out-point rule with overlap as defined in FIG. 11A to the controlled layer (layer b). Composition 1160a depicts an initial state of the composition 1160. Initially then, layer a 1170 is composited atop layer b 1180 and layer b 1180 has a first source of content. Composition 1160b depicts a state of composition 1160 after the source of content of layer b 1180 changes, before the application of the out-point shifts to out-point with overlap rule defined for layer b 1180. Composition 1160c depicts the state of the composition 1160 after the application of the out-point shifts to out-point rule with overlap defined in FIG. 11A. For example, a rules engine of a temporal sculpting module may evaluate the rules associated with composition 1160 as defined in the project for the composition when the source of content for layer a 1170 changes, and apply the out-point shifts to out-point with overlap rule specified for layer b 1180 in the project for composition 1160 (e.g., by changing the data associated with layer b 1180 in the project). Notice here that the application of the out-point shifts to out-point with overlap rule shifts the out-point of layer b 1180 and the out-point of layer b 1180 by the same amount of time to cause the out-point of layer b 1180 to be a point in time in the composition defined by layer a's out-point minus the number of frames specified as the overlap (e.g., in this example 15 frames). In other words, the out-point of layer b 1180 may be defined to be the number of overlap frames earlier than the out-point of layer a 1170.

The type of time-sculpting rules discussed above with respect to FIGS. 4A-11B are time shifting rules that allow a layer to be temporally arranged by being moved with respect to a composition's timeline based on a temporal link established with a target point within a target layer such that when a layer is modified (e.g., altered, substituted, swapped, etc.) a layer may be time shifted based on the modified layer. Embodiments herein may also provide trimming rules that allow a layer to be trimmed (e.g., have some content removed, or have a different in-point or out-point). These types of rules may establish a temporal link between a layer and one or more target points in one or more target layers such that when one of the target layers is altered (e.g., to content with a different length) the content of the control layer may be trimmed (e.g., have some content removed or have an in-point or out-point altered) to the target point in the target layer. Embodiments of these types of trimming rules may be better understood with reference to FIGS. 12A-19B.

Figure 12A:
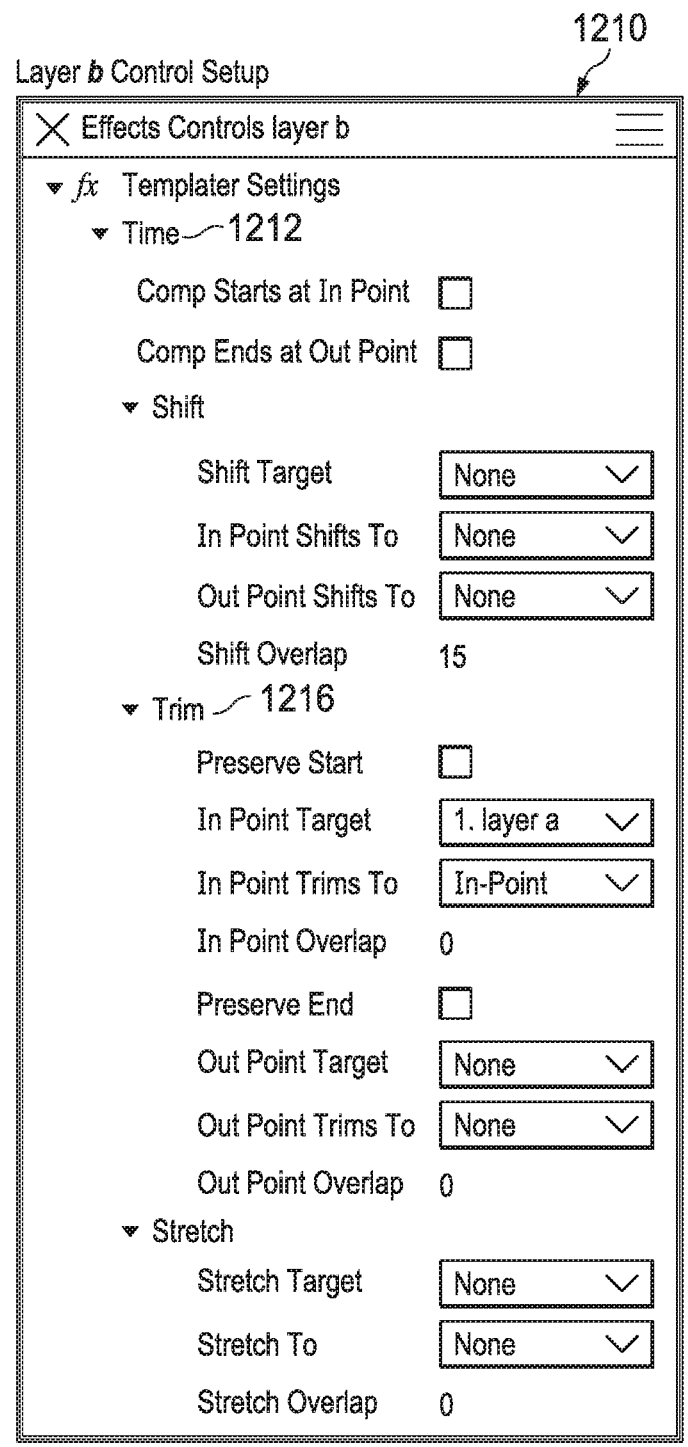

Turning first to FIG. 12A, a block diagram depicting one embodiment of an interface for allowing a user to define an "in-point trims to in-point" rule is shown. Such a rule may specify that when a target layer (here layer a) changes duration (e.g., because the source changes or the content from the source changed), the control layer's (here layer b) in-point will be trimmed to the same position in time as the target layer's (here layer a) in-point. Thus, such an interface may be presented by a temporal sculpting module when a user is defining effects for a control layer (here layer b) in a digital compositing platform. In particular, interface 1210 may allow a user to specify control parameters for a layer (the "controlled layer", here layer b). Interface 1210 provides a time menu 1212 for the controlled layer including controls allowing a user to define one or more time-sculpting rules with respect to that layer. This time menu may include trim menu 1216 where the trim target (e.g. here layer a) may be specified, along with the rule that the in-point for the controlled layer (layer b) should be trimmed to the in-point of the target layer (layer a).

FIG. 12B is a block diagram depicting one embodiment of the effect of applying an in-point trims to in-point rule as defined in FIG. 12A to the controlled layer (layer b). Composition 1260a depicts an initial state of the composition 1260. Initially then, layer a 1270 is composited atop layer b 1280 and layer a 1270 has a first source of content. Composition 1260b depicts a state of composition 1260 after the source of content of layer a 1270 changes, before the application of the in-point trims to in-point rule defined for layer b 1280. Composition 1260c depicts the state of the composition 1260 after the application of the in-point trims to in-point rule defined in FIG. 12A. Thus, for example, a rules engine of a temporal sculpting module may evaluate the rules associated with composition 1260 as defined in the project for the composition when the source of content for layer a 1270 changes, and apply the in-point trims to in-point rule specified for layer b 1280 in the project for composition 1260 (e.g., by changing the data associated with layer b 1280 in the project). Notice here that the application of the in-point trims to in-point rule shifts the in-point of layer b 1280 to cause the in-point of layer b 1280 to match (e.g., be the same point in time in the composition as) layer a's in-point. Notice as well, in contrast with an in-point shift to in-point rules as described above with respect to FIGS. 4A and 4B, that here layer b 1280 has NOT shifted in time (e.g., the start point and end point of layer b 1280 are still at the same point in time relative to the composition 1260), the in-point of layer b 1280 has just been moved to match the in-point of layer a 1270 (which has trimmed layer b 1280 by leaving a portion 1282 of layer b 1280 that will not be displayed in composition 1260 when rendered).

Figure 13A:
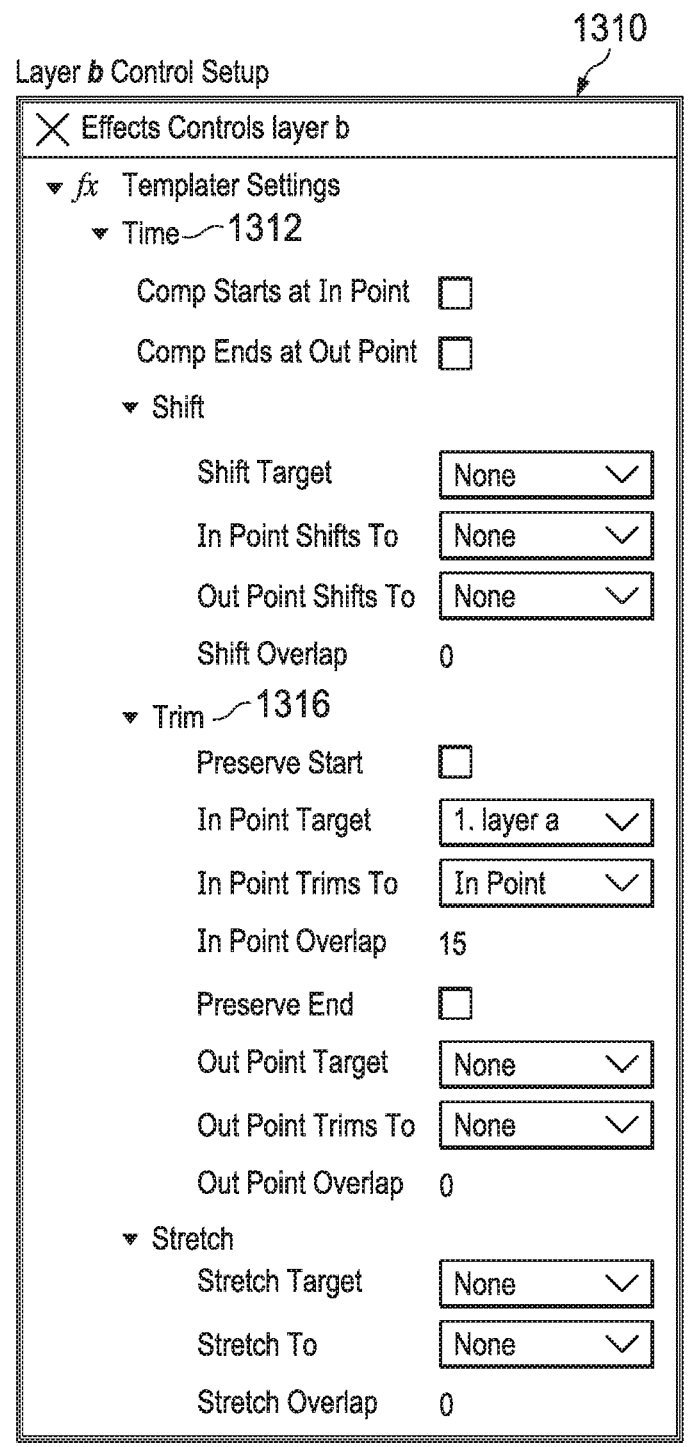

Similarly, in FIG. 13A, a block diagram depicting one embodiment of an interface for allowing a user to define an "in-point trims to in-point with overlap" rule is shown. Such a rule may specify that when a target layer (here layer a) changes duration (e.g., because the source changes or the content from the source changed), the control layer's (here layer b) in-point will be trimmed to the same position in time as the target layer's (here layer a) in-point plus (e.g., later in time) some amount of frames. Such an interface may be presented by a temporal sculpting module when a user is defining effects for a control layer (here layer b) in a digital compositing platform. In particular, interface 1310 may allow a user to specify control parameters for the control layer (here layer b). Interface 1310 provides a time menu 1312 for the controlled layer including controls allowing a user to define one or more time-sculpting rules with respect to that layer. This time menu may include trim menu 1316 where the trim target (e.g. here layer a) may be specified, along with the rule that the in-point for the controlled layer (layer b) should be trimmed to the in-point of the target layer (layer a) plus an overlap of a certain number of frames (here 15).

FIG. 13B is a block diagram depicting one embodiment of the effect of applying an in-point trims to in-point rule with overlap as defined in FIG. 13A to the controlled layer (layer b). Composition 1360a depicts an initial state of the composition 1360. Initially then, layer a 1370 is composited atop layer b 1380 and layer a 1370 has a first source of content. Composition 1360b depicts a state of composition 1360 after the source of content of layer a 1370 changes, before the application of the in-point trims to in-point rule plus overlap defined for layer b 1380. Composition 1360c depicts the state of the composition 1360 after the application of the in-point trims to in-point rule with overlap defined in FIG. 13A. Thus, for example, a rules engine of a temporal sculpting module may evaluate the rules associated with composition 1360 as defined in the project for the composition when the source of content for layer a 1370 changes, and apply the in-point trims to in-point rule with overlap specified for layer b 1380 in the project for composition 1360 (e.g., by changing the data associated with layer b 1380 in the project).

Notice here that the application of the in-point trims to in-point with overlap rule shifts the in-point of layer b 1380 to cause the in-point of layer b 1380 to match (e.g., be the same point in time in the composition as) layer a's in-point plus a number of frames (here 15). Notice as well, that the in-point of layer b has just been moved to match the in-point of layer a 1370 plus the overlap number of frames (e.g., 15); layer b 1380 has not shifted. Accordingly, layer b 1380 has been trimmed by leaving a portion 1382 of layer b 1380 that will not be displayed in composition 1360 when rendered. When comparing with the application of an in-point trims to in-point rule in a similar composition containing similar layers as depicted in FIG. 12B, this portion 1382 has increased by the overlap number of frames (e.g., 15).

Figure 14A:
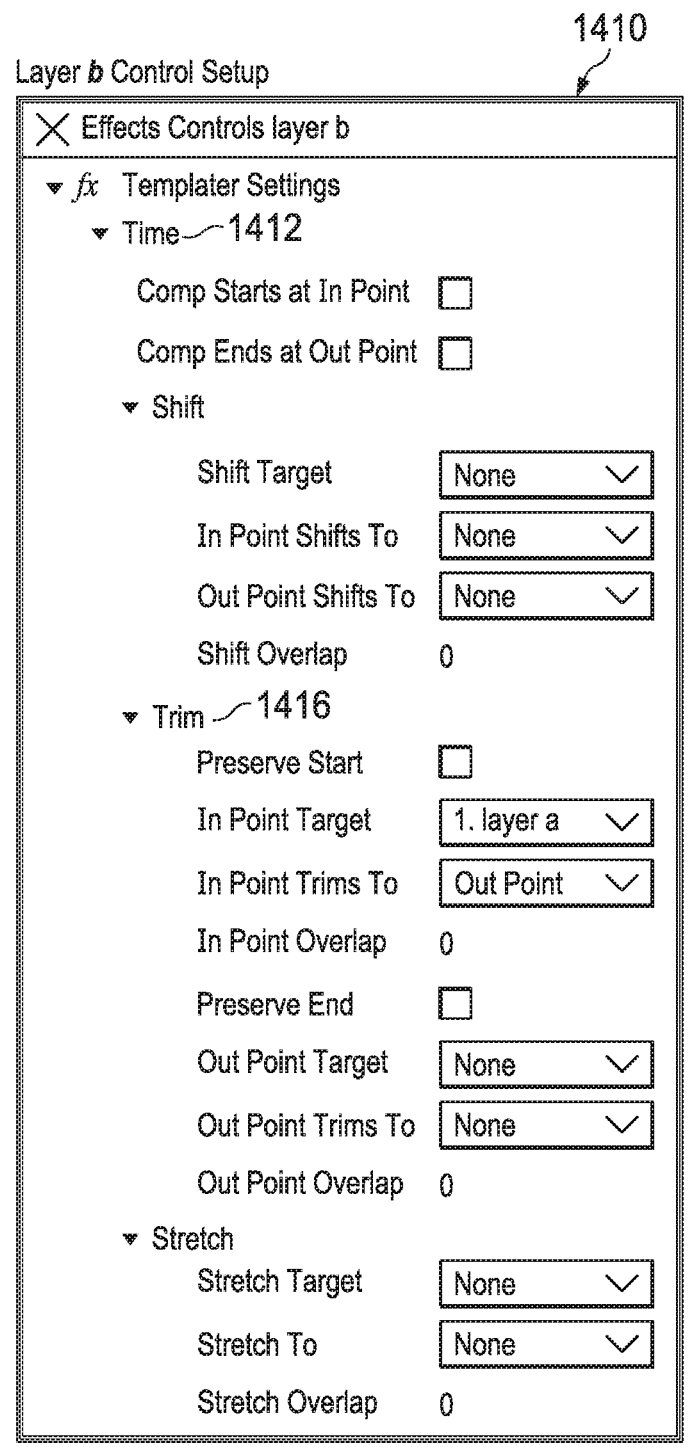

Moving to FIG. 14A, a block diagram depicting one embodiment of an interface for allowing a user to define an "in-point trims to out-point" rule is shown. Such a rule may specify that when a target layer (here layer a) changes duration (e.g., because the source changes or the content from the source changed), the control layer's (here layer b) in-point will be trimmed to the same position in time as the target layer's (here layer a) out-point. Thus, such an interface may be presented by a temporal sculpting module when a user is defining effects for a control layer (here layer b) in a digital compositing platform. In particular, interface 1410 may allow a user to specify control parameters for a layer (the "controlled layer", here layer b). Interface 1410 provides a time menu 1412 for the controlled layer including controls allowing a user to define one or more time-sculpting rules with respect to that layer. This time menu may include trim menu 1416 where the trim target (e.g. here layer a) may be specified, along with the rule that the in-point for the controlled layer (layer b) should be trimmed to the out-point of the target layer (layer a).

FIG. 14B is a block diagram depicting one embodiment of the effect of applying an in-point trims to out-point rule as defined in FIG. 14A to the controlled layer (layer b). Composition 1460a depicts an initial state of the composition 1460. Initially then, layer a 1470 is composited atop layer b 1480 and layer a 1470 has a first source of content. Composition 1460b depicts a state of composition 1460 after the source of content of layer a 1470 changes, before the application of the in-point trims to out-point rule defined for layer b 1480. Composition 1460c depicts the state of the composition 1460 after the application of the in-point trims to out-point rule defined in FIG. 14A. Thus, for example, a rules engine of a temporal sculpting module may evaluate the rules associated with composition 1460 as defined in the project for the composition when the source of content for layer a 1470 changes, and apply the in-point trims to out-point rule specified for layer b 1480 in the project for composition 1460 (e.g., by changing the data associated with layer b 1480 in the project). Notice here that the application of the in-point trims to out-point rule shifts the in-point of layer b 1480 to cause the in-point of layer b 1480 to match (e.g., be the same point in time in the composition as) layer a's out-point. Notice as well, in contrast with an in-point shift to out-point rules as described above with respect to FIGS. 6A and 6B, that here layer b 1480 has NOT shifted in time (e.g., the start point and end point of layer b 1480 are still at the same point in time relative to the composition 1460), the in-point of layer b 1480 has just been moved to match the in-point of layer a 1470 (which has trimmed layer b 1480 by leaving a portion 1482 of layer b 1480 that will not be displayed in composition 1460 when rendered).

Figure 15A:
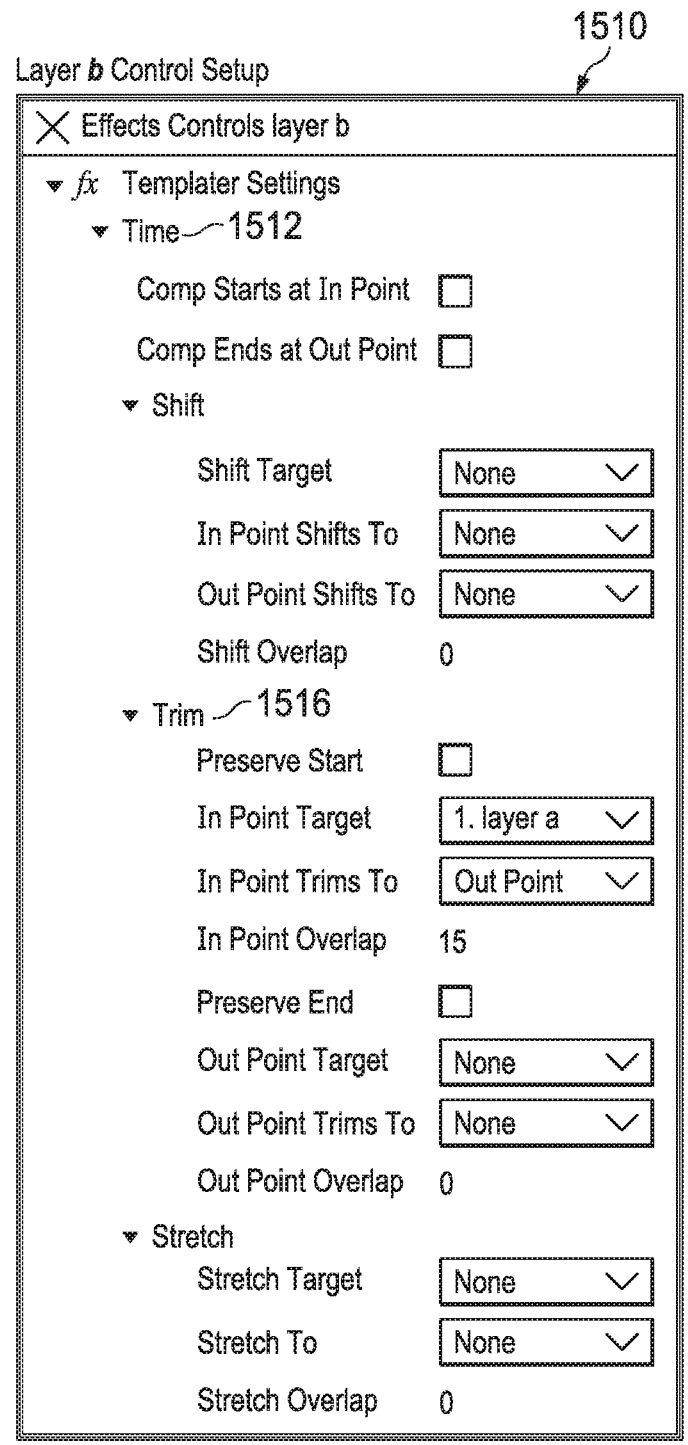

FIG. 15A depicts a block diagram of one embodiment of an interface for allowing a user to define an "in-point trims to out-point with overlap" rule is shown. Such a rule may specify that when a target layer (here layer a) changes duration the control layer's (here layer b) in-point will be trimmed to the same position in time as the target layer's (here layer a) out-point minus (e.g., earlier in time) some amount of frames. Such an interface may be presented by a temporal sculpting module when a user is defining effects for a control layer (here layer b) in a digital compositing platform. In particular, interface 1510 may allow a user to specify control parameters for the control layer (here layer b). Interface 1510 provides a time menu 1512 for the controlled layer including controls allowing a user to define one or more time-sculpting rules with respect to that layer. This time menu may include trim menu 1516 where the trim target (e.g. here layer a) may be specified, along with the rule that the in-point for the controlled layer (layer b) should be trimmed to the out-point of the target layer (layer a) minus an overlap of a certain number of frames (here 15).

FIG. 15B is a block diagram depicting one embodiment of the effect of applying an in-point trims to out-point rule with overlap as defined in FIG. 15A to the controlled layer (layer b). Composition 1560a depicts an initial state of the composition 1560. Initially then, layer a 1570 is composited atop layer b 1580 and layer a 1570 has a first source of content. Composition 1560b depicts a state of composition 1560 after the source of content of layer a 1570 changes, before the application of the in-point trims to out-point rule defined for layer b 1580. Composition 1560c depicts the state of the composition 1560 after the application of the in-point trims to out-point rule with overlap defined in FIG. 15A. Thus, for example, a rules engine of a temporal sculpting module may evaluate the rules associated with composition 1560 as defined in the project for the composition when the source of content for layer a 1570 changes, and apply the in-point trims to out-point rule with overlap specified for layer b 1580 in the project for composition 1560 (e.g., by changing the data associated with layer b 1580 in the project).

Notice here that the application of the in-point trims to out-point with overlap rule shifts the in-point of layer b 1580 to cause the in-point of layer b 1580 to match (e.g., be the same point in time in the composition as) layer a's out-point minus a number of frames (here 15). Notice as well, that the in-point of layer b has just been moved to match the out-point of layer a 1570 plus the overlap number of frames (e.g., 15); layer b 1580 has not shifted. Accordingly, layer b 1580 has been trimmed by leaving a portion 1582 of layer b 1580 that will not be displayed in composition 1560 when rendered. When comparing with the application of an in-point trims to out-point rule in a similar composition containing similar layers as depicted in FIG. 14B, this portion 1582 has decreased by the overlap number of frames (e.g., 15).

Figure 16A:
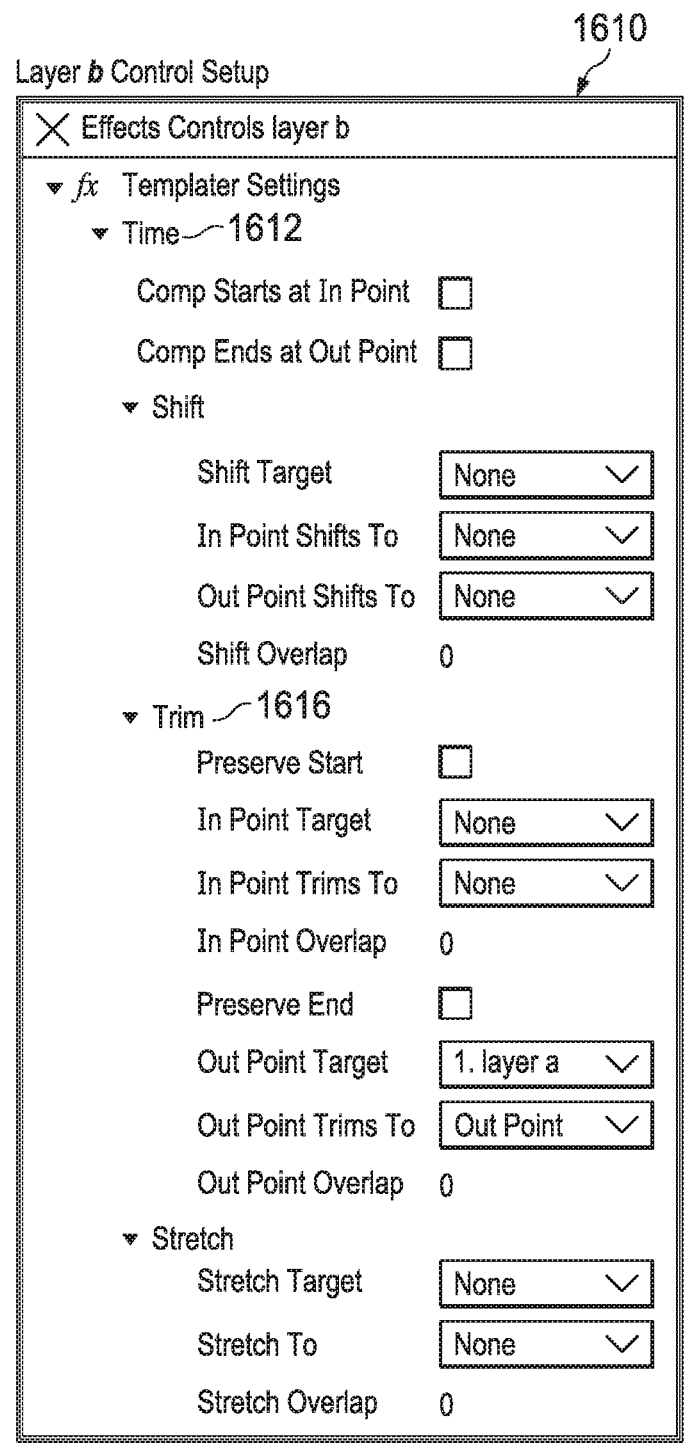

In FIG. 16A, a block diagram depicting one embodiment of an interface for allowing a user to define an "out-point trims to out-point" rule is shown. Such a rule may specify that when a target layer (here layer a) changes duration (e.g., because the source changes or the content from the source changed), the control layer's (here layer b) out-point will be trimmed to the same position in time as the target layer's (here layer a) out-point. Thus, such an interface may be presented by a temporal sculpting module when a user is defining effects for a control layer (here layer b) in a digital compositing platform. In particular, interface 1610 may allow a user to specify control parameters for a layer (the "controlled layer", here layer b). Interface 1610 provides a time menu 1612 for the controlled layer including controls allowing a user to define one or more time-sculpting rules with respect to that layer. This time menu may include trim menu 1616 where the trim target (e.g. here layer a) may be specified, along with the rule that the out-point for the controlled layer (layer b) should be trimmed to the out-point of the target layer (layer a).

Figure 16B:
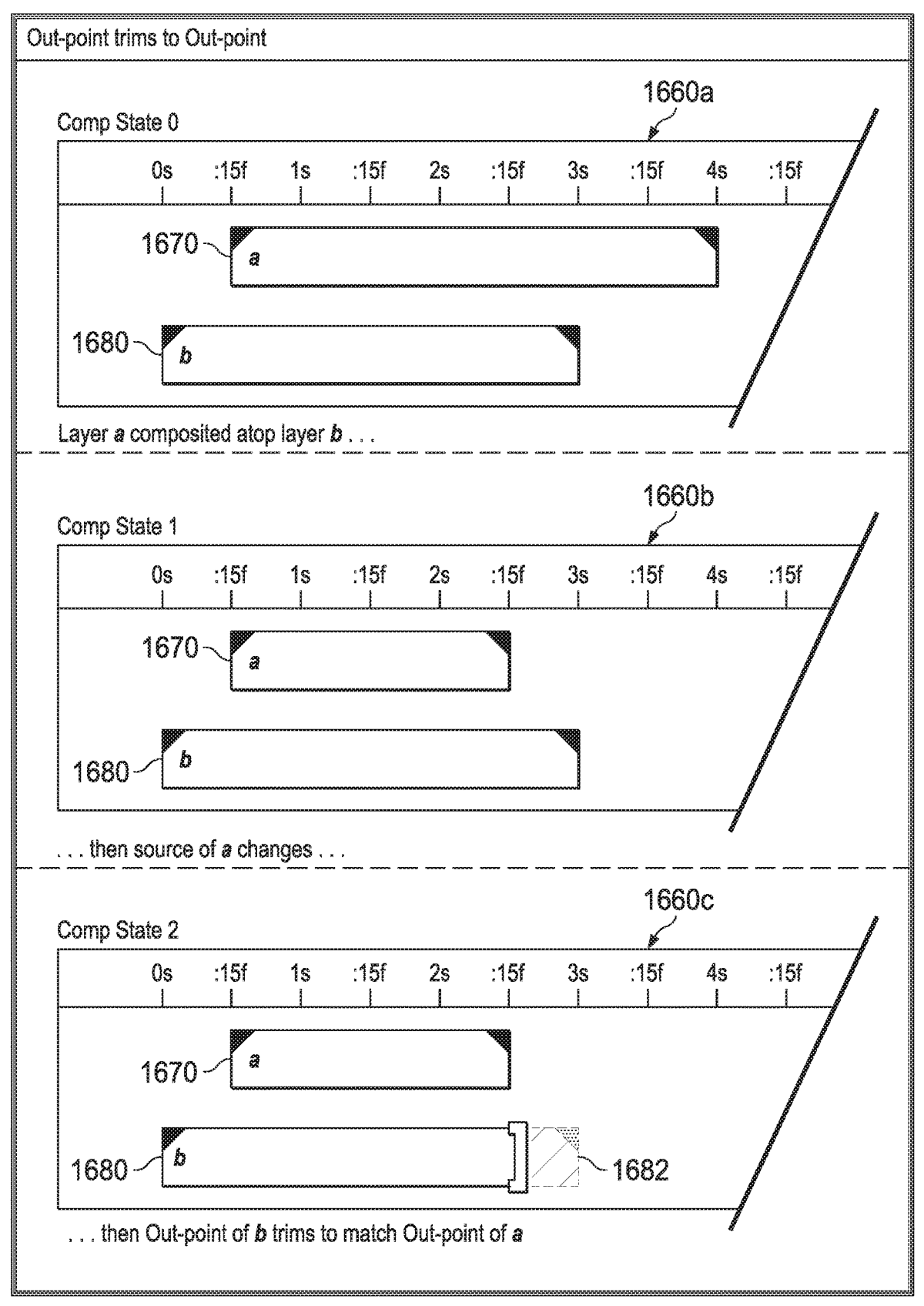

FIG. 16B is a block diagram depicting one embodiment of the effect of applying an out-point trims to out-point rule as defined in FIG. 16A to the controlled layer (layer b). Composition 1660a depicts an initial state of the composition 1660. Initially then, layer a 1670 is composited atop layer b 1680 and layer a 1670 has a first source of content. Composition 1660b depicts a state of composition 1660 after the source of content of layer a 1670 changes, before the application of the out-point trims to out-point rule defined for layer b 1680. Composition 1660c depicts the state of the composition 1660 after the application of the out-point trims to out-point rule defined in FIG. 16A. Thus, for example, a rules engine of a temporal sculpting module may evaluate the rules associated with composition 1660 as defined in the project for the composition when the source of content for layer a 1670 changes, and apply the out-point trims to out-point rule specified for layer b 1680 in the project for composition 1660 (e.g., by changing the data associated with layer b 1680 in the project). Notice here that the application of the out-point trims to out-point rule shifts the out-point of layer b 1680 to cause the out-point of layer b 1680 to match (e.g., be the same point in time in the composition as) layer a's out-point. Notice as well, in contrast with an out-point shift to out-point rules as described above with respect to FIGS. 10A and 10B, that here layer b 1680 has NOT shifted in time (e.g., the start point and end point of layer b 1680 are still at the same point in time relative to the composition 1660), the out-point of layer b 1680 has just been moved to match the out-point of layer a 1670 (which has trimmed layer b 1680 by leaving a portion 1682 of layer b 1680 that will not be displayed in composition 1660 when rendered).

Figure 17A:
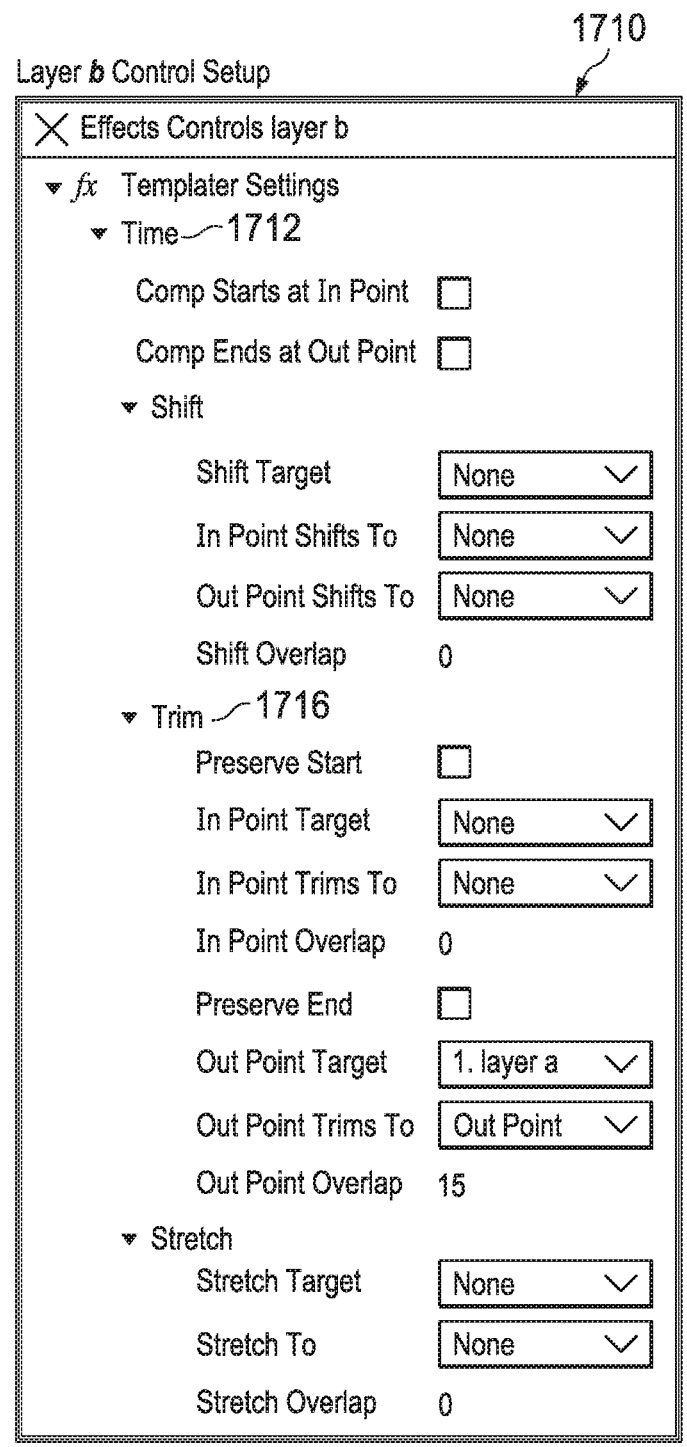

FIG. 17A depicts a block diagram of one embodiment of an interface for allowing a user to define an "out-point trims to out-point with overlap" rule is shown. Such a rule may specify that when a target layer (here layer a) changes duration the control layer's (here layer b) out-point will be trimmed to the same position in time as the target layer's (here layer a) out-point minus (e.g., earlier in time) some amount of frames. Such an interface may be presented by a temporal sculpting module when a user is defining effects for a control layer (here layer b) in a digital compositing platform. In particular, interface 1710 may allow a user to specify control parameters for the control layer (here layer b). Interface 1710 provides a time menu 1712 for the controlled layer including controls allowing a user to define one or more time-sculpting rules with respect to that layer. This time menu may include trim menu 1716 where the trim target (e.g. here layer a) may be specified, along with the rule that the out-point for the controlled layer (layer b) should be trimmed to the out-point of the target layer (layer a) minus an overlap of a certain number of frames (here 15).

FIG. 17B is a block diagram depicting one embodiment of the effect of applying an out-point trims to out-point rule with overlap as defined in FIG. 17A to the controlled layer (layer b). Composition 1760a depicts an initial state of the composition 1760. Initially then, layer a 1770 is composited atop layer b 1780 and layer a 1770 has a first source of content. Composition 1760b depicts a state of composition 1760 after the source of content of layer a 1770 changes, before the application of the out-point trims to out-point rule with overlap defined for layer b 1780. Composition 1760c depicts the state of the composition 1760 after the application of the out-point trims to out-point rule with overlap defined in FIG. 17A. Thus, for example, a rules engine of a temporal sculpting module may evaluate the rules associated with composition 1760 as defined in the project for the composition when the source of content for layer a 1770 changes, and apply the out-point trims to out-point rule with overlap specified for layer b 1780 in the project for composition 1760 (e.g., by changing the data associated with layer b 1780 in the project).

Notice here that the application of the out-point trims to out-point with overlap rule shifts the out-point of layer b 1780 to cause the out-point of layer b 1780 to match (e.g., be the same point in time in the composition as) layer a's out-point minus a number of frames (here 15). Notice as well, that the out-point of layer b has just been moved to match the out-point of layer a 1770 minus the overlap number of frames (e.g., 15); layer b 1780 has not shifted. Accordingly, layer b 1780 has been trimmed by leaving a portion 1782 of layer b 1780 that will not be displayed in composition 1760 when rendered. When comparing with the application of an out-point trims to out-point rule in a similar composition containing similar layers as depicted in FIG. 16B, this portion 1782 has increased by the overlap number of frames (e.g., 15).

Figure 18A:
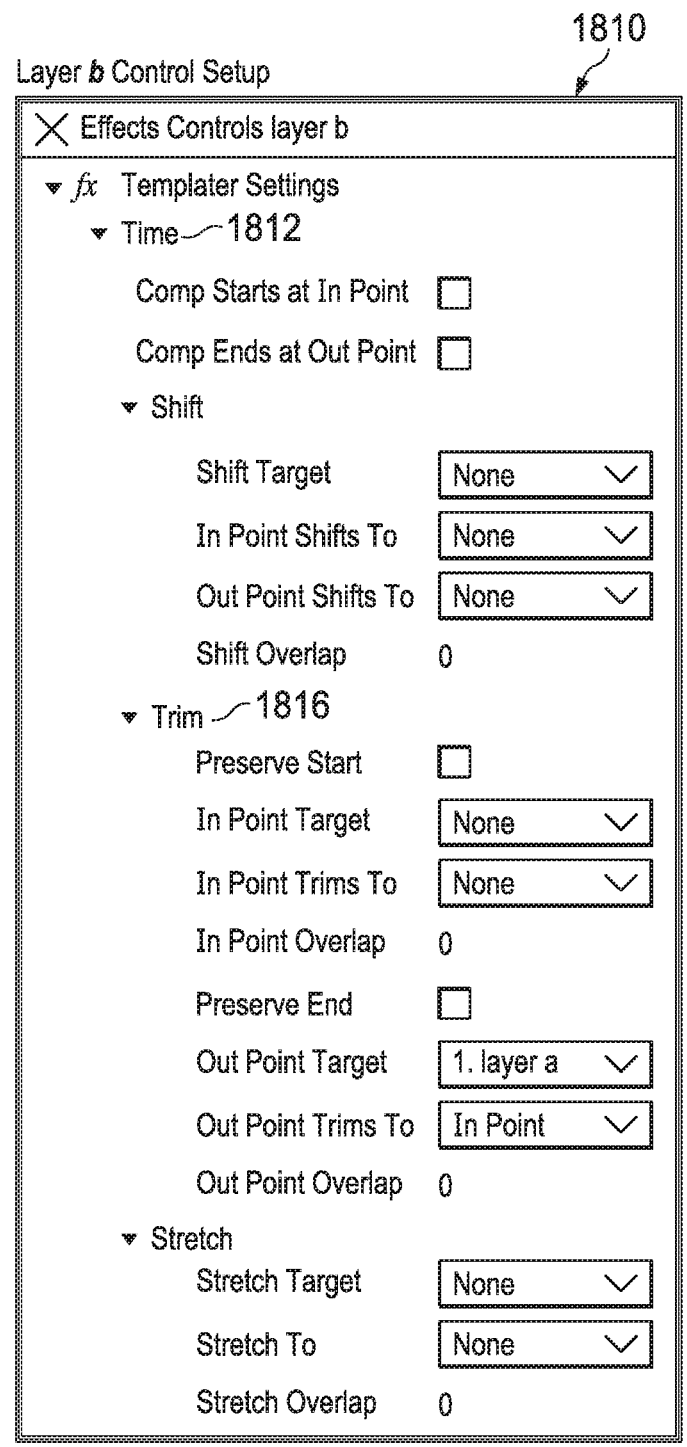

FIG. 18A is a block diagram depicting one embodiment of an interface for allowing a user to define an "out-point trims to in-point" rule. Such a rule may specify that when a target layer (here layer a) changes duration (e.g., because the source changes or the content from the source changed), the control layer's (here layer b) out-point will be trimmed to the same position in time as the target layer's (here layer a) in-point. Thus, such an interface may be presented by a temporal sculpting module when a user is defining effects for a control layer (here layer b) in a digital compositing platform. In particular, interface 1810 may allow a user to specify control parameters for a layer (the "controlled layer", here layer b). Interface 1810 provides a time menu 1812 for the controlled layer including controls allowing a user to define one or more time-sculpting rules with respect to that layer. This time menu may include trim menu 1816 where the trim target (e.g. here layer a) may be specified, along with the rule that the out-point for the controlled layer (layer b) should be trimmed to the in-point of the target layer (layer a).

FIG. 18B is a block diagram depicting one embodiment of the effect of applying an out-point trims to in-point rule as defined in FIG. 18A to the controlled layer (layer b). Composition 1860a depicts an initial state of the composition 1860. Initially then, layer a 1870 is composited atop layer b 1880 and layer a 1870 has a first source of content. Composition 1860b depicts a state of composition 1860 after the source of content of layer a 1870 changes, before the application of the out-point trims to in-point rule defined for layer b 1880. Composition 1860c depicts the state of the composition 1860 after the application of the out-point trims to in-point rule defined in FIG. 18A. Thus, for example, a rules engine of a temporal sculpting module may evaluate the rules associated with composition 1860 as defined in the project for the composition when the source of content for layer a 1870 changes, and apply the out-point trims to in-point rule specified for layer b 1880 in the project for composition 1860 (e.g., by changing the data associated with layer b 1880 in the project). Notice here that the application of the out-point trims to in-point rule shifts the out-point of layer b 1860 to cause the out-point of layer b 1860 to match (e.g., be the same point in time in the composition as) layer a's in-point. Notice as well, in contrast with an out-point shift to out-point rules as described above with respect to FIGS. 8A and 8B, that here layer b 1880 has NOT shifted in time (e.g., the start point and end point of layer b 1880 are still at the same point in time relative to the composition 1860), the out-point of layer b 1880 has just been moved to match the in-point of layer a 1870 (which has trimmed layer b 1880 by leaving a portion 1882 of layer b 1880 that will not be displayed in composition 1860 when rendered).

Figure 19A:
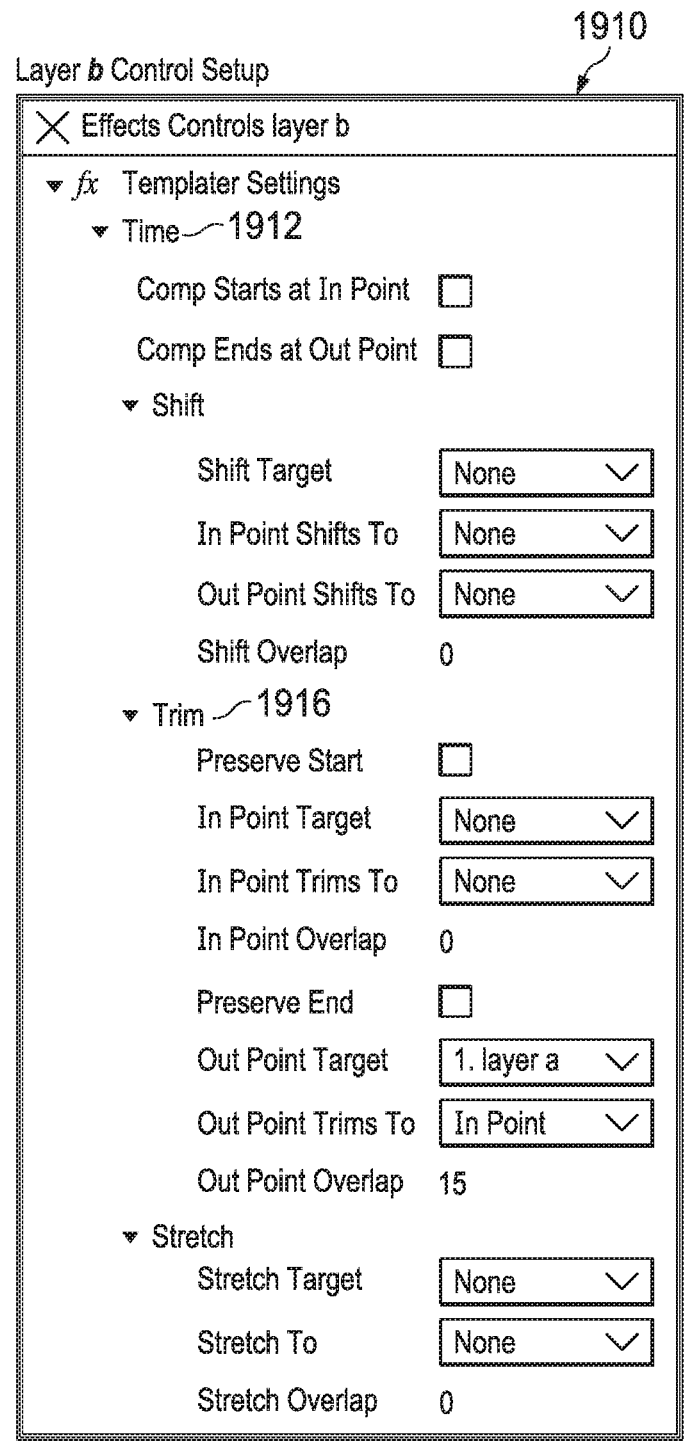

FIG. 19A depicts a block diagram of one embodiment of an interface for allowing a user to define an "out-point trims to in-point with overlap" rule is shown. Such a rule may specify that when a target layer (here layer a) changes duration the control layer's (here layer b) out-point will be trimmed to the same position in time as the target layer's (here layer a) in-point plus (e.g., later in time) some amount of frames. Such an interface may be presented by a temporal sculpting module when a user is defining effects for a control layer (here layer b) in a digital compositing platform. In particular, interface 1910 may allow a user to specify control parameters for the control layer (here layer b). Interface 1910 provides a time menu 1912 for the controlled layer including controls allowing a user to define one or more time-sculpting rules with respect to that layer. This time menu may include trim menu 1916 where the trim target (e.g. here layer a) may be specified, along with the rule that the out-point for the controlled layer (layer b) should be trimmed to the in-point of the target layer (layer a) plus an overlap of a certain number of frames (here 15).

FIG. 19B is a block diagram depicting one embodiment of the effect of applying an out-point trims to in-point rule with overlap as defined in FIG. 19A to the controlled layer (layer b). Composition 1960a depicts an initial state of the composition 1960. Initially then, layer a 1970 is composited atop layer b 1980 and layer a 1970 has a first source of content. Composition 1960b depicts a state of composition 1960 after the source of content of layer a 1970 changes, before the application of the out-point trims to in-point rule with overlap defined for layer b 1980. Composition 1960c depicts the state of the composition 1960 after the application of the out-point trims to in-point rule with overlap defined in FIG. 19A. Thus, for example, a rules engine of a temporal sculpting module may evaluate the rules associated with composition 1960 as defined in the project for the composition when the source of content for layer a 1970 changes, and apply the out-point trims to in-point rule with overlap specified for layer b 1980 in the project for composition 1960 (e.g., by changing the data associated with layer b 1980 in the project).

Notice here that the application of the out-point trims to in-point with overlap rule shifts the out-point of layer b 1980 to cause the out-point of layer b 1980 to match (e.g., be the same point in time in the composition as) layer a's in-point plus a number of frames (here 15). Notice as well, that the out-point of layer b 1980 has just been moved to match the in-point of layer a 1970 plus the overlap number of frames (e.g., 15); layer b 1980 has not shifted. Accordingly, layer b 1980 has been trimmed by leaving a portion 1982 of layer b 1980 that will not be displayed in composition 1960 when rendered. When comparing with the application of an out-point trims to in-point rule in a similar composition containing similar layers as depicted in FIG. 18B, this portion 1982 has decreased by the overlap number of frames (e.g., 15).

The type of time-sculpting rules discussed above with respect to FIGS. 12A-19B are trimming rules that may establish a temporal link between a controlled layer and one or more target points in one or more target layers such that when one of the target layers is altered (e.g., modified or substituted with content of a different length) the control layer may be trimmed (e.g., have some content removed, or an in-point or out-point altered). Embodiments herein may also provide stretching rules that allow a layer to be stretched (e.g., the time of appearance in a composition, or of the layer, lengthened or shortened), for example to make a longer (or shorter) video or the like when the content of the layer includes a video. These types of stretching rules may establish a temporal link between a controlled layer and one or more target points in one or more target layers or a composition such that when a layer is altered (e.g., modified or substituted with content of a different length) the content of the control layer may be lengthened (or shortened). This time stretching (lengthening or shortening) may be accomplished, for example, by changing the playback speed of the content of the control layer in the composition. Embodiments of these types of stretching rules may be better understood with reference to FIGS. 20A-24B.

Figure 20A:
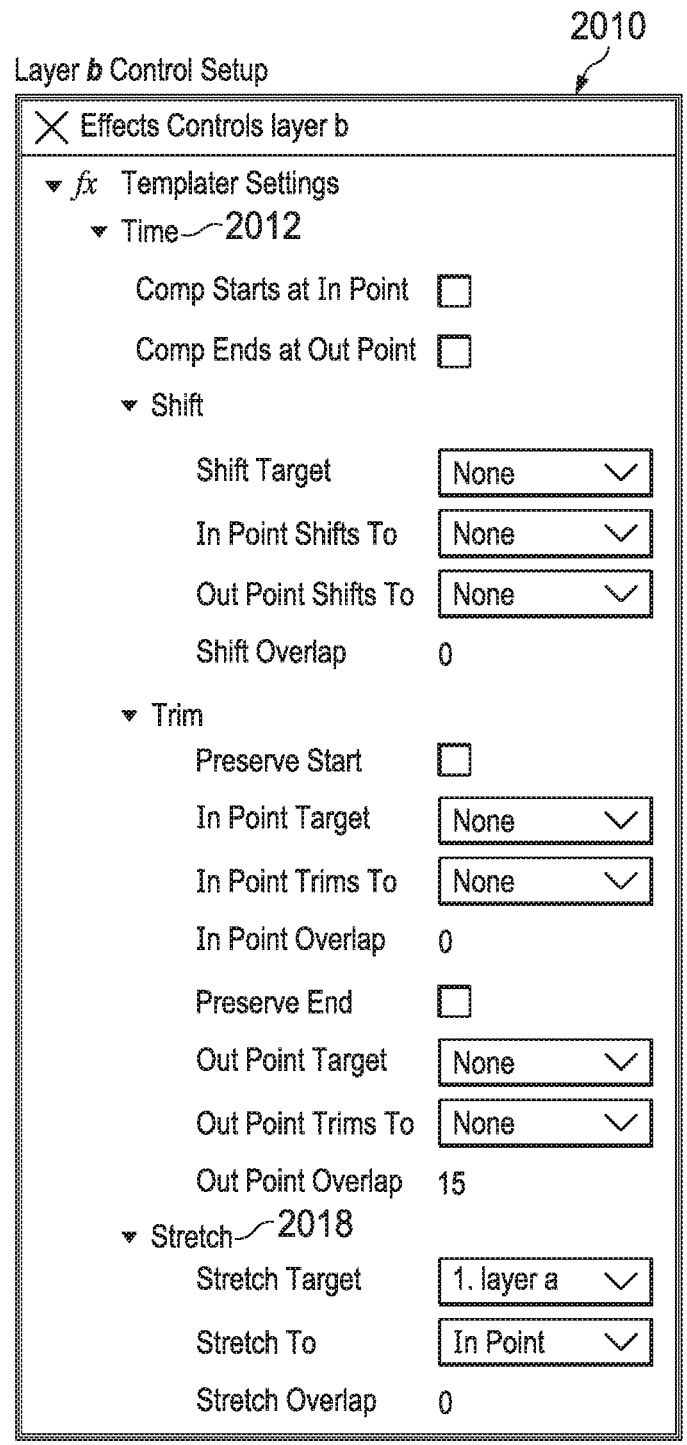
FIGS. 20A-24B are block diagrams depicting embodiments of stretching rules and interfaces for defining such stretching rules.

Looking first then at FIG. 20A, a block diagram depicting one embodiment of an interface for allowing a user to define a "stretch to in-point" rule is shown. Such a rule may specify that when a control layer (here layer b) changes (e.g., because the source changes or the content from the source changed), the control layer's (here layer b) playback speed will be adjusted such that the control layer's (here layer b) out-point will be at the same position in time (relative to the composition) as the target layer's (here layer a) in-point. Thus, such an interface may be presented by a temporal sculpting module when a user is defining effects for a control layer (here layer b) in a digital compositing platform. In particular, interface 2010 may allow a user to specify control parameters for a layer (the "controlled layer", here layer b). Interface 2010 provides a time menu 2012 for the controlled layer including controls allowing a user to define one or more time-sculpting rules with respect to that layer. This time menu may include stretch menu 2018 where the stretch target (e.g. here layer a) may be specified, along with the rule that the controlled layer (layer b) should be stretched to the in-point of the target layer (layer a).

Figure 20B:
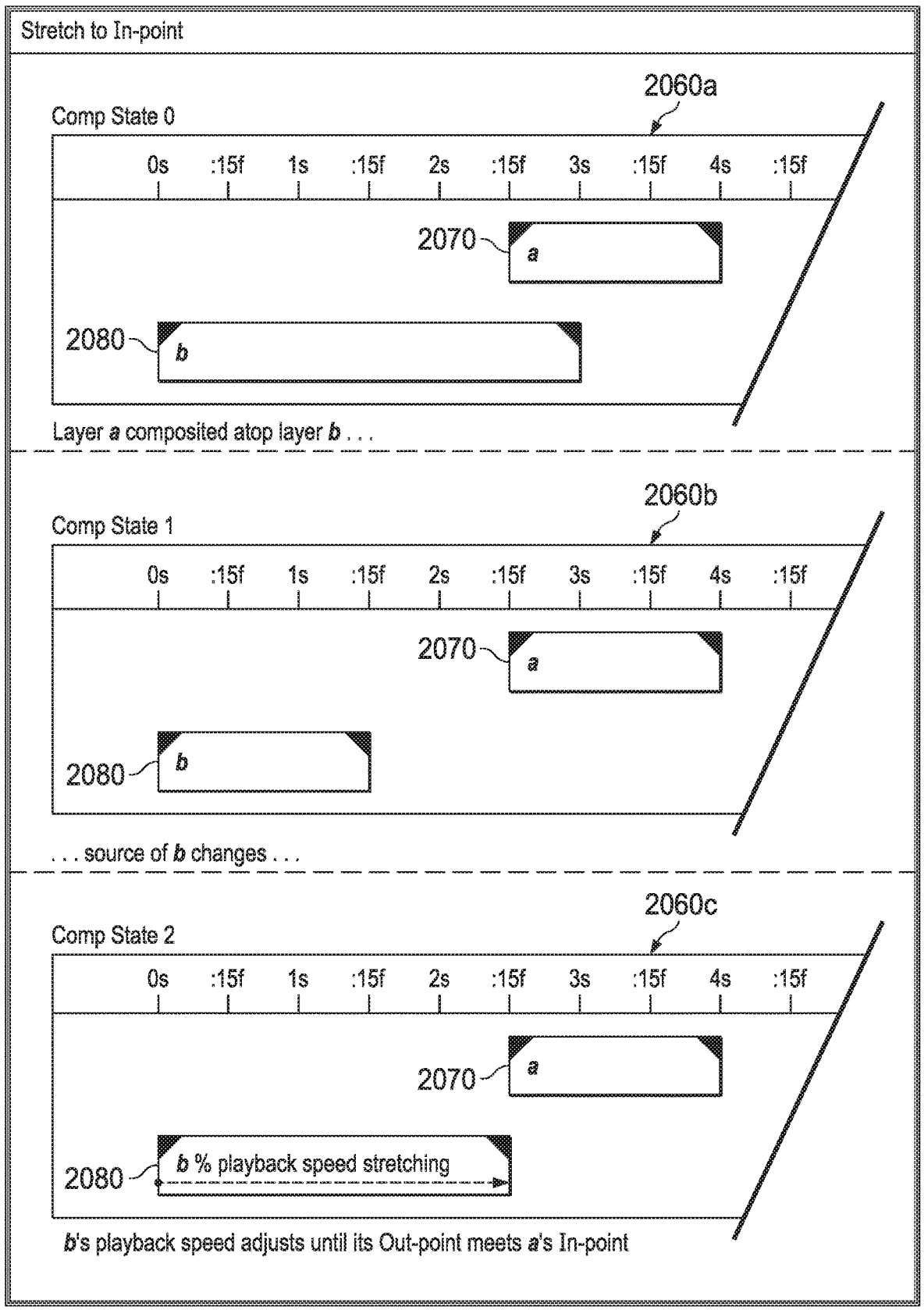

FIG. 20B is a block diagram depicting one embodiment of the effect of applying a stretch to in-point rule as defined in FIG. 20A to the controlled layer (layer b). Composition 2060a depicts an initial state of the composition 2060. Initially then, layer a 2070 is composited atop layer b 2080 and layer b 2080 has a first source of content. Composition 2060b depicts a state of composition 2060 after the source of content of layer b 2080 changes, before the application of the stretch to in-point rule defined for layer b 2080. Composition 2060c depicts the state of the composition 2060 after the application of the stretch to in-point rule defined in FIG. 20A.

Thus, for example, a rules engine of a temporal sculpting module may evaluate the rules associated with composition 2060 as defined in the project for the composition when the source of content for layer b 2080 changes, and apply the stretch to in-point rule specified for layer b 2080 in the project for composition 2060 (e.g., by changing the data associated with layer b 2080 in the project). The application of the rule may entail determining a new playback speed (or playback speed percentage) for layer b 2080 based on, for example, the length of layer b 2080, the in-point of layer b 2080, the in-point of layer a 2070 or other data. The playback speed (or percentage) can be associated with layer b 2080 in the project for the composition. Note that this playback speed (or percentage) may be greater than, or less than, a full or normal speed playback. Notice here that the application of the stretch to in-point rule changes the playback speed of layer b 2080 (if needed) to cause the out-point of layer b 2080 to match (e.g., be the same point in time in the composition as) layer a's in-point.

Figure 21A:
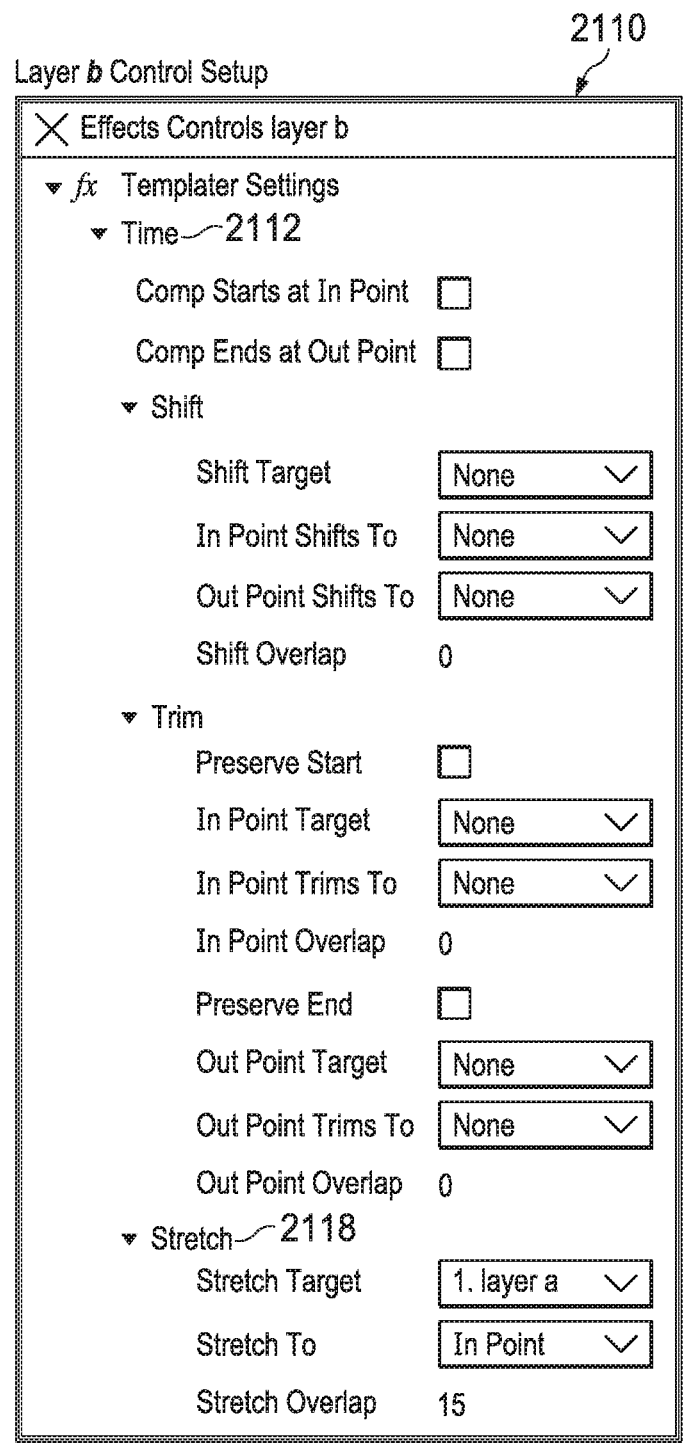

Similarly, in FIG. 21A, a block diagram depicting one embodiment of an interface for allowing a user to define a "stretch to in-point with overlap" rule is shown. Such a rule may specify that when a control layer (here layer b) changes (e.g., because the source changes or the content from the source changed), the control layer's (here layer b) playback speed will be adjusted such that the control layer's (here layer b) out-point will be at the same position in time (relative to the composition) as the target layer's (here layer a) in-point plus (e.g., later in time) some amount of frames. Thus, such an interface may be presented by a temporal sculpting module when a user is defining effects for a control layer (here layer b) in a digital compositing platform. In particular, interface 2110 may allow a user to specify control parameters for a layer (the "controlled layer", here layer b). Interface 2110 provides a time menu 2112 for the controlled layer including controls allowing a user to define one or more time-sculpting rules with respect to that layer. This time menu may include stretch menu 2118 where the stretch target (e.g. here layer a) may be specified, along with the rule that the controlled layer (layer b) should be stretched to the in-point of the target layer (layer a) plus an overlap of a certain number of frames (here 15).

Figure 21B:
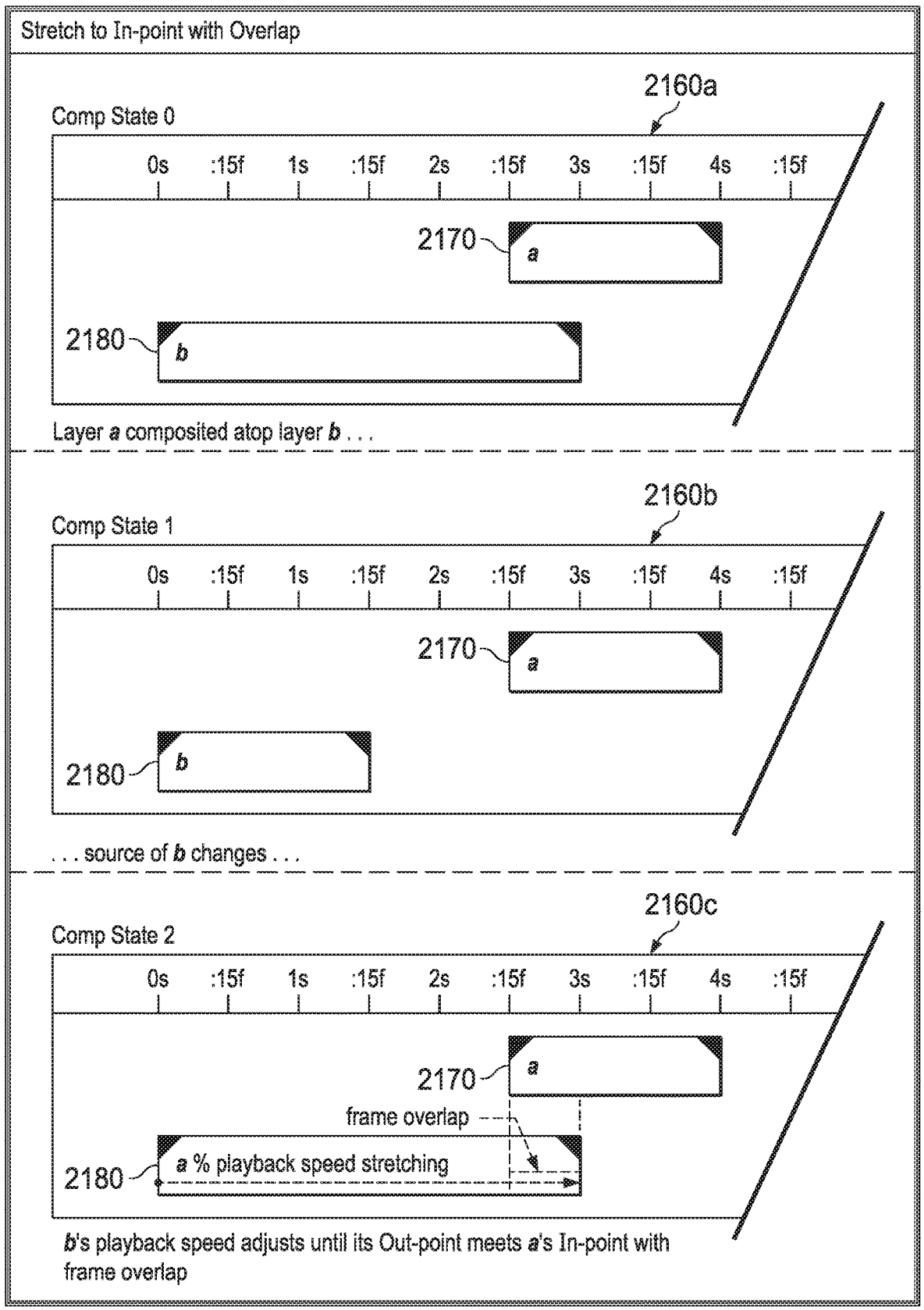

FIG. 21B is a block diagram depicting one embodiment of the effect of applying a stretch to in-point plus overlap rule as defined in FIG. 21A to the controlled layer (layer b). Composition 2160a depicts an initial state of the composition 2160. Initially then, layer a 2170 is composited atop layer b 2180 and layer b 2180 has a first source of content. Composition 2160b depicts a state of composition 2160 after the source of content of layer b 2180 changes, before the application of the stretch to in-point rule defined for layer b 2180. Composition 2160c depicts the state of the composition 2160 after the application of the stretch to in-point plus overlap rule defined in FIG. 21A.

Thus, for example, a rules engine of a temporal sculpting module may evaluate the rules associated with composition 2160 as defined in the project for the composition when the source of content for layer b 2180 changes, and apply the stretch to in-point rule plus overlap specified for layer b 2180 in the project for composition 2160 (e.g., by changing the data associated with layer b 2180 in the project). The application of the rule may entail determining a new playback speed (or playback speed percentage) for layer b 2180 based on, for example, the length of layer b 2180, the in-point of layer b 2180, the in-point of layer a 2170, the number of frames specified for the control layer (here layer b), or other data. The playback speed (or percentage) can be associated with layer b 2180 in the project for the composition. Notice here that the application of the stretch to in-point rule plus overlap changes the playback speed of layer b 2180 (if needed) to cause the out-point of layer b 2180 to match (e.g., be the same point in time in the composition as) layer a's in-point plus the number of frames (here 15).

Figure 22A:
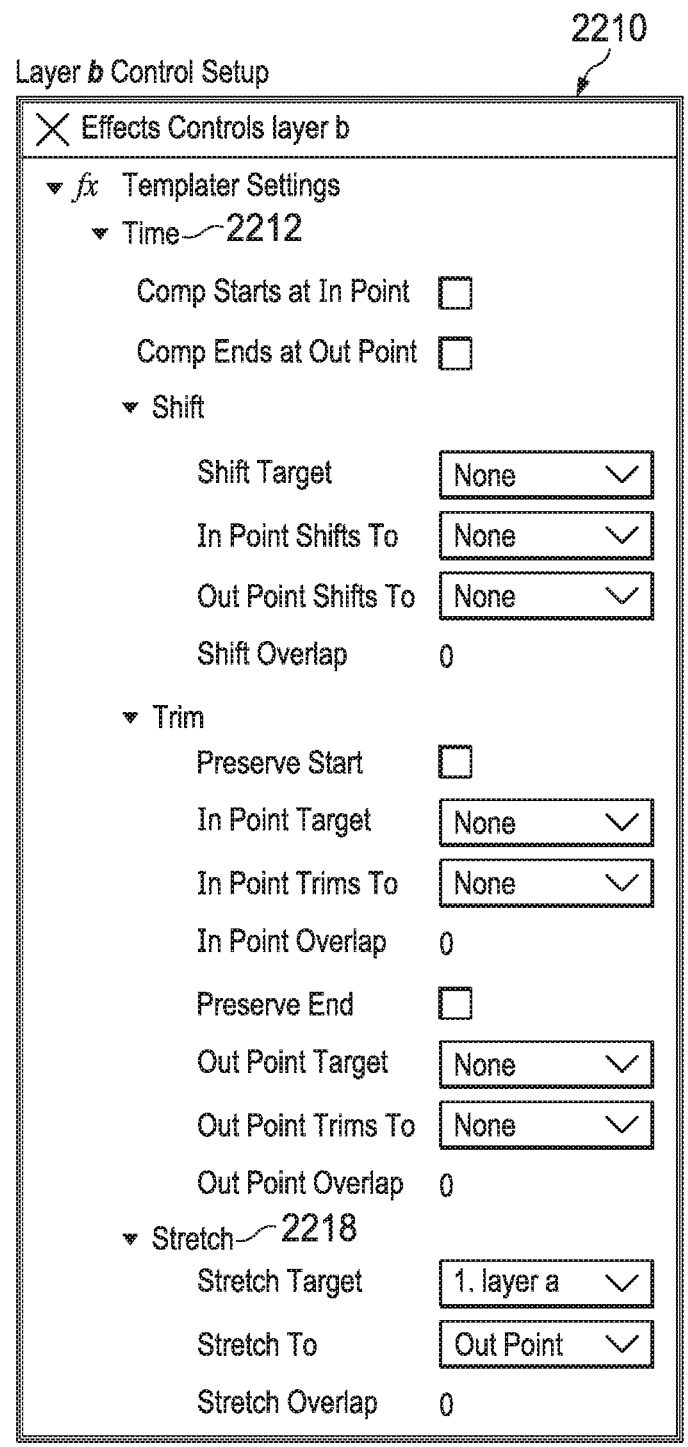

FIG. 22A depicts a block diagram of one embodiment of an interface for allowing a user to define a "stretch to out-point" rule. Such a rule may specify that when a control layer (here layer b) changes (e.g., because the source changes or the content from the source changed), the control layer's (here layer b) playback speed will be adjusted such that the control layer's (here layer b) out-point will be at the same position in time (relative to the composition) as the target layer's (here layer a) out-point. Thus, such an interface may be presented by a temporal sculpting module when a user is defining effects for a control layer (here layer b) in a digital compositing platform. In particular, interface 2210 may allow a user to specify control parameters for a layer (the "controlled layer", here layer b). Interface 2210 provides a time menu 2212 for the controlled layer including controls allowing a user to define one or more time-sculpting rules with respect to that layer. This time menu may include stretch menu 2218 where the stretch target (e.g. here layer a) may be specified, along with the rule that the controlled layer (layer b) should be stretched to the out-point of the target layer (layer a).

Figure 22B:
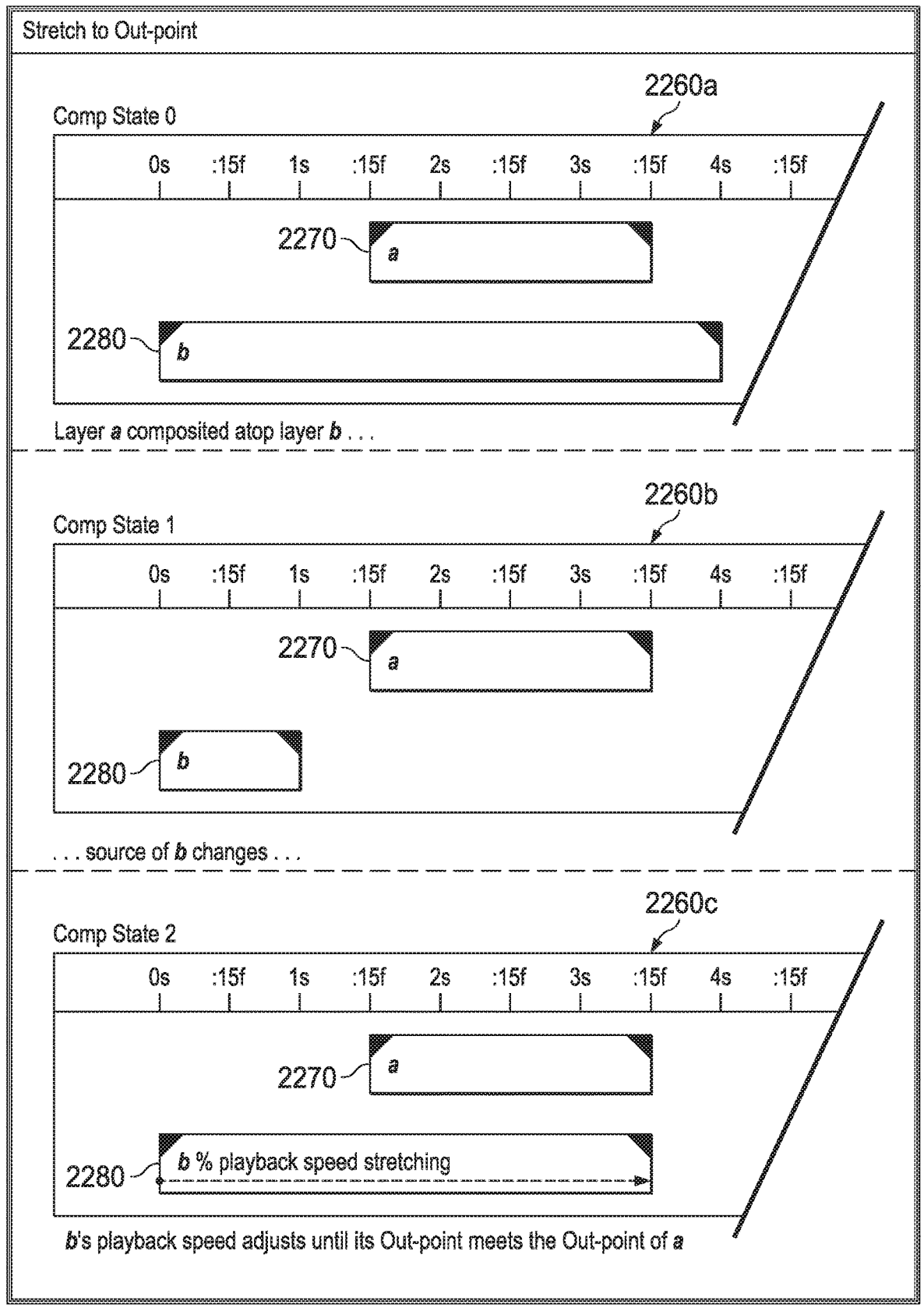

FIG. 22B is a block diagram depicting one embodiment of the effect of applying a stretch to out-point rule as defined in FIG. 22A to the controlled layer (layer b). Composition 2260a depicts an initial state of the composition 2260. Initially then, layer a 2270 is composited atop layer b 2280 and layer b 2280 has a first source of content. Composition

2260*b* depicts a state of composition 2260 after the source of content of layer b 2280 changes, before the application of the stretch to out-point rule defined for layer b 2280. Composition 2260*c* depicts the state of the composition 2260 after the application of the stretch to out-point rule defined in FIG. 22A.

Thus, for example, a rules engine of a temporal sculpting module may evaluate the rules associated with composition 2260 as defined in the project for the composition when the source of content for layer b 2280 changes, and apply the stretch to out-point rule specified for layer b 2280 in the project for composition 2260 (e.g., by changing the data associated with layer b 2280 in the project). The application of the rule may entail determining a new playback speed (or playback speed percentage) for layer b 2280 based on, for example, the length of layer b 2280, the in-point of layer b 2280, the out-point of layer a 2270 or other data. The playback speed (or percentage) can be associated with layer b 2280 in the project for the composition. Note that this playback speed (or percentage) may be greater than, or less than, a full or normal speed playback. Notice here that the application of the stretch to in-point rule changes the playback speed of layer b 2280 (if needed) to cause the out-point of layer b 2280 to match (e.g., be the same point in time in the composition as) layer a's out-point.

Figure 23A:
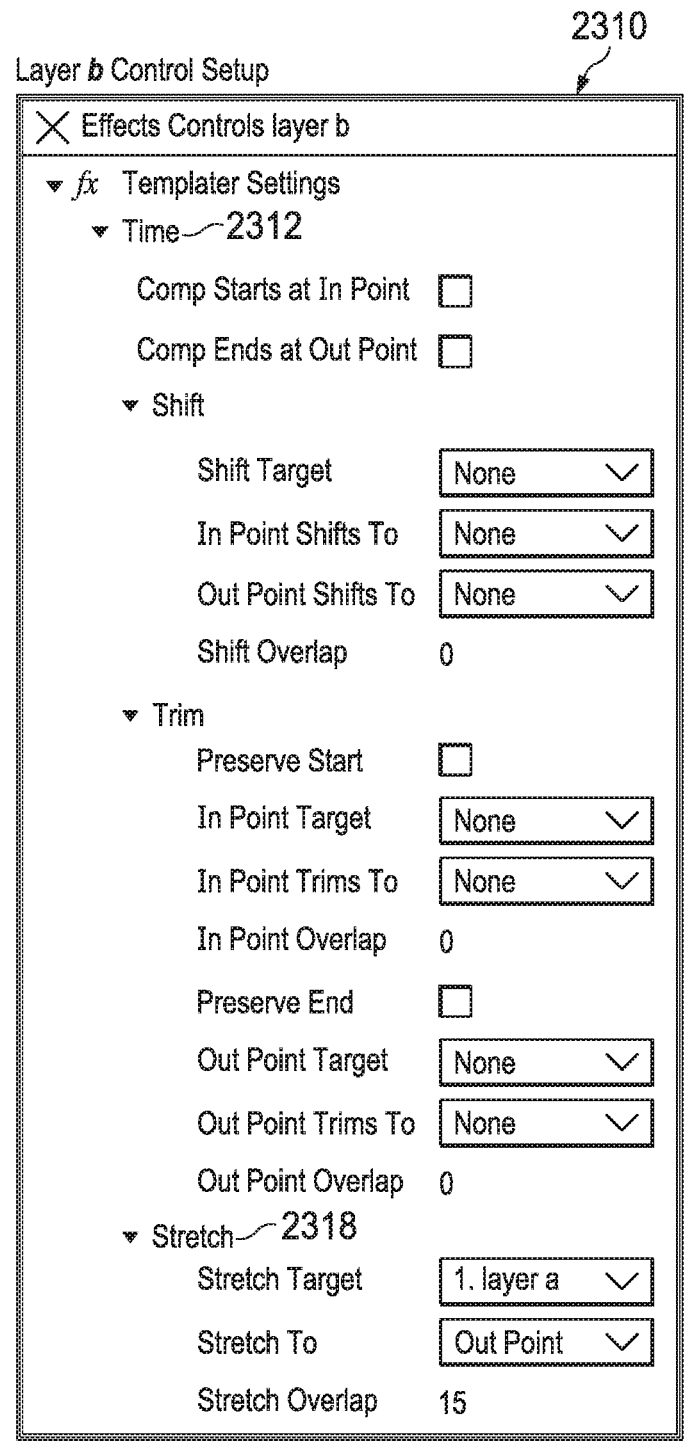

In FIG. 23A, a block diagram depicting one embodiment of an interface for allowing a user to define a similar "stretch to out-point with overlap" rule is shown. Such a rule may specify that when a control layer (here layer b) changes (e.g., because the source changes or the content from the source changed), the control layer's (here layer b) playback speed will be adjusted such that the control layer's (here layer b) out-point will be at the same position in time (relative to the composition) as the target layer's (here layer a) out-point plus (e.g., later in time) some amount of frames. Thus, such an interface may be presented by a temporal sculpting module when a user is defining effects for a control layer (here layer b) in a digital compositing platform. In particular, interface 2310 may allow a user to specify control parameters for a layer (the "controlled layer", here layer b). Interface 2310 provides a time menu 2312 for the controlled layer including controls allowing a user to define one or more time-sculpting rules with respect to that layer. This time menu may include stretch menu 2318 where the stretch target (e.g. here layer a) may be specified, along with the rule that the controlled layer (layer b) should be stretched to the out-point of the target layer (layer a) plus an overlap of a certain number of frames (here 15).

FIG. 23B is a block diagram depicting one embodiment of the effect of applying a stretch to out-point plus overlap rule as defined in FIG. 23A to the controlled layer (layer b). Composition 2360*a* depicts an initial state of the composition 2360. Initially then, layer a 2370 is composited atop layer b 2380 and layer b 2380 has a first source of content. Composition 2360*b* depicts a state of composition 2360 after the source of content of layer b 2380 changes, before the application of the stretch to in-point plus overlap rule defined for layer b 2380. Composition 2360*c* depicts the state of the composition 2360 after the application of the stretch to in-point plus overlap rule defined in FIG. 23A.

Thus, for example, a rules engine of a temporal sculpting module may evaluate the rules associated with composition 2360 as defined in the project for the composition when the source of content for layer b 2380 changes, and apply the stretch to out-point rule plus overlap specified for layer b 2380 in the project for composition 2360 (e.g., by changing the data associated with layer b 2380 in the project). The application of the rule may entail determining a new playback speed (or playback speed percentage) for layer b 2380 based on, for example, the length of layer b 2380, the in-point of layer b 2380, the out-point of layer a 2370, the number of frames specified for the control layer (here layer b), or other data. The playback speed (or percentage) can be associated with layer b 2380 in the project for the composition. Notice here that the application of the stretch to in-point rule plus overlap changes the playback speed of layer b 2380 (if needed) to cause the out-point of layer b 2380 to match (e.g., be the same point in time in the composition as) layer a's out-point plus the number of frames (here 15).

Figure 24A:
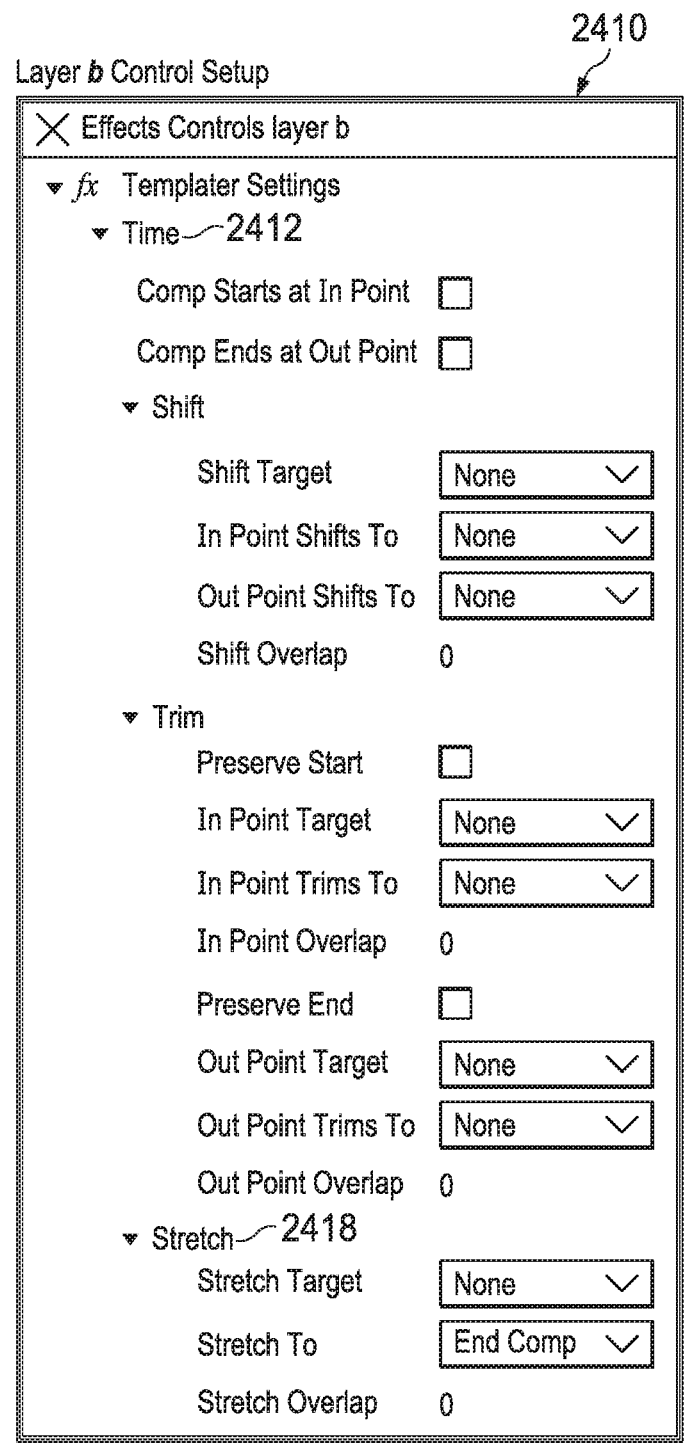

While the above embodiments of stretching rules have utilized a target point in another layer, embodiments of stretching rules may also utilize target points in the composition itself. For example, in one embodiment, the target for a control layer in a stretching rule may be the end time of a containing composition. FIG. 24A depicts a block diagram of one embodiment of an interface for allowing a user to define a "stretch to end of comp" rule. Such a rule may specify that when a control layer (here layer b) changes (e.g., because the source changes or the content from the source changed), the control layer's (here layer b) playback speed will be adjusted such that the control layer's (here layer b) out-point will be at the same position in time as the composition containing the control layer (here layer b). Thus, such an interface may be presented by a temporal sculpting module when a user is defining effects for a control layer (here layer b) in a digital compositing platform. In particular, interface 2410 may allow a user to specify control parameters for a layer (the "controlled layer", here layer b). Interface 2410 provides a time menu 2412 for the controlled layer including controls allowing a user to define one or more time-sculpting rules with respect to that layer. This time menu may include stretch menu 2418 where the stretch target layer (e.g., here none) may be specified, along with the rule that the controlled layer (layer b) should be stretched to the target point of the end of the composition.

FIG. 24B is a block diagram depicting one embodiment of the effect of applying a stretch to out-point rule as defined in FIG. 24A to the controlled layer (layer b). Composition 2460*a* depicts an initial state of the composition 2460. Initially then, layer a 2470 is composited atop layer b 2480 and layer b 2480 has a first source of content. Composition 2460*b* depicts a state of composition 2460 after the source of content of layer b 2480 changes, before the application of the stretch to end of comp rule defined for layer b 2480. Composition 2460*c* depicts the state of the composition 2460 after the application of the stretch to end of comp rule defined in FIG. 24A.

Thus, for example, a rules engine of a temporal sculpting module may evaluate the rules associated with composition 2460 as defined in the project for the composition when the source of content for layer b 2480 changes, and apply the stretch to end of comp rule specified for layer b 2480 in the project for composition 2460 (e.g., by changing the data associated with layer b 2480 in the project). The application of the rule may entail determining a new playback speed (or playback speed percentage) for layer b 2480 based on, for example, the length of layer b 2480, the in-point of layer b 2480, the end time of the composition 2460, or other data. The playback speed (or percentage) can be associated with layer b 2480 in the project for the composition. Note that this playback speed (or percentage) may be greater than, or less than, a full or normal speed playback. Notice here that the application of the stretch to end of comp rule changes the playback speed of layer b 2480 (if needed) to cause the out-point of layer b 2480 to match (e.g., be the same point in time in the composition as) the end of the composition 2460.

The type of time-sculpting rules discussed above with respect to FIGS. 20A-24B are stretching rules that rules may establish a temporal link between a controlled layer to one or more target points in one or more target layers or a composition such that when one of the control layers is altered (e.g., modified or substituted with content of a different length) the content of the control layer may be lengthened (or shortened). Embodiments herein may also provide cropping rules that allow a user to define time cropping points (target points) with respect to a layer to establish a temporal link between the layer and the composition, such that when a layer changes, the in-point or out-point of the entire composition are altered based on the in-point or out-point of the layer. These rules may define, for example, where a composition starts and ends. Embodiments of these types of cropping rules may be better understood with reference to FIGS. 25A-26B.

Figure 25A:
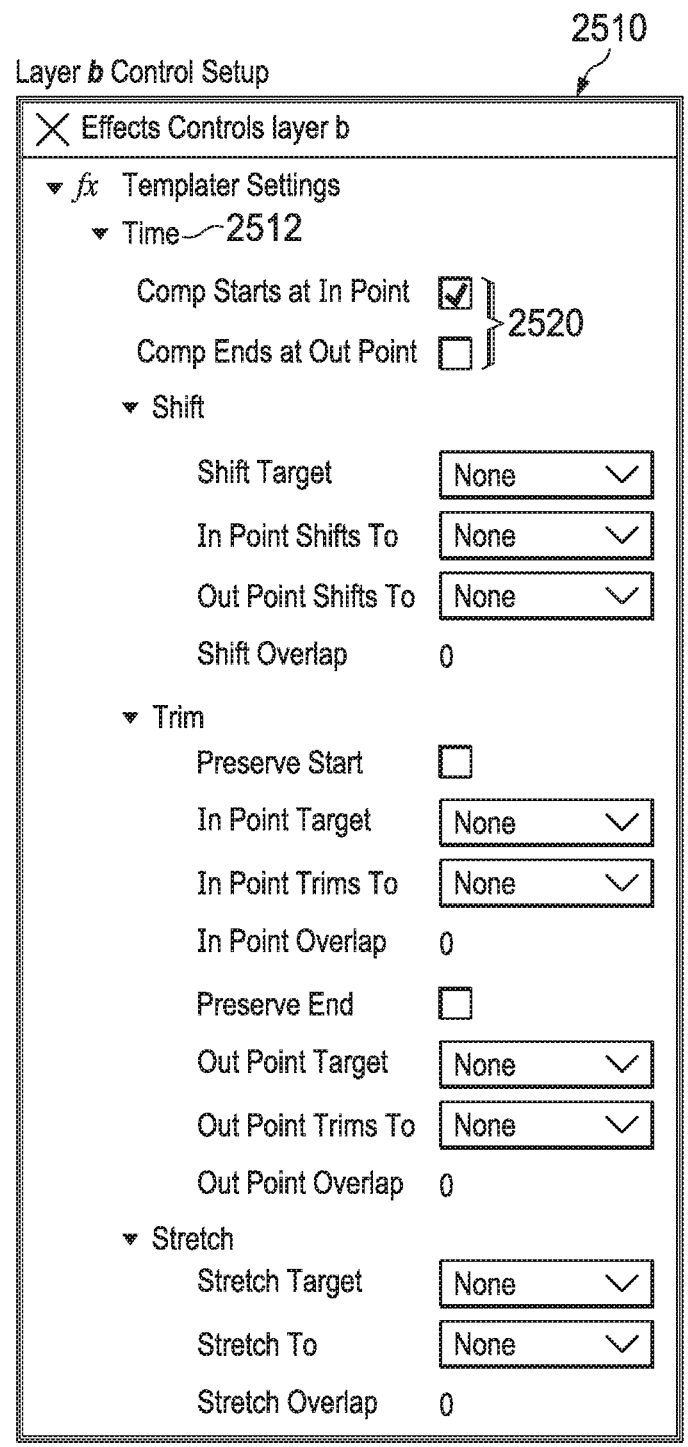

Looking at FIG. 25A, a block diagram of one embodiment of an interface for allowing a user to define a "crop to in-point" rule is depicted. Such a rule may specify that when a control layer (here layer b) changes (e.g., because the source changes or the content from the source changed), the start time of the composition containing the control layer will be adjusted (or "cropped") until the start time of the composition is the same as the in-point of the control layer (here layer b). Thus, such an interface may be presented by a temporal sculpting module when a user is defining effects for a control layer (here layer b) in a digital compositing platform. In particular, interface 2510 may allow a user to specify control parameters for a layer (the "controlled layer", here layer b). Interface 2510 provides a time menu 2512 for the controlled layer including controls allowing a user to define one or more time-sculpting rules with respect to that layer. This time menu may include crop menu 2520 where the rule that the composition containing the control layer (here layer b) should be cropped to the target point of the control layer's in-point.

FIG. 25B is a block diagram depicting one embodiment of the effect of applying a crop to in-point rule as defined in FIG. 25A to a composition. Composition 2560a depicts an initial state of the composition 2560. Initially then, layer a 2570 is composited atop layer b 2580 and layer b 2580 has a first source of content. Composition 2560b depicts a state of composition 2560 after the source of content of layer b 2580 changes, before the application of the crop to in-point rule defined for layer b 2580. Composition 2560c depicts the state of the composition 2560 after the application of the crop to in-point rule defined in FIG. 25A.

Thus, for example, a rules engine of a temporal sculpting module may evaluate the rules associated with composition 2560 as defined in the project for the composition when the source of content for layer b 2580 changes, and apply the crop to in-point rule specified for layer b 2580 in the project for composition 2560 (e.g., by changing the data associated with layer b 2580 or the composition 2560 in the project). The application of the rule may entail determining a start time for the composition 2560 based on, for example, the in-point of layer b 2580. Notice here that the application of the crop to in-point rule changes the start time of composition 2560 to cause the start time of composition 2560 to match (e.g., be the same point in time in as) the in-point of layer b 2580.

Figure 26A:
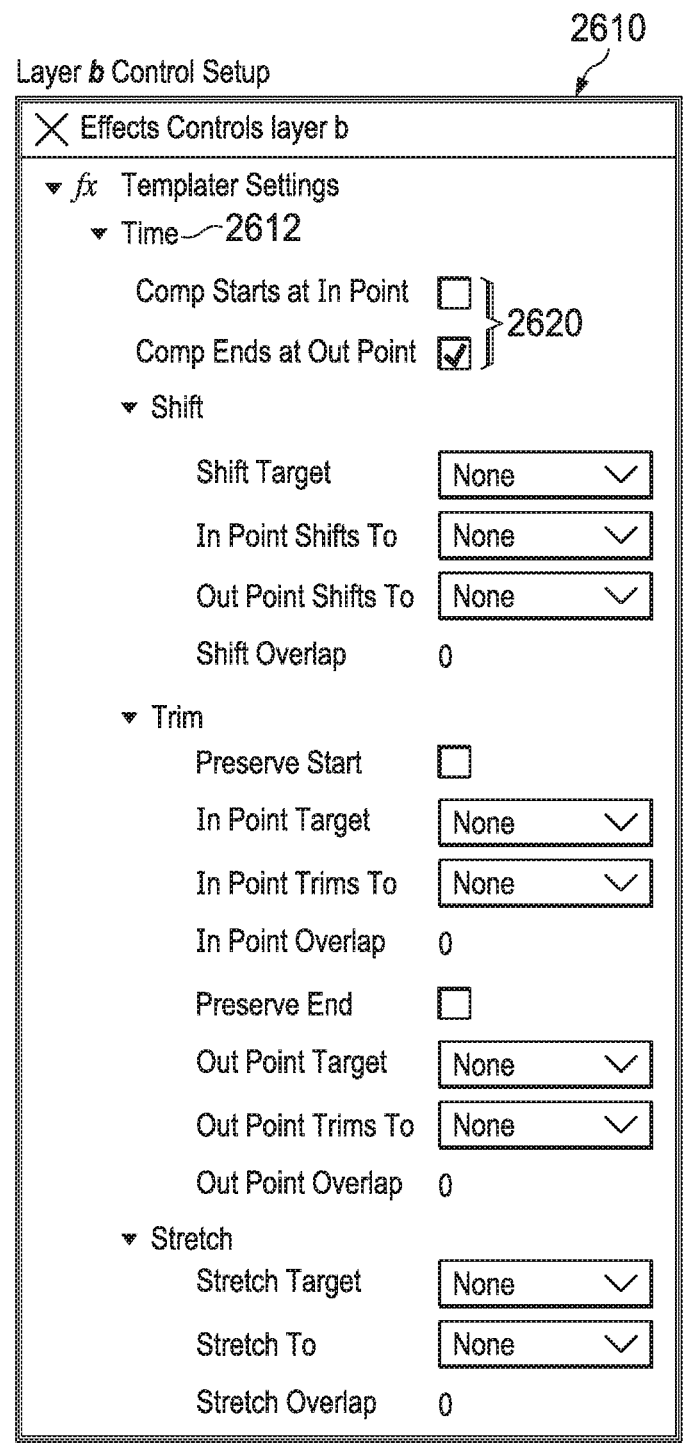

FIG. 26A depicts a block diagram of one embodiment of an interface for allowing a user to define a "crop to out-point" rule is depicted. Such a rule may specify that when a control layer (here layer b) changes (e.g., because the source changes or the content from the source changed), the end time of the composition containing the control layer will be adjusted (or "cropped") until the end time of the composition is the same as the out-point of the control layer (here layer b). Thus, such an interface may be presented by a temporal sculpting module when a user is defining effects for a control layer (here layer b) in a digital compositing platform. In particular, interface 2610 may allow a user to specify control parameters for a layer (the "controlled layer", here layer b). Interface 2610 provides a time menu 2612 for the controlled layer including controls allowing a user to define one or more time-sculpting rules with respect to that layer. This time menu may include crop menu 2620 where the rule that the composition containing the control layer (here layer b) should be cropped to the target point of the control layer's out-point.

FIG. 26B is a block diagram depicting one embodiment of the effect of applying a crop to out-point rule as defined in FIG. 26A to a composition. Composition 2660a depicts an initial state of the composition 2660. Initially then, layer a 2670 is composited atop layer b 2680 and layer b 2680 has a first source of content. Composition 2660b depicts a state of composition 2660 after the source of content of layer b 2680 changes, before the application of the crop to out-point rule defined for layer b 2680. Composition 2660c depicts the state of the composition 2660 after the application of the crop to out-point rule defined in FIG. 26A.

Thus, for example, a rules engine of a temporal sculpting module may evaluate the rules associated with composition 2660 as defined in the project for the composition when the source of content for layer b 2680 changes, and apply the crop to out-point rule specified for layer b 2680 in the project for composition 2660 (e.g., by changing the data associated with layer b 2680 or the composition 2660 in the project). The application of the rule may entail determining an end time for the composition 2660 based on, for example, the out-point of layer b 2680. Notice here that the application of the crop to out-point rule changes the end time of composition 2660 to cause the end time of composition 2660 to match (e.g., be the same point in time in as) the out-point of layer b 2670.

Figure 27A:
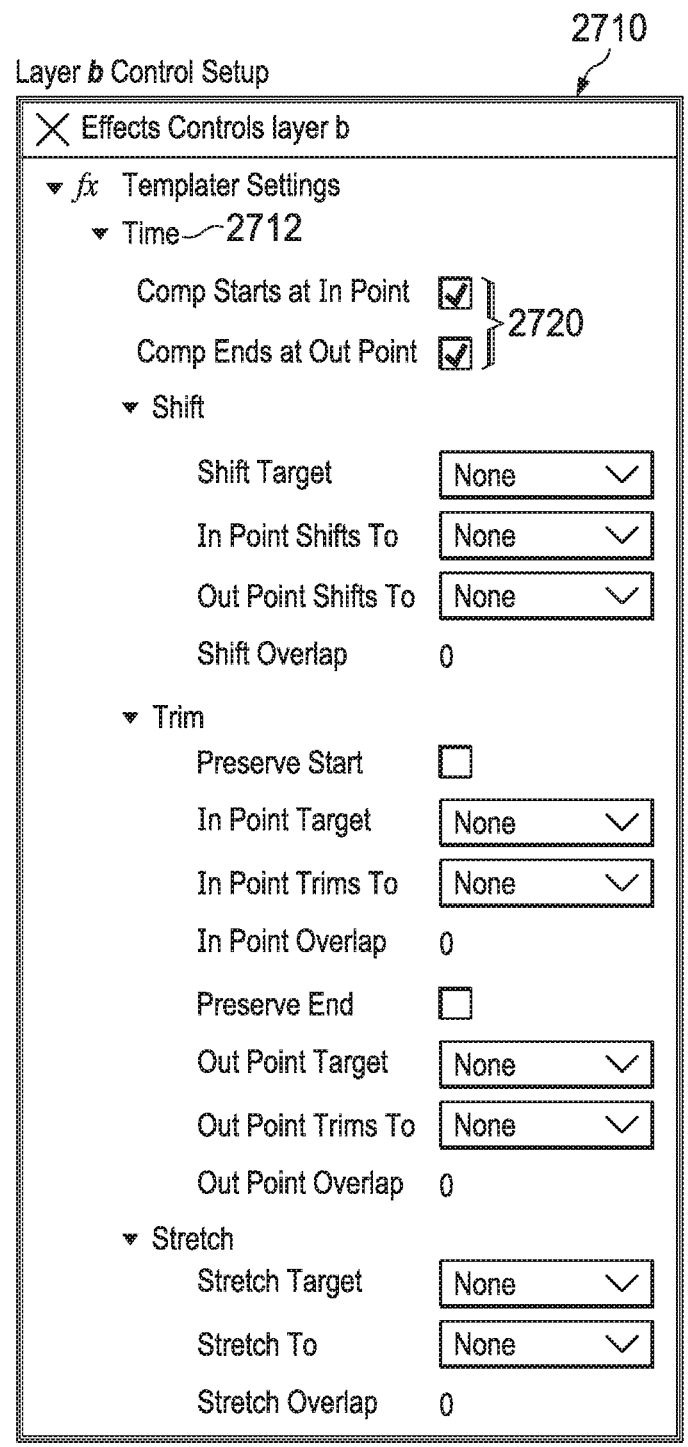

FIGS. 27A and 27B depict the simultaneous application of a crop to in-point rule and a crop to out-point rule for the same control layer. FIG. 27A is a block diagram of one embodiment of an interface for allowing a user to define a "crop to out-point" rule and "crop to in-point" rule. Such an interface may be presented by a temporal sculpting module when a user is defining effects for a control layer (here layer b) in a digital compositing platform. In particular, interface 2710 may allow a user to specify control parameters for a layer (the "controlled layer", here layer b). Interface 2710 provides a time menu 2712 for the controlled layer including controls allowing a user to define one or more time-sculpting rules with respect to that layer. This time menu may include crop menu 2720 where both the rule that the composition containing the control layer (here layer b) should be cropped to the target point of the control layer's in-point (a crop to in-point rule) and the rule that the composition containing the control layer (here layer b) should be cropped to the target point of the control layer's out-point may be specified.

FIG. 27B is a block diagram depicting one embodiment of the effect of applying both a crop to out-point rule and a crop to in-point rule as defined in FIG. 27A to a composition.

Composition 2760a depicts an initial state of the composition 2760. Initially then, layer a 2770 is composited atop layer b 2780 and layer b 2780 has a first source of content. Composition 2760b depicts a state of composition 2760 after the source of content of layer b 2780 changes, before the application of the crop to out-point and crop to in-point rules defined for layer b 2780. Composition 2760c depicts the state of the composition 2760 after the application of the crop to out-point and crop to in-point rules defined in FIG. 27A.

Here, a rules engine of a temporal sculpting module may evaluate the rules associated with composition 2760 as defined in the project for the composition when the source of content for layer b 2780 changes, and apply the crop to out-point and crop to in-point rules specified for layer b 2780 in the project for composition 2760 (e.g., by changing the data associated with layer b 2780 or the composition 2760 in the project). The application of the rules may entail determining both a start time and an end time for the composition 2760 based on, for example, the in-point and out-point of layer b 2780. Notice here that the application of the crop to out-point and crop to in-point rules changes both the start time and end time of composition 2660 to cause the start time of composition 2760 to match (e.g., be the same point in time in as) the in-point of layer b 2780 and the end time of composition 2760 to match the out-point of layer b 2780.

Figure 28A:
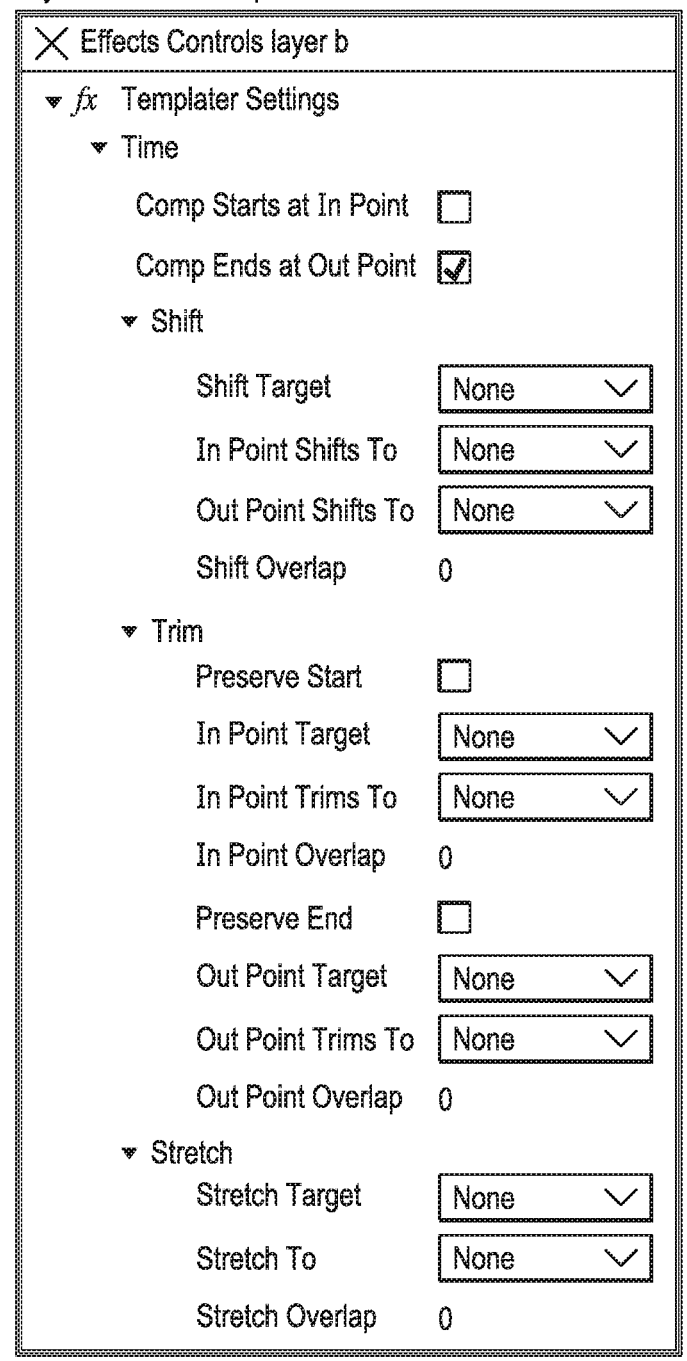
Figure 28B:
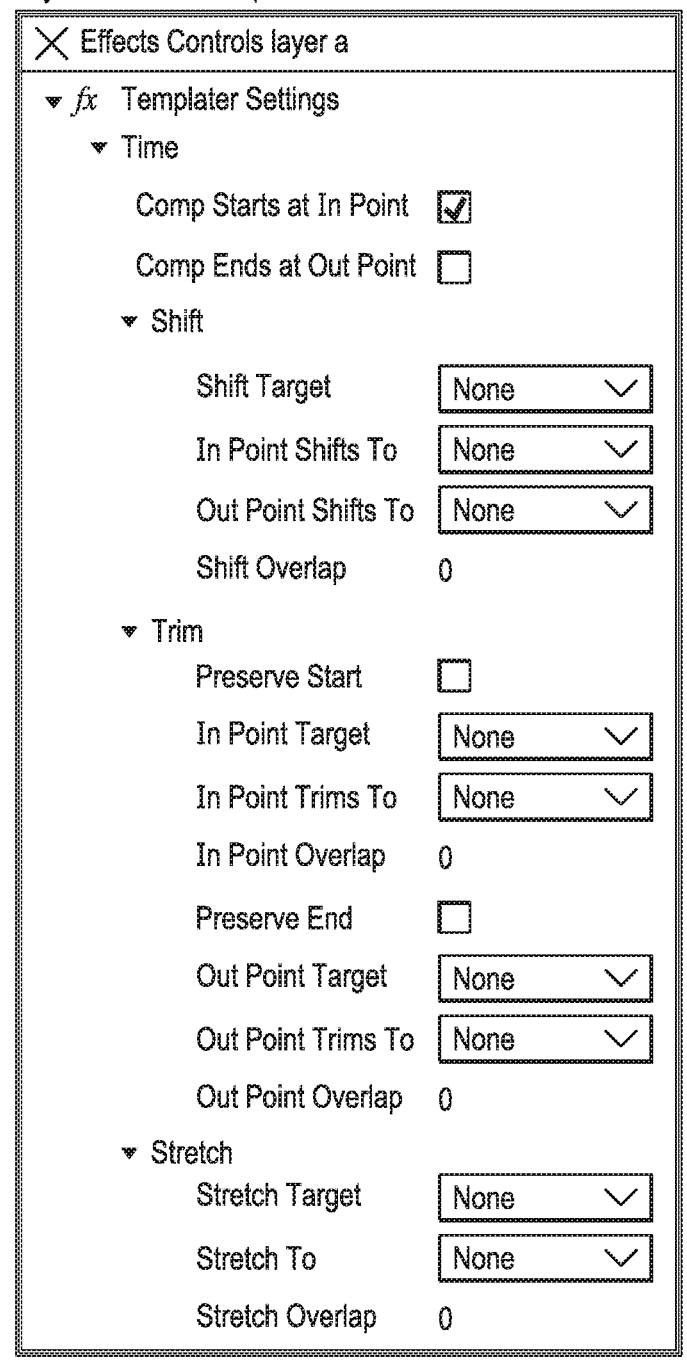

These cropping rules may also usefully be applied to different or distinct layers of a composition to similar effect. FIGS. 28A and 28B are, respectively, block diagrams of embodiments of interfaces for allowing a user to define a crop to out-point rule for one layer (layer b) and a crop to in-point rule for another layer (layer a). These interfaces are substantially similar to those depicted and described above with respect to FIGS. 26A and 27A. As can be seen then, in the examples depicted for one control layer (layer b) a rule defining that the start time of the composition containing the control layer (layer b) should be cropped to the target point of the control layer's out-point (a crop to out-point rule) has been specified and for another control layer (layer a) a rule defining that the start point of the composition containing the control layer (layer a) should be cropped to the target point of the control layer's in-point (a crop to out-point rule) has been defined.

FIG. 28C is a block diagram depicting one embodiment of the effect of applying both the crop to out-point rule (for layer b) and the crop to in-point rule (for layer a) as defined in FIGS. 28A and 28B to a composition. Composition 2860a depicts an initial state of the composition 2860. Initially then, layer a 2870 is composited atop layer b 2880 and layer b 2880 has a first source of content. Composition 2860b depicts a state of composition 2860 after the source of content of layer b 2880 changes, before the application of the crop to out-point and crop to in-point rules defined for layer b 2880 and layer a 2870. Composition 2860c depicts the state of the composition 2860 after the application of the crop to out-point and crop to in-point rules defined in FIGS. 28A and 28B.

Here, a rules engine of a temporal sculpting module may evaluate the rules associated with composition 2860 as defined in the project for the composition when the source of content for layer b 2880 changes, and apply the crop to out-point and crop to in-point rules specified for layer b 2880 and layer a 2870 in the project for composition 2860 (e.g., by changing the data associated with layer b 2880, layer a 2870 or the composition 2860 in the project). The application of the rules may entail determining both a start time and an end time for the composition 2860 based on, for example, the in-point of layer a 2870 and the out-point of layer b 2880. Notice here that the application of the crop to out-point and crop to in-point rules changes both the start time and end time of composition 2860 to cause the start time of composition 2860 to match (e.g., be the same point in time in as) the in-point of layer a 2870 and the end time of composition 2860 to match the out-point of layer b 2880. Notice as well that the change in layer b 2880 caused the application of both the crop to in-point rule associated with layer a 2870 and the crop to out-point rule associated with layer b 2880 (despite the fact that layer a 2870 may not have changed).

It may now be useful to illustrate other applications and uses of embodiments of time-sculpting rules for digital compositions as described herein. The examples and applications and uses may reflect real-world applications and uses for the time-sculpting rules and illustrate the efficacy and usefulness of such time-sculpting rules. For example, it is often the case that digital editors may desire to have a composition with a layers that include a dynamic intro, a main segment and a trailing outro. As noted above, however, the content of the layers may change (sometimes often) when creating the composition. Using embodiments of the time-sculpting rules as discussed then, a digital editor may define rules for the layers of such a composition so that the desired temporal relationships between certain layers of the composition may be maintained.

Figure 29A:
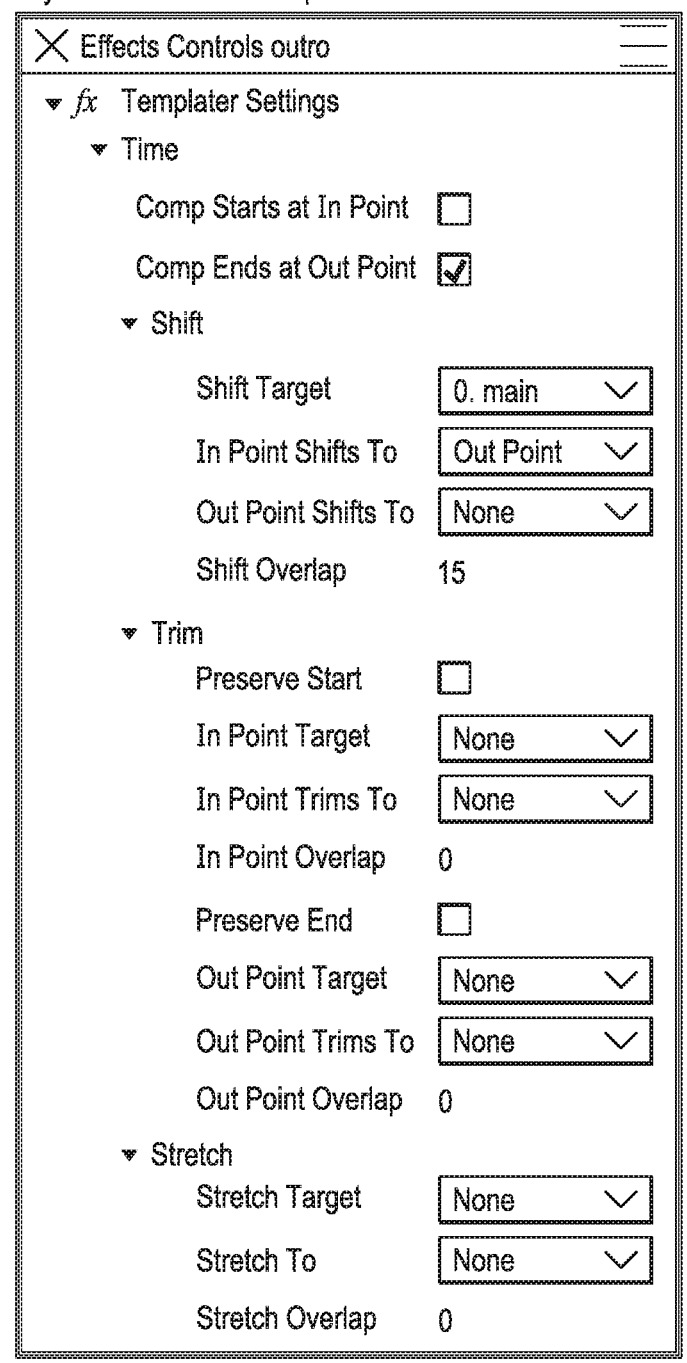
Figure 29B:
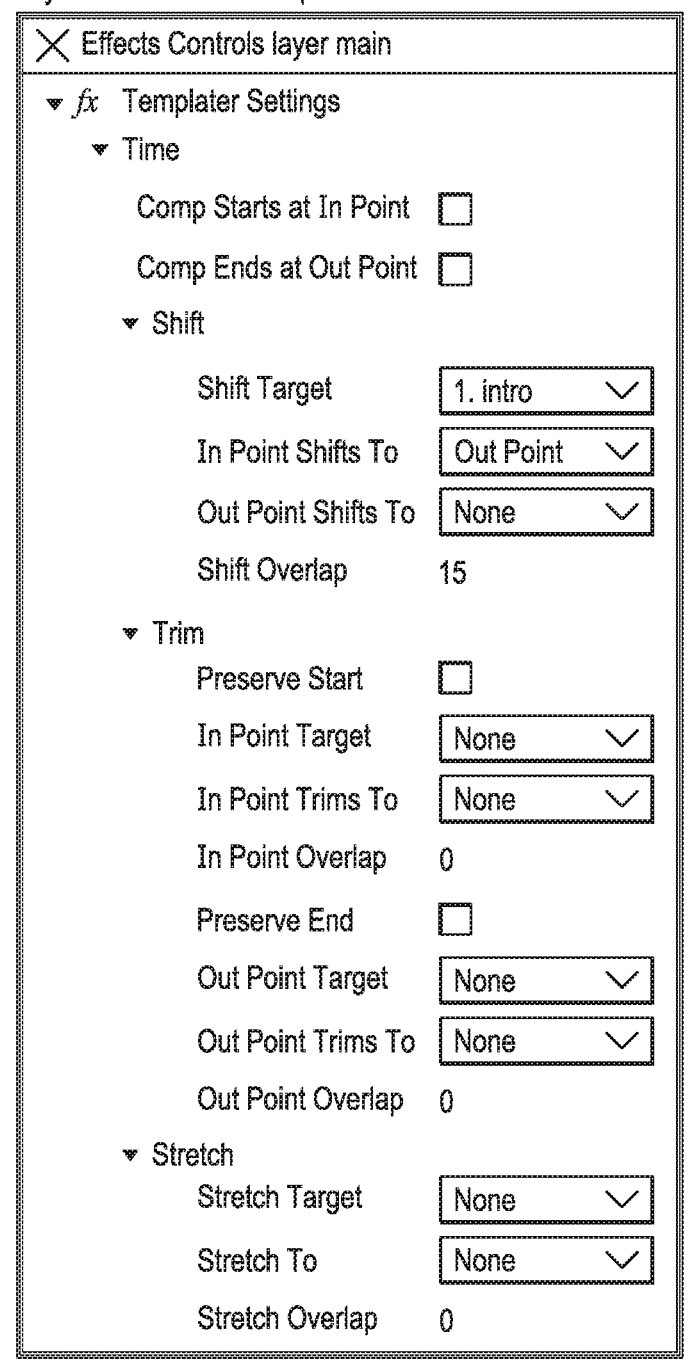

For the above described scenario, in which a composition includes a dynamic intro, a main segment and a trailing outro, FIG. 29A is a block diagram depicting one embodiment of an interface where a user is defining time-sculpting rules for the "outro" layer of a composition. Notice in the depicted interface the user has defined in-point shifts to out-point with overlap rule for the outro layer, where the target layer is the "main" layer of the composition and the number of frames of overlap is 15. Additionally, the user has defined a crop to out-point rule for the outro layer, such that end point of the composition containing the outro layer will be cropped to the out-point of the outro layer. FIG. 29B is a block diagram depicting one embodiment of an interface where a user is defining time-sculpting rules for the "main" layer of a composition. Here, the user has defined an in-point shifts to out-point with overlap rule for the main layer, where the target layer is the "intro" layer of the composition and the number of frames of overlap is 15.

FIG. 29C depicts a block diagram of one embodiment of the effect of applying the temporal sculpting rules as defined in FIGS. 29A and 29B to a composition including an intro, main and outro layer. In particular, composition 2960a depicts an initial state of the composition 2960. Initially then, outro layer 2970 is composited atop intro layer 2980 and main layer 2990. Composition 2960b depicts a state of composition 2960 after the source of content of the intro layer 2980 and the main layer 2990 changes, before the application of the rules defined for outro layer 2970 and main layer 2990. Composition 2960c depicts the state of the composition 2960 after the application of the rules for the outro layer 2970 and main layer 2990 defined in FIGS. 29A and 29B.

Here, a rules engine of a temporal sculpting module may evaluate the rules associated with composition 2960 as defined in the project for the composition when the source of content for intro layer 2980 or main layer 2990 changes, and apply the shift in-point to out-point rules with overlap specified for the main layer 2990 and outro layer 2970 and the crop to out-point rule specified for the outro layer 2970 in the project for composition 2960 (e.g., by changing the data associated with main layer 2990, outro layer 2970 or the composition 2960 in the project). Notice here that the application of the shift to in-point rule with overlap specified for the for the main layer 2990 causes the in-point of main layer 2990 to be a point in time in the composition defined by intro layer's (the target layer) out-point minus the number of frames specified as the overlap (e.g., 15 frames). In other words, the in-point of main layer 2990 may be defined to be the number of overlap frames earlier than the out-point of intro layer 2980. Similarly, the application of the shift to in-point rule with overlap specified for the for the outro layer 2970 causes the in-point of outro layer 2970 to be a point in time in the composition defined by main layer's (the target layer) out-point minus the number of frames specified as the overlap (e.g., 15 frames). In other words, the in-point of outro layer 2970 may be defined to be the number of overlap frames earlier than the out-point of main layer 2990. Additionally, the application of the crop to out-point rule associated with outro layer 2970 causes the end point of composition 2960 to be the same as the out-point of outro layer 2970.

Figure 30A:
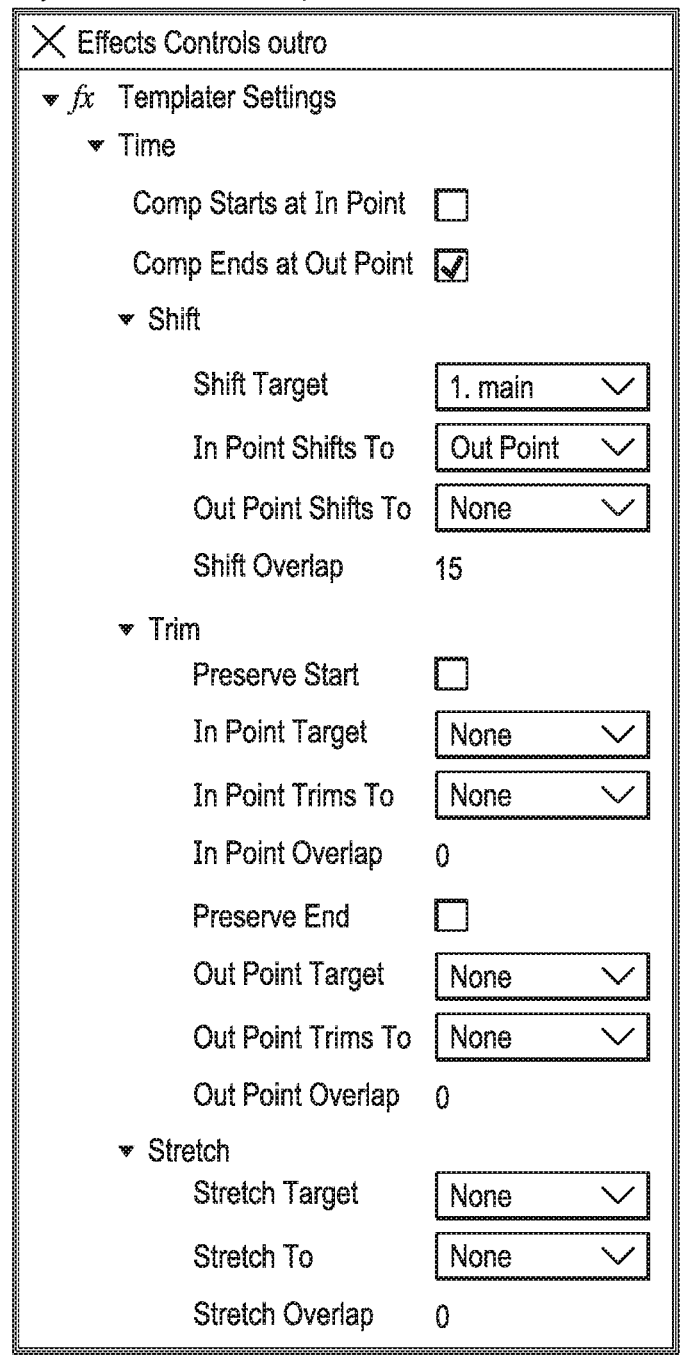
Figure 30B:
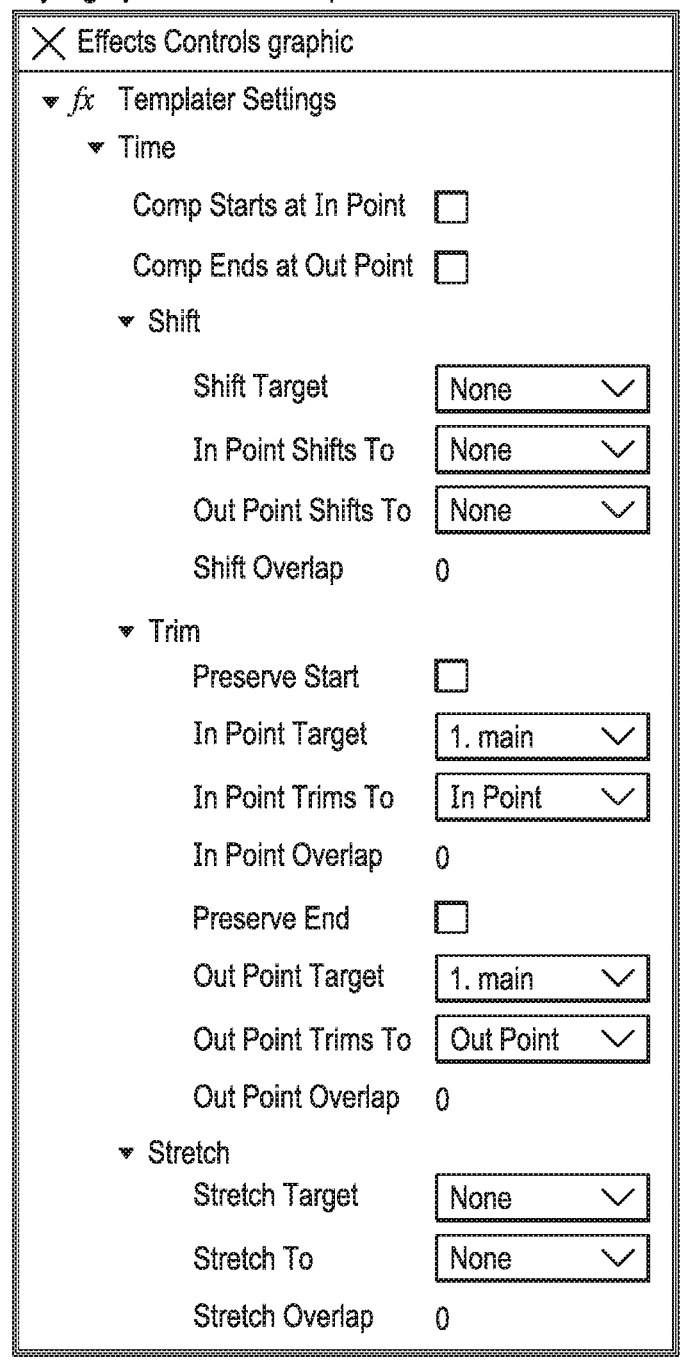

Now suppose that a composition includes an intro layer, a main layer and an outro layer, and a digital editor wishes to include a graphic layer that is displayed as long as the main layer is displayed in the composition. To ensure that this temporal arrangement is maintained in such a scenario, a digital editor may utilize embodiments of the time-sculpting rules presented herein for their composition. FIGS. 30A-30C are block diagrams depicting such a scenario. FIG. 30A is a block diagram depicting one embodiment of an interface where a user is defining time-sculpting rules for the "outro" layer of a composition. Notice in the interface the user has defined an in-point shifts to out-point with overlap rule for the outro layer, where the target layer is the "main" layer of the composition and the number of frames of overlap is 15. Additionally, the user has defined a crop to out-point rule for the outro layer, such that the end point of the composition containing the outro layer will be cropped to the out-point of the outro layer. FIG. 30B is a block diagram for a block diagram depicting one embodiment of an interface where a user is defining time-sculpting rules for the "graphic" layer of a composition. Here, the user has defined an in-point trims to in-point rule and out-point trims to out-point rule for the graphic layer, where the target layer for both rules is the main layer of the composition.

FIG. 30C depicts a block diagram depicting one embodiment of the effect of applying the temporal sculpting rules as defined in FIGS. 30A and 30B to a composition including an intro, main, graphic and outro layer. In particular, composition 3060a depicts an initial state of the composition 3060. Initially then, outro layer 3070 is composited atop graphic layer 3050, intro layer 3090 and main layer 3080. Composition 3060b depicts a state of composition 3060 after the source of content of the main layer 3080 and the outro layer 3070 changes, before the application of the rules defined for outro layer 3070 and graphic layer 3050. Composition 3060c depicts the state of the composition 3060 after the application of the rules for the outro layer 3070 and graphic layer 3050 defined in FIGS. 30A and 30B.

A rules engine of a temporal sculpting module may evaluate the rules associated with composition 3060 as defined in the project for the composition when the source of content for main layer 3080 or outro layer 3070 changes, and apply the shift in-point to out-point rules with overlap and the crop to out-point rule specified for the outro layer 3070, and the in-point trim to in-point rule and out-point trims to out-point rule specified for graphic layer 3050 in the project for composition 3060 (e.g., by changing the data associated with main layer 3080, outro layer 3070 or the composition 3060 in the project). Notice here that the application of the in-point trims to in-point and out-point trims to out-point rules specified for the graphic layer 3050 causes the in-point of the graphic layer 3050 to be the same point in time as the in-point of the main layer 3080 and the out-point of graphic layer 3050 to be the same point in time as the out-point of main layer 3080 (e.g., the graphic layer 3050 will be displayed in the composition at the same time as main layer 3080). Moreover, the in-point shifts to out-point rule plus overlap specified for the outro layer 3070 causes the in-point of outro layer 3070 to be a point in time in the composition defined by main layer's (the target layer) out-point minus the number of frames specified as the overlap (e.g., 15 frames). In other words, the in-point of outro layer 3070 may be defined to be the number of overlap frames earlier than the out-point of main layer 3080. Additionally, the application of the crop to out-point rule associated with outro layer 3070 causes the end point of composition 3060 to be the same as the out-point of outro layer 3070.

Generally then, embodiments of time sculpting rules as disclosed may be utilized to ensure that a desired temporal arrangement between layer of a composition is maintained, irrespective of alterations to certain layers. As a more general scenario suppose that a composition includes an intro, with a number of clips it is desired to display sequentially, followed by an outro. To ensure that this temporal arrangement is maintained in such a scenario, with introducing dead space or other artifacts, a digital editor may utilize embodiments of the time-sculpting rules presented herein for their composition. FIGS. 31A-31F are block diagrams depicting such a scenario.

Specifically, FIGS. 31A-31E are block diagrams depicting one embodiment of an interface where a user is defining time-sculpting rules for layers of the composition. In particular, in FIG. 31A a user has defined an in-point shifts to out-point with overlap rule for the "clip 1" layer, where the target layer is the "intro" layer of the composition and the number of frames of overlap is 15. Additionally, the user has selected a preserve start and preserve end rule from the trim menu of the interface. These rules may be special cases of trim rule. A preserve the start selection may cause the in-point or the controlled layer to always be placed at the start time of the control layer so that effectively there is no trimming of the layer's in-point. Similarly, for a selection of preserve the end rule for the controlled layer indicates that the out-point of the controlled layer should be placed at the end time of the control layer so that effectively there is no trimming of the layer's out-point. That is, the in-point or out-point is forced to the extent of the layer's start time or end time respectively. As in some embodiment is may make little sense to both preserve the start (or end) and target a sibling layer (e.g., another layer in the same composition), in one embodiment, if a user selects a preserve start for a control layer in the interface then the "In point trims to" and "Trim target" menu items of the interface may be greyed-out and become disabled.

Figure 31A:
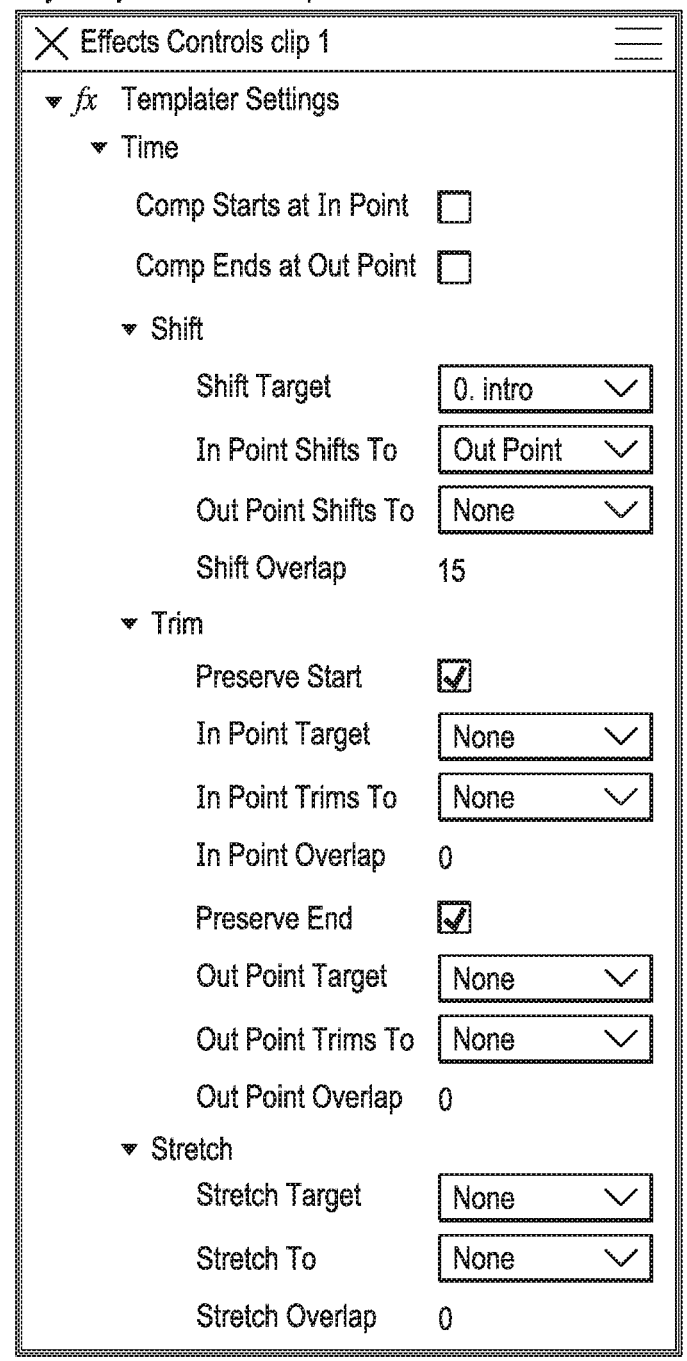
Figure 31B:
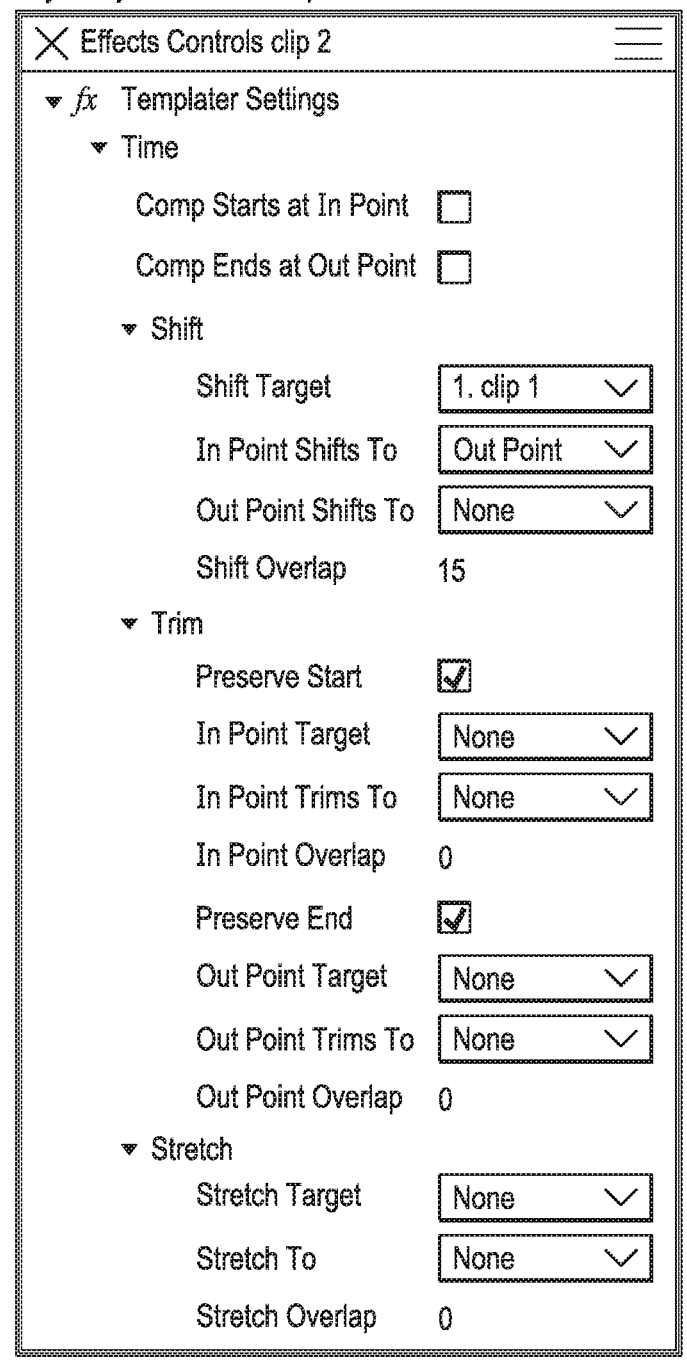
Figure 31C:
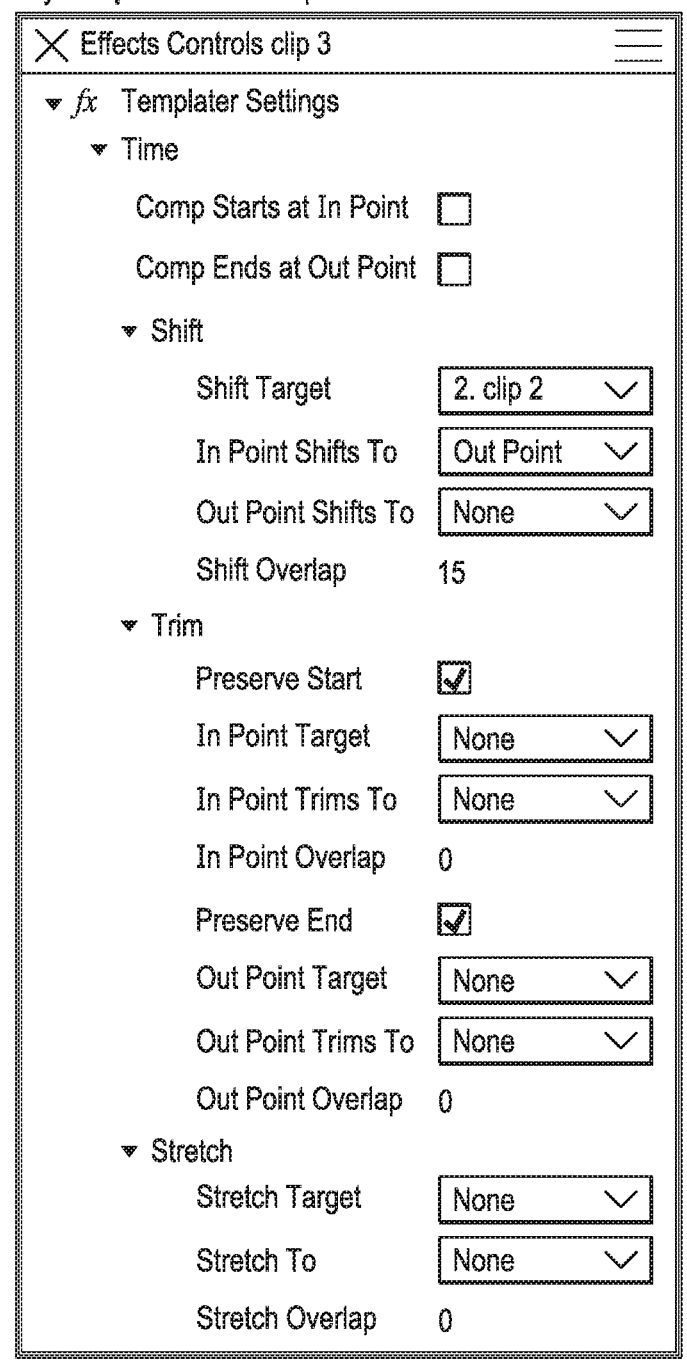
Figure 31D:
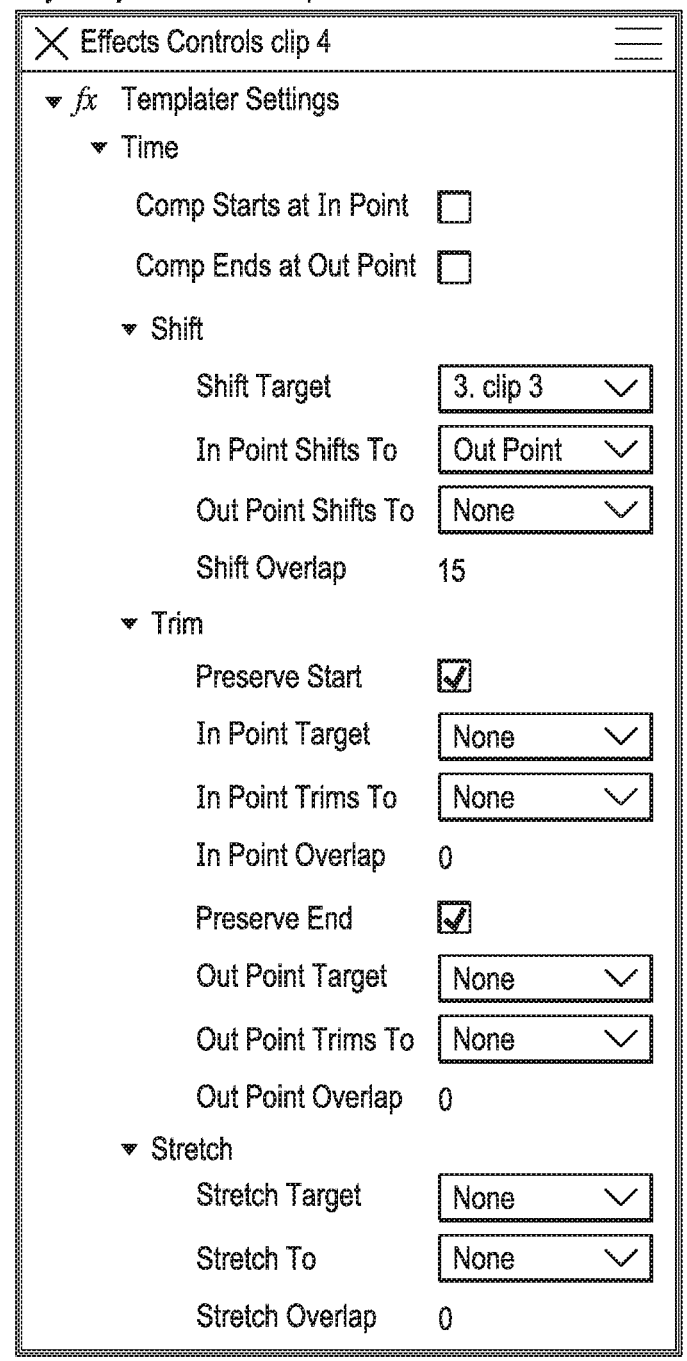
Figure 31E:
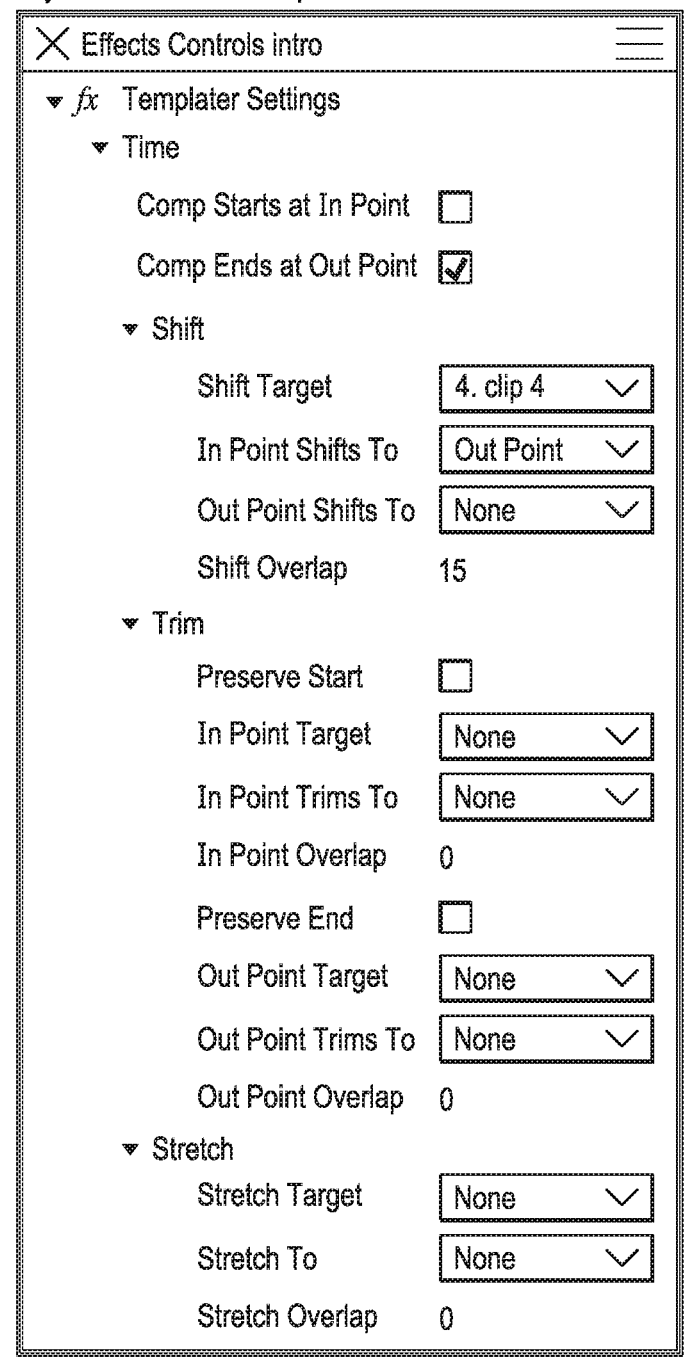

In FIG. 31B a user has defined an in-point shifts to out-point with overlap rule for the "clip 2" layer, where the target layer is the clip 1 layer of the composition and the number of frames of overlap is 15. The user has also selected a preserve start and preserve end rule from the trim menu of the interface for the clip 2 layer. FIG. 31C shows that a user has defined an in-point shifts to out-point with overlap rule for the "clip 3" layer, where the target layer is the clip 2 layer of the composition and the number of frames of overlap is 15. A preserve start and preserve end rule have also been selected from the trim menu of the interface for the clip 3 layer. In FIG. 31D a user has defined an in-point shifts to out-point with overlap rule for the "clip 4" layer, where the target layer is the clip 3 layer of the composition and the number of frames of overlap is 15. Again the user has selected a preserve start and preserve end rule from the trim menu of the interface for the clip 4 layer. FIG. 31E shows that a user has defined an in-point shifts to out-point with overlap rule for the "outro" layer, where the target layer is the clip 4 layer of the composition and the number of frames of overlap is 15. Additionally, a crop to out-point rule specified for the outro layer.

FIG. 31F is a block diagram depicting one embodiment of the effect of applying the temporal sculpting rules as defined in FIGS. 31A-31E to a composition including an intro, clip 1, clip 2, clip 2, clip 3, clip 4 and an outro layer. In particular, composition 3160a depicts an initial state of the composition 3160. Initially then, outro layer 3170 is composited atop clip 4 layer 3172, clip 3 layer 3174, clip 2 layer 3176, clip 1 layer 3178 and intro layer 3180. Composition 3160b depicts a state of composition 3160 after the source of content of one of the clip (1, 2, 3, or 4) layers 3172, 3174, 3176, 3178 changes, before the application of the rules defined for outro layer 3170 and clip (1, 2, 3, or 4) layers 3172, 3174, 3176, 3178. Composition 3160c depicts the state of the composition 3160 after the application of the rules for outro layer 3170 and clip (1, 2, 3, or 4) layers 3172, 3174, 3176, 3178 defined in FIGS. 31A-31E.

Here, a rules engine of a temporal sculpting module may evaluate the rules associated with composition 3160 as defined in the project for the composition when the source of content for one of the clip (1, 2, 3, or 4) layers 3172, 3174, 3176, 3178 changes and apply the shift in-point to out-point rules with overlap specified for clip (1, 2, 3, or 4) layers 3172, 3174, 3176, 3178 and outro layer 3170 and the crop to out-point rule specified for the outro layer 3170 in the project for composition 3160 (e.g., by changing the data associated with clip (1, 2, 3, or 4) layers 3172, 3174, 3176, 3178, outro layer 3170 or the composition 3160 in the project). Notice here that the application of the shift to in-point with overlap rules specified for clip (1, 2, 3, or 4) layers 3172, 3174, 3176, 3178 and outro layer 3170 causes the in-point of clip 1 layer 3172 to be a point in time in the composition defined by intro layer's (the target layer) out-point minus the number of frames specified as the overlap (e.g., 15 frames); the in-point of clip 2 layer 3174 to be a point in time in the composition defined by clip 1 layer's (the target layer) out-point minus the number of frames specified as the overlap (e.g., 15 frames); the in-point of clip 3 layer 3176 to be a point in time in the composition defined by clip 2 layer's (the target layer) out-point minus the number of frames specified as the overlap (e.g., 15 frames); the in-point of clip 4 layer 3178 to be a point in time in the composition defined by clip 3 layer's (the target layer) out-point minus the number of frames specified as the overlap (e.g., 15 frames); and the in-point of outro layer 3170 to be a point in time in the composition defined by clip 4 layer's (the target layer) out-point minus the number of frames specified as the overlap (e.g., 15 frames). Additionally, the application of the crop to out-point rule associated with outro layer 3170 causes the end point of composition 3160 to be the same as the out-point of outro layer 3170.

Figure 32A:
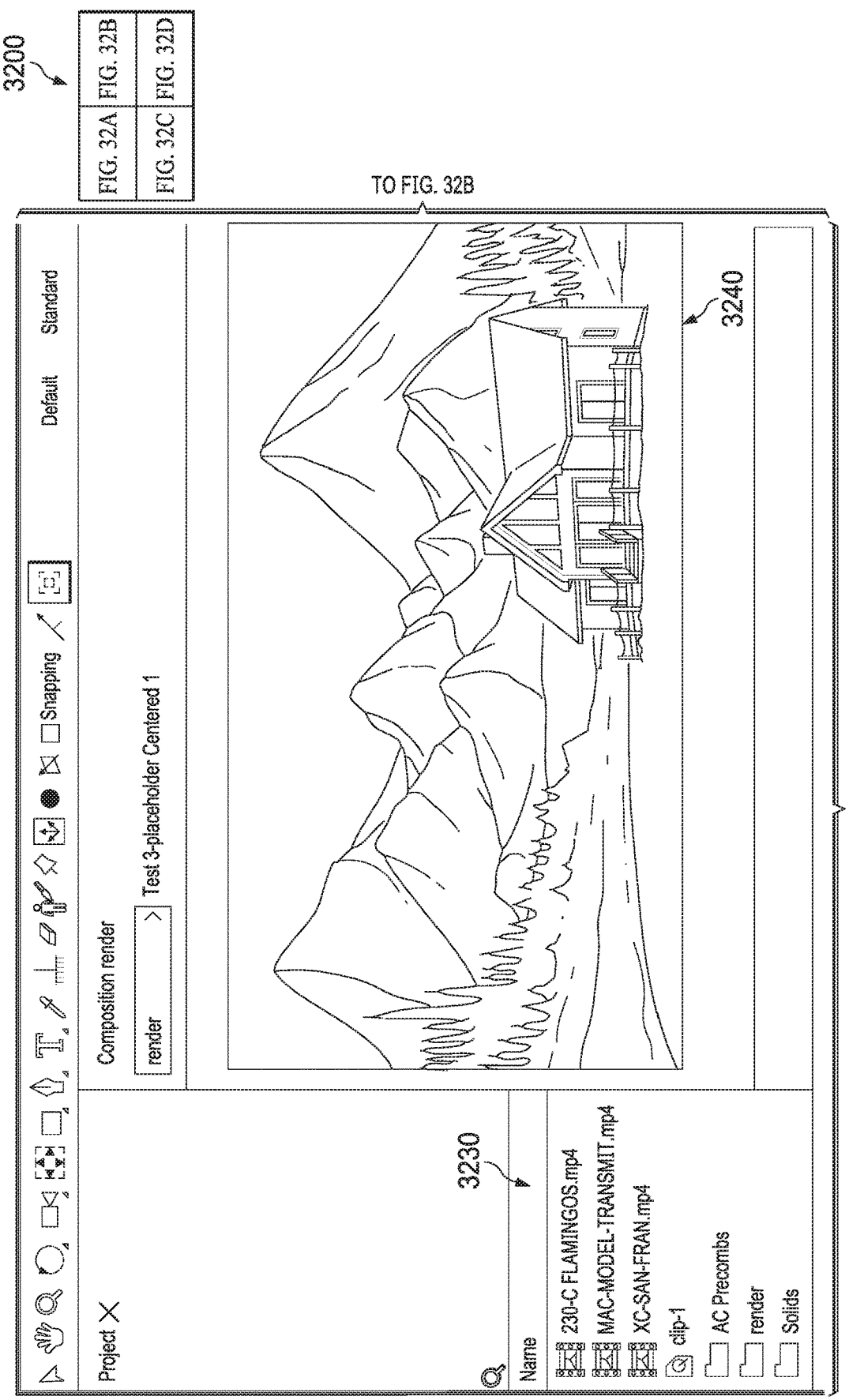
FIGS. 32A to 32O are block diagrams depicting embodiments of interfaces for a digital compositing platform that includes a temporal sculpting module.
Figure 32B:
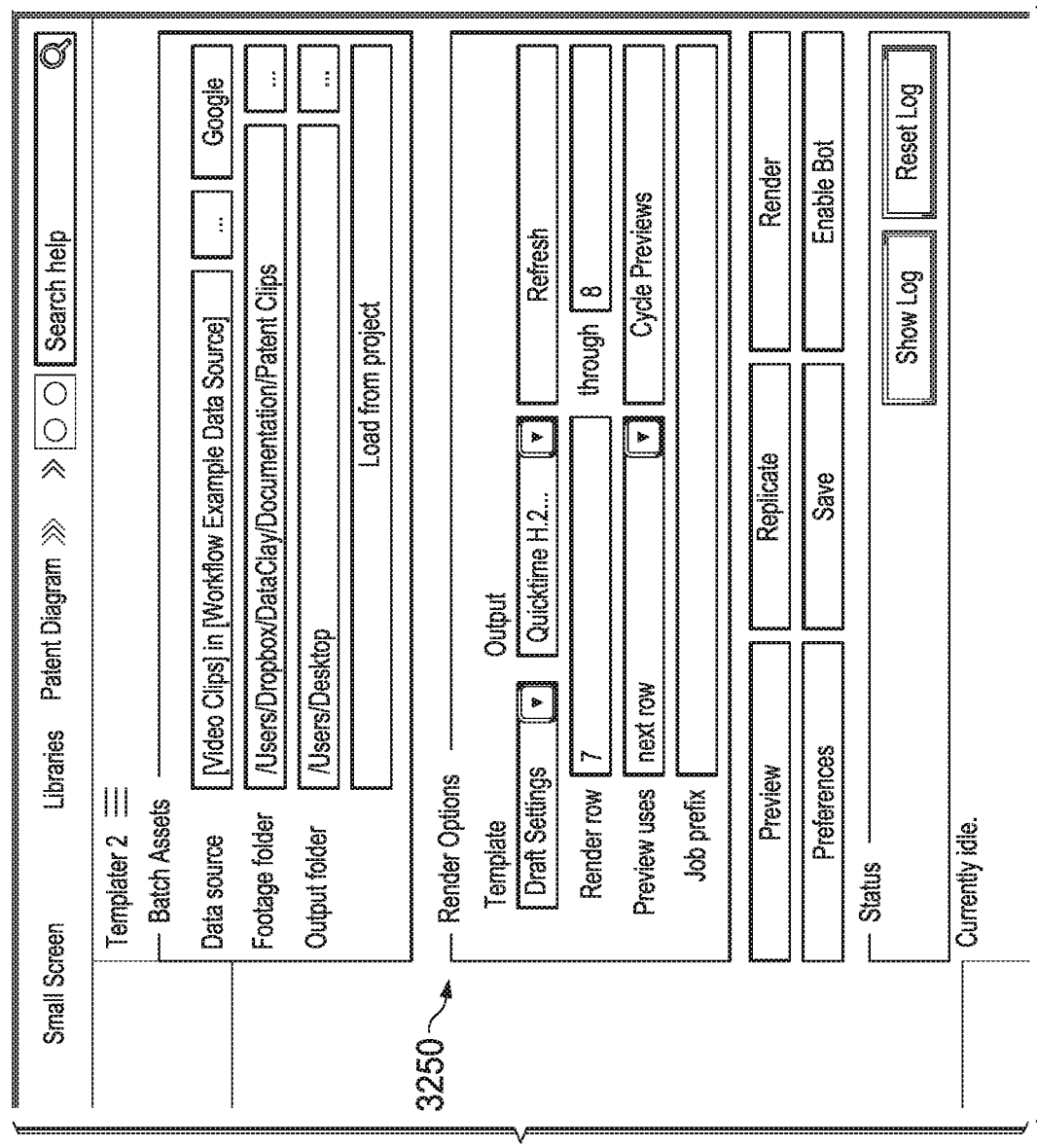
Figure 32C:
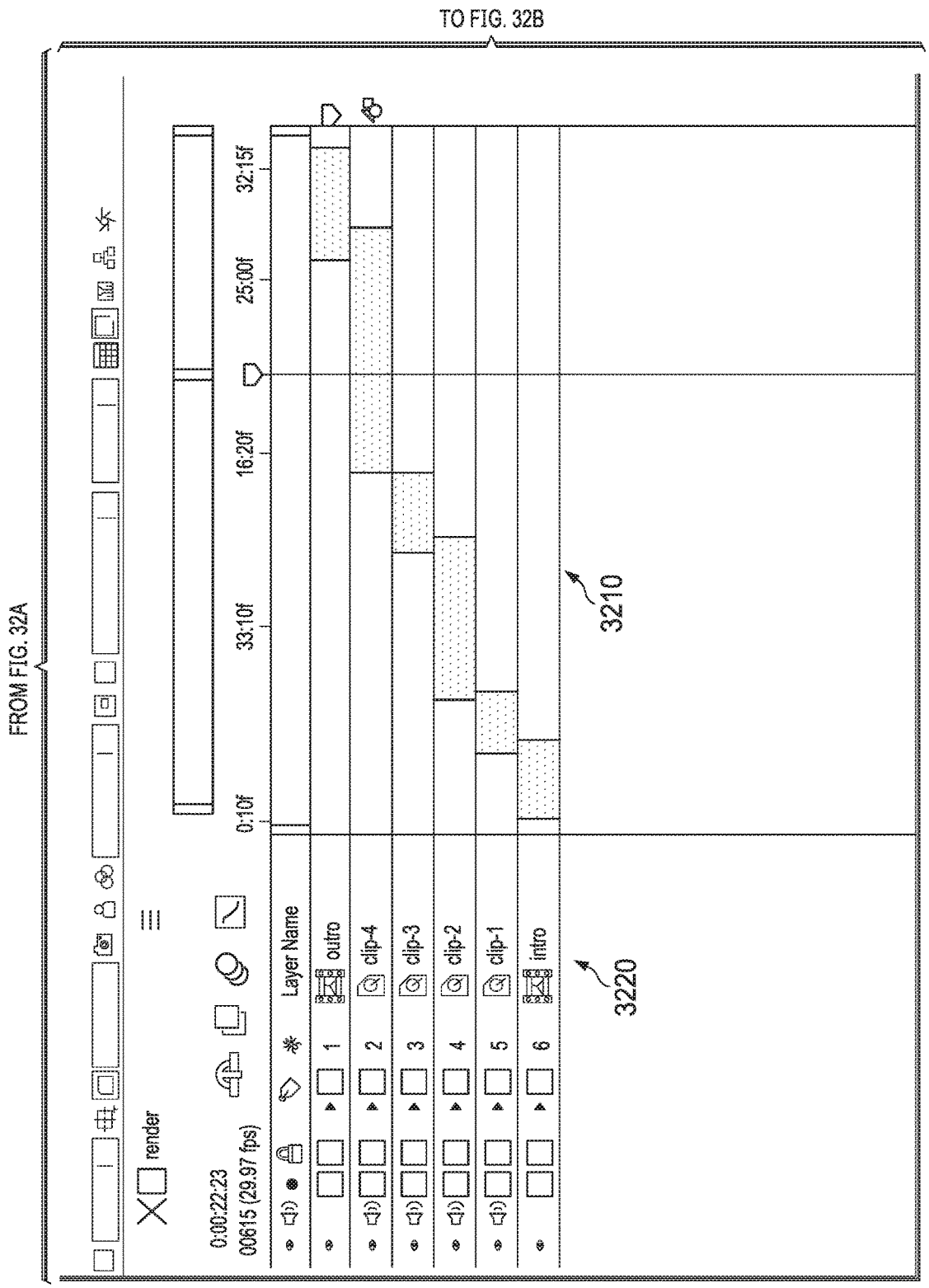
Figure 32D:
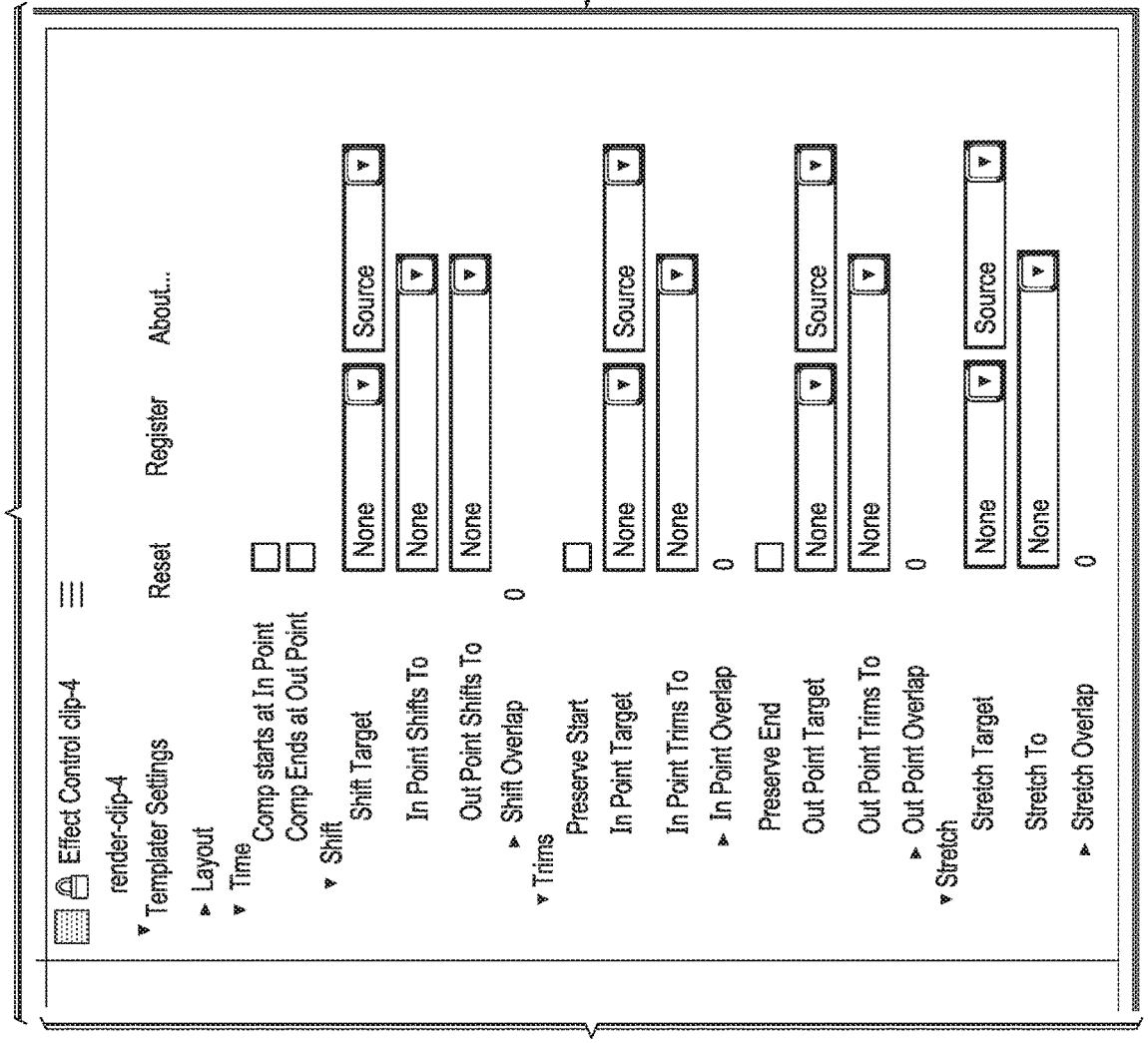

Now that embodiments of the time-sculpting rules implemented a temporal sculpting module of a digital compositing platform have been presented, it will be useful to discuss examples of the use of embodiments of such a temporal sculpting module in the context of the use of a digital compositing platform. Attention is therefore directed to FIGS. 32A to 32O which depict embodiments (or portions thereof) of an interface for a digital compositing platform that includes a temporal sculpting module.

Figure 32E:
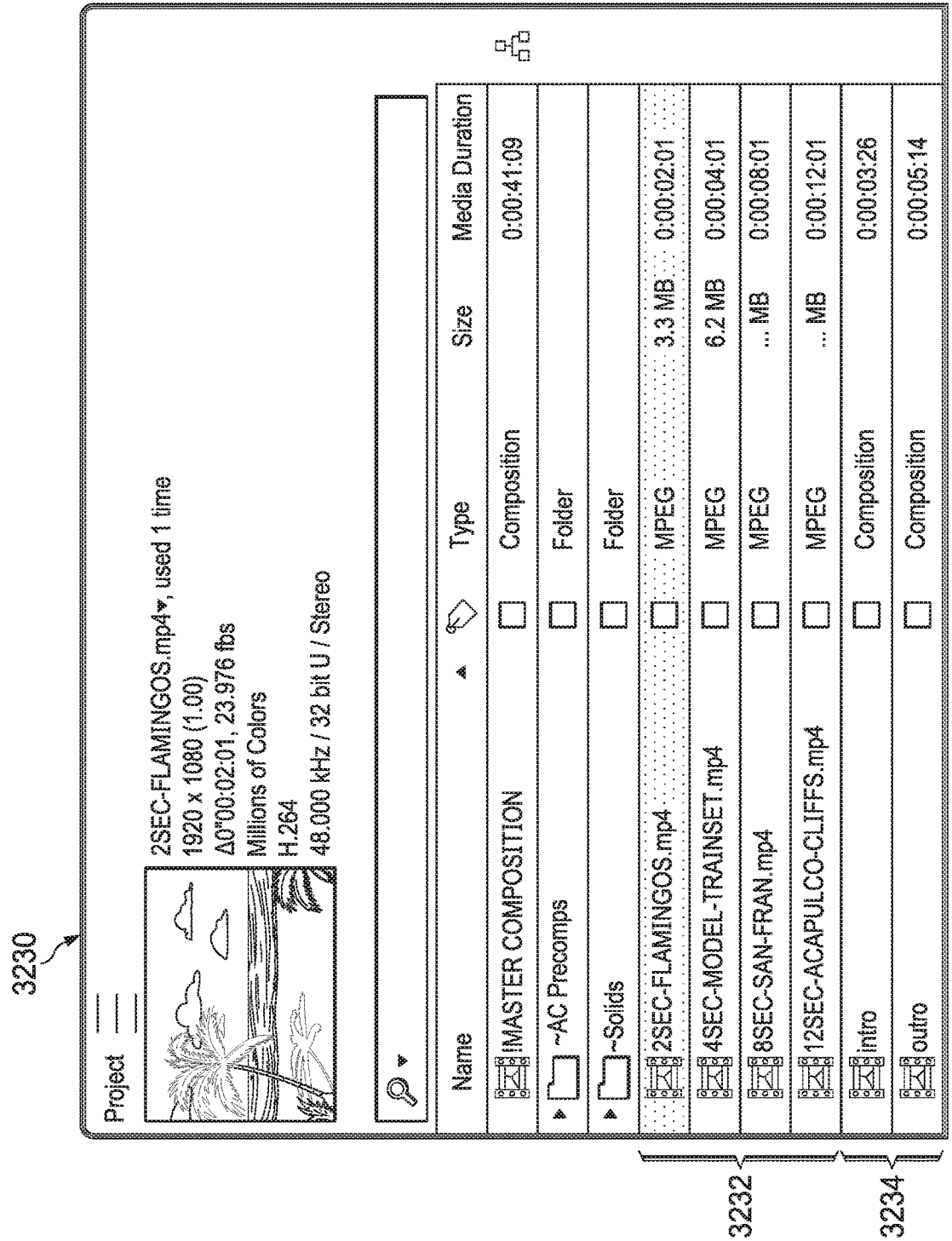

Interface 3200 of a digital compositing platform may include a composition timeline area 3210, a composition layer display area 3220, a layer source asset area 3230 and a composition viewer area 3240. The interface 3200 may also include temporal sculpting module interface areas 3250, 3260. In particular, these areas may include a timeline utility area 3250 and a layer effects control area 3260. FIG. 32E depicts one embodiment of a layer source asset area 3230. A user may interact with layer source asset area 3230 to add content to a project. For example, assets may be added by selecting sources for the content for each layer using the layer source asset area 3230. Here, this content may include footage assets 3232 and two animation slate composition assets 3234.

Figure 32F:
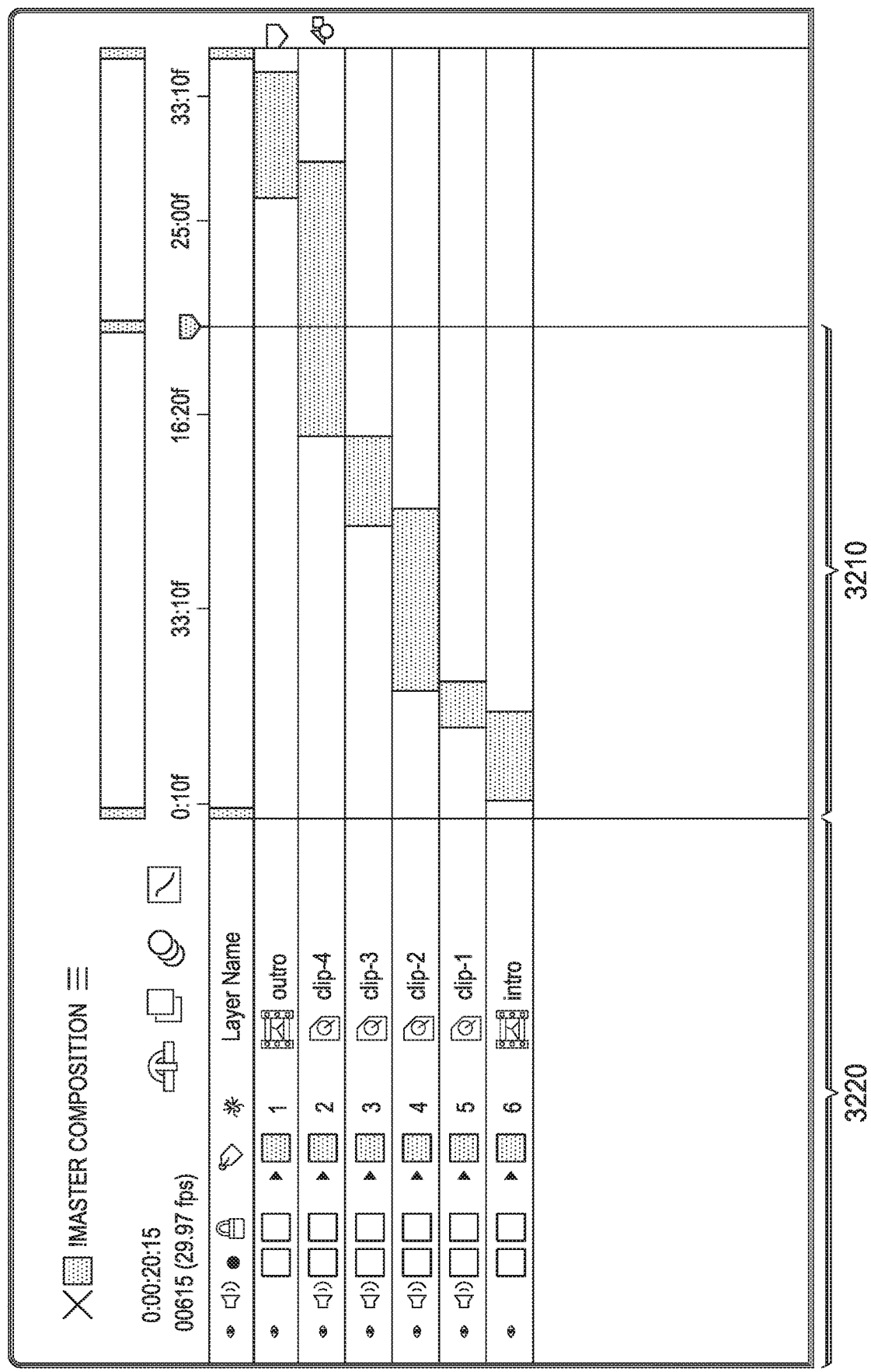

FIG. 32F depicts one embodiment of a composition layer area 3220 and composition timeline area 3210. Using these areas 3210, 3220 a user can insert project content (e.g., as added in layer source asset area 3230) as layers in a composition, assign other names to those layers if desired (e.g., here, "outro", "clip 1", "clip 2", "clip 3", "clip 4", "intro") and position those named layers in a composition timeline which is displayed in composition timeline area 3210. The composition timeline area 3210 thus displays a timeline denoting a scale of time along with blocks representing each named layer and their relative position in the composition (e.g., as they will appear in a rendering of the composition). The project file for the project may thus now include the defined composition, including references to each layer, names for each layer, the source of content for the layer, and the arrangement (e.g., the temporal arrangement) of the layers of the composition.

Figure 32G:
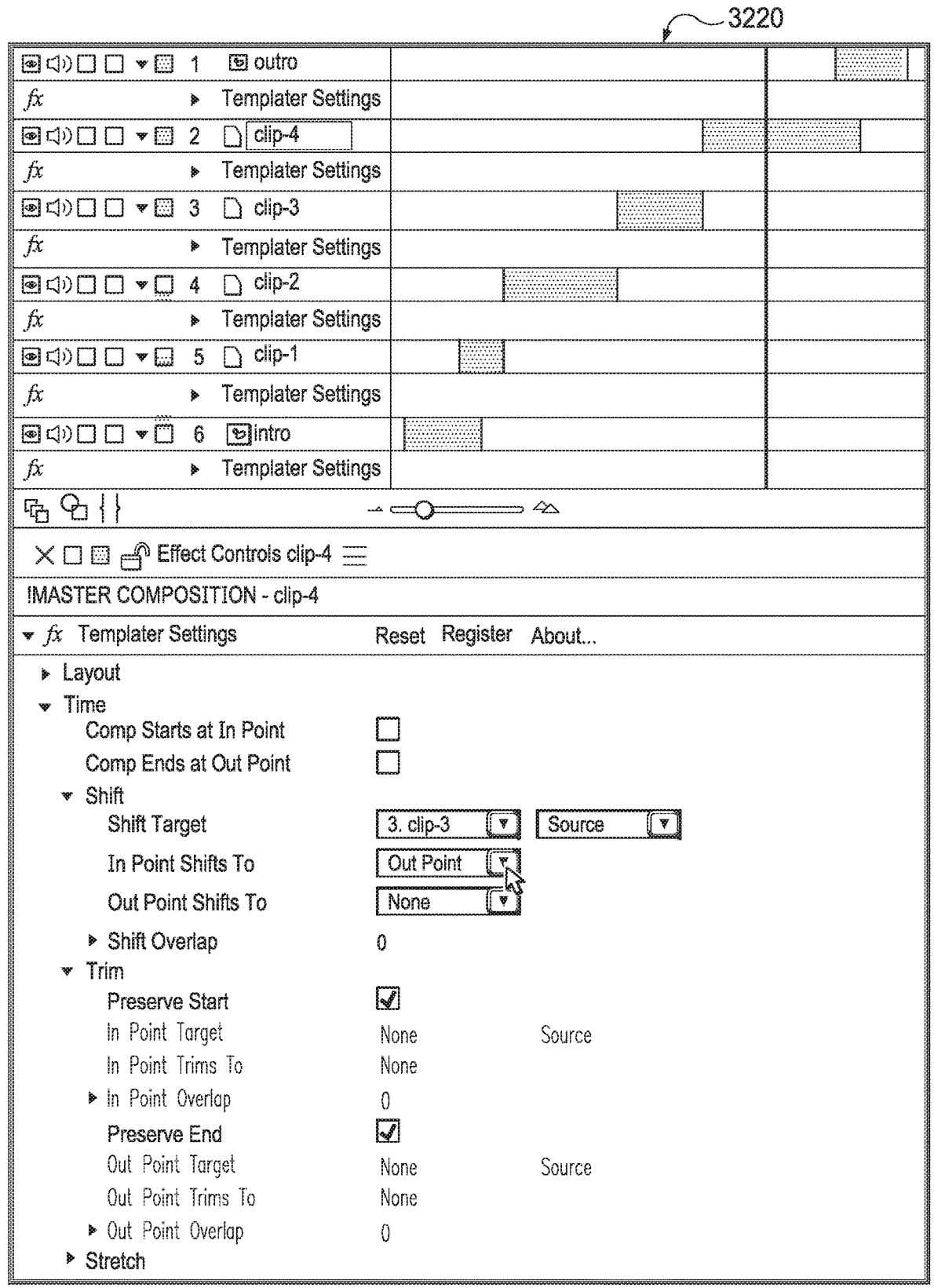

FIG. 32G depicts an embodiment of layer effects control area 3260 and composition layer area 3220. Using the composition layer area 3220 (or another area of the interface 3200) a user may select a layer of the composition (e.g., here "clip 4" has been selected). Then, using the layer effects control area 3260, the user may define one or more time-sculpting rules for that layer. The definition of rules for a layer is sometimes referred to as applying parameter controls to the layer as an effect modifier. In this manner, time-sculpting rules defining the temporal interaction of one or more layers of a composition may be associated with the composition or layers thereof such that a template may be defined for the composition. The layers or composition may thus be made to conform to this template or set of rules when the source or content of a layer changes by applying those rules (referred to as timeline invalidation). Accordingly, the project for the composition may include (e.g., store) the defined template or set of rules in association with the layers of the composition.

Timeline invalidation (e.g., a change in the content of a layer, as a result of either a change of the original content or the substitution of different content) may occur in a variety of manners, as elaborated on above. The composition (e.g., including the layers with the changed content) can then be altered according to the defined template (e.g., the set of temporal sculpting rules for at least one layer) so that the layers and the composition adhere to the set of temporal sculpting rules. In one embodiment, it may be desired by users to apply the template (e.g., the set of rules) to instances of the composition that include multiple sources of content for each layer. To facilitate this approach, embodiments of the digital compositing platform including the temporal sculpting module as described may allow the definition of multiple sources for one or more of the layers of the composition and the ability to process a composition according to each definition of the layers.

Figure 32I:
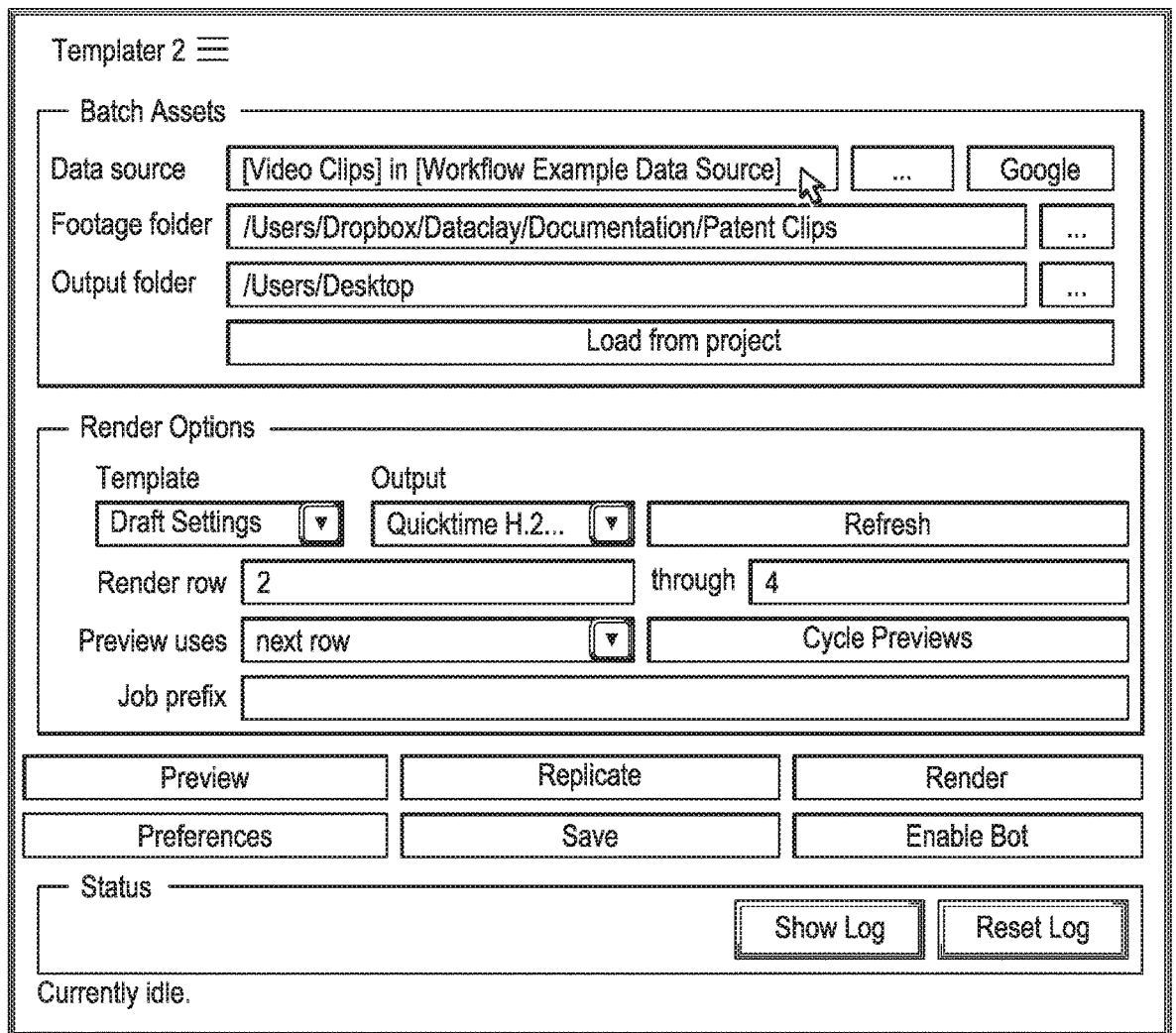

For example, as depicted in FIG. 32H, in one embodiment, a user may create a spreadsheet or other data file defining an instance of the composition, where each instance specifies a source of content for one or more layers of the composition. In one embodiment, a data file such a spreadsheet or the like may be used to define instances of a composition by defining different sources of content for one or more layers of the composition for each instance. Thus, for example, as depicted in FIG. 32H, a data file 3294 may include columns representing the layers of clip 1, clip 2, clip 3 and clip 4 of the composition. The data file 3294 thus defines three instances of the composition in rows 2, 3 and 4, with each instance defining a different source for the layer of the associated column. As depicted in the embodiment of the timeline utility area 3250 in FIG. 32I, a user can link the composition (e.g., the project for the composition) being edited in interface 3200 to the data file 3294 using timeline utility area 3250 by specifying the location of the data file 3294.

Figure 32J:
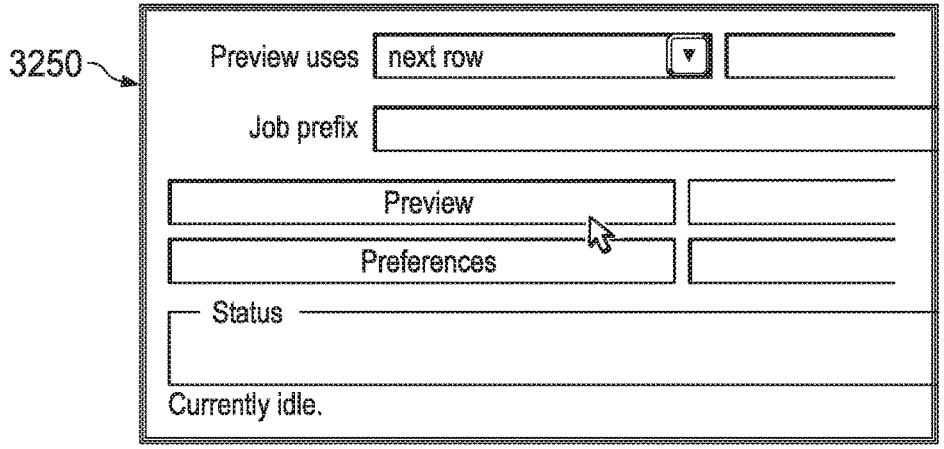
Figure 32K:
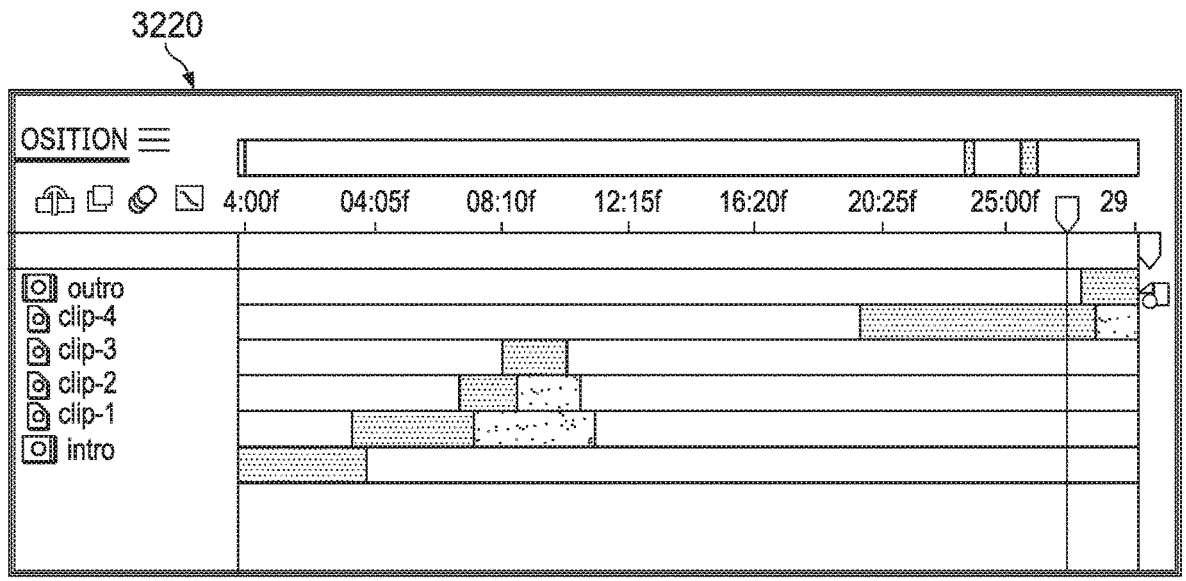

The user can then initiate a timeline invalidation using timeline utility area 3250 as depicted in FIG. 32J. Specifically, in one embodiment, the user may select a button (e.g., the "Preview" button) displayed in timeline utility area 3250. The selection of this button, may cause the temporal sculpting module of the digital compositing platform to retrieve a row of data from a data file linked to the project (e.g., data file 3294) and read the sources for the layers as defined in the row of the read data file. Moving to FIG. 32K, the sources for the layers as defined in the retrieved row of data can then be updated in the project file for the composition, changing the content of these layers. The composition layer display area 3220 will display the timeline and layers of the composition based on the updated layers. It will be noted that, for layers of a composition not specified in the data file, the content of those layers may not change and may be as previously defined in the project for the composition.

Figure 32L:
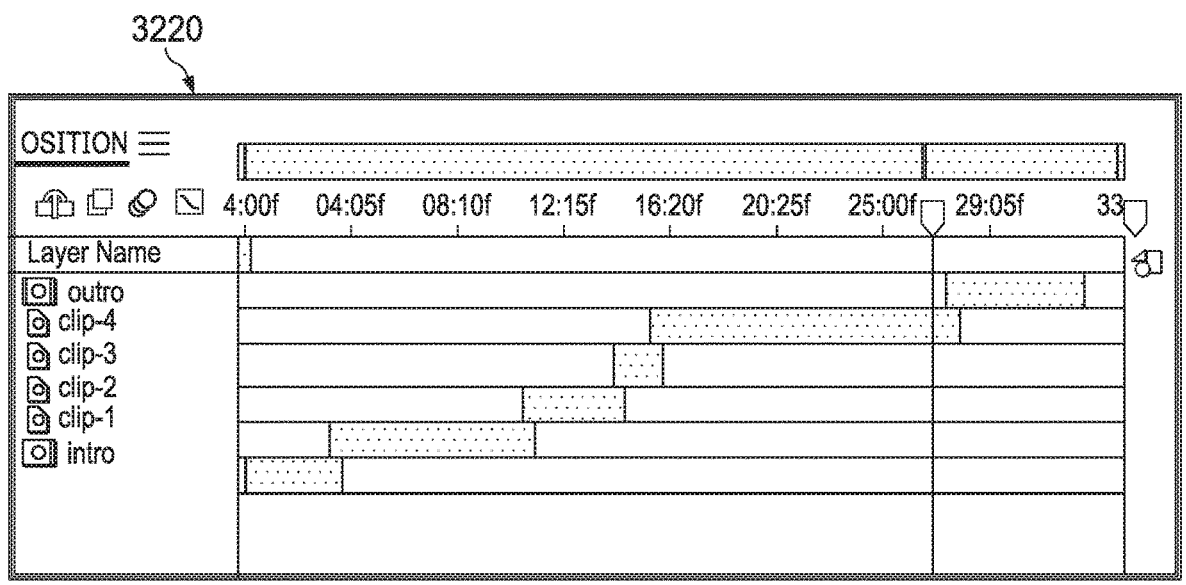

As the content of one or more layers of the composition have been altered, the temporal sculpting module may apply the time-sculpting rules of the composition as defined for one or more of the layers in the project. Specifically, the layers of the composition may be rearranged (e.g., by shifting, trimming, stretching or cropping) the appropriate layers of composition as discussed above according to the rules specified for the layers of the composition. This rearrangement may adjust the data (e.g., the in-point, out-point, start time, end time, playback speed, etc.) associated with one or more layers in the project. Such rearrangement may thus be done automatically without further user involvement. In this manner, layers within a composition can be made to automatically interact with one another in a composition with respect to, for example, start or end time, playback speed, in-point, out-point or other points associated with the layers or compositions. The composition layer display area 3220 will display the timeline and layers of the composition based on the rearranged layers as depicted in the embodiment of FIG. 32L.

Figure 32M:
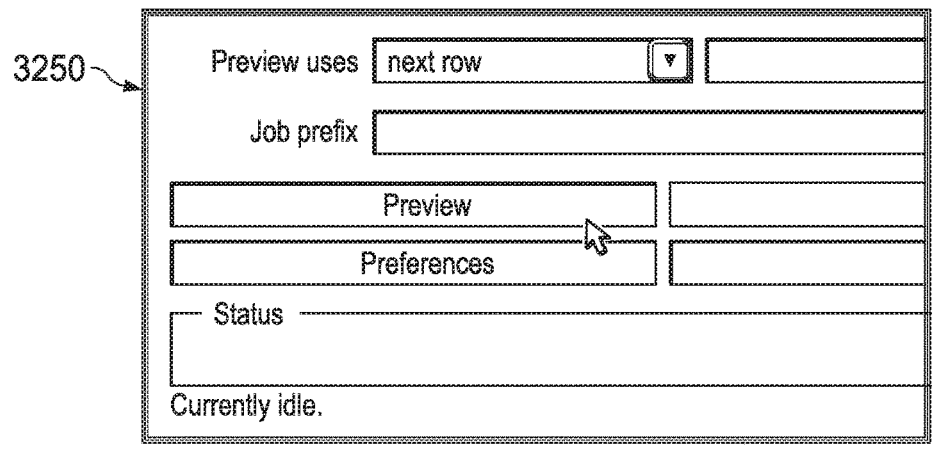
Figure 32N:
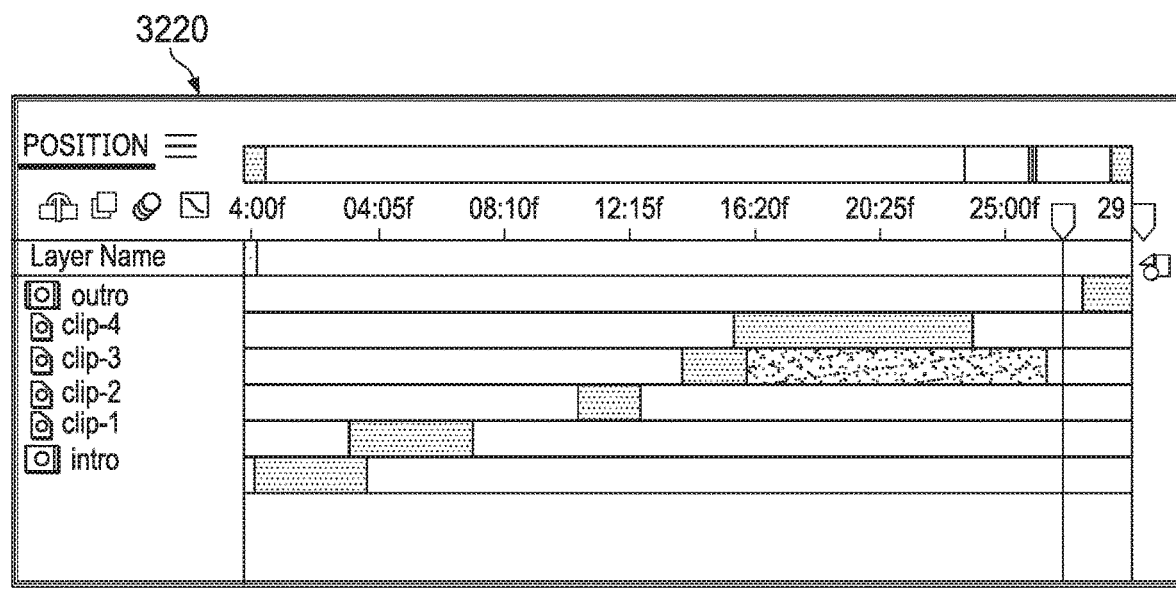
Figure 32O:
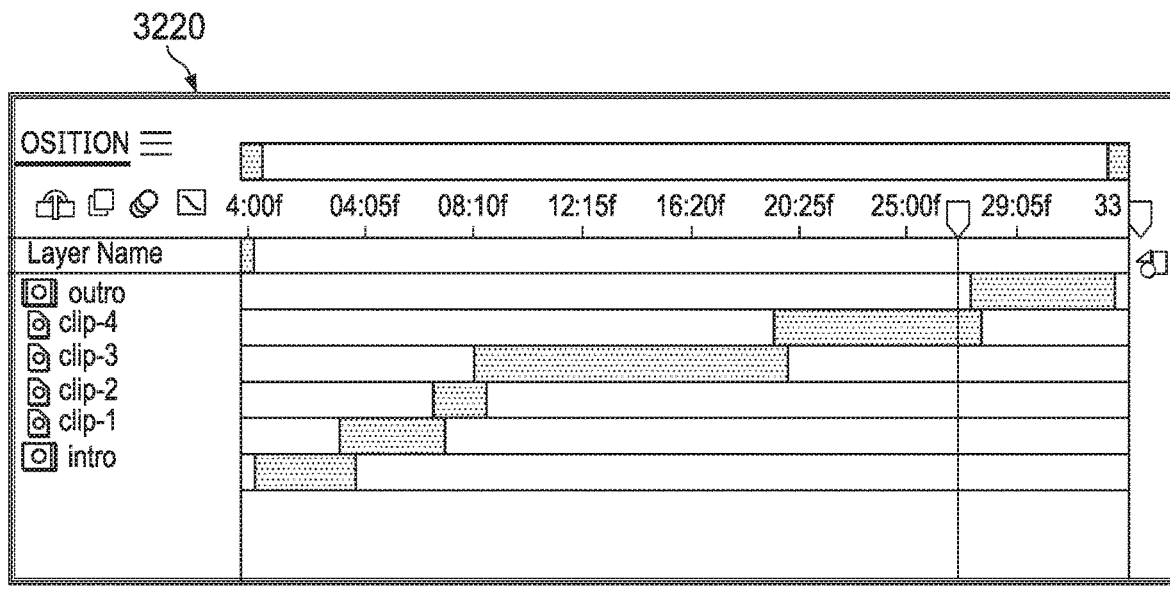

This process may then be repeated, as depicted in FIGS. 32M to 32O. The user can initiate another timeline invalidation using timeline utility area 3250 as depicted in FIG. 32M. The selection of the Preview button, may cause the temporal sculpting module of the digital compositing platform to retrieve the next row of data from the data file linked to the project (e.g., data file 3294) and read the sources for the layers as defined in the row of the read data file. Moving to FIG. 32N, the sources for the layers as defined in the retrieved row of data can then be updated in the project file for the composition, changing the content of these layers. The composition layer display area 3220 will display the timeline and layers of the composition based on the updated layers. As the content of one or more layers of the composition have been altered, the temporal sculpting module may apply the time-sculpting rules of the composition as defined for one or more of the layers in the project. Specifically, the layers of the composition may be rearranged (e.g., by shifting, trimming, stretching or cropping) the appropriate layers of composition as discussed above according to the rules specified for the layers of the composition. The composition layer display area 3220 will display the timeline and layers of the composition based on the rearranged layers as depicted in the embodiment of FIG. 32O.

A user may also cause the digital compositing platform to render each instance of the composition as defined in a data file (e.g., data file 3294) for the composition. In this case, a user may hit a "Render" button in the timeline utility area 3250. For each instance of the composition defined in the data file (e.g., data file 3294), the layers may be rearranged according to the set of time sculpting rules and the resulting composition queued for rendering by the digital compositing platform. Specifically, in one embodiment, the temporal sculpting module may iterate through each row of data in the data file linked to the project (e.g., data file 3294) and read the sources for the layers as defined in the row of the read data file. The sources for the layers as defined in the retrieved row of data can then be updated in the project file for the composition, changing the content of these layers (while layers that have not changed or are not specified in the data file may be as previously defined in the project for the composition). The temporal sculpting module may then queue that instance of the composition for rendering by the digital compositing platform and read the next row of the data file (if another row is present). The digital compositing platform can then render each instance of the composition and save the resulting output file (e.g., the resulting .mov, .mp4, .avi, etc). The resulting compositions will thus contain the content specified for each layer arranged according to the specified time-sculpting rules.

Now that embodiments of digital compositing platforms that include temporal sculpting modules that implement time-sculpting rules have been explained, attention is now directed to embodiments of methods for applying those time-sculpting rules. In particular, FIGS. 33-40 depict embodiments of methods for the configuring or sequencing of layers by application of one or more time sequencing rules to configure or sequence the layers of a composition (timeline invalidation).

Figure 33:
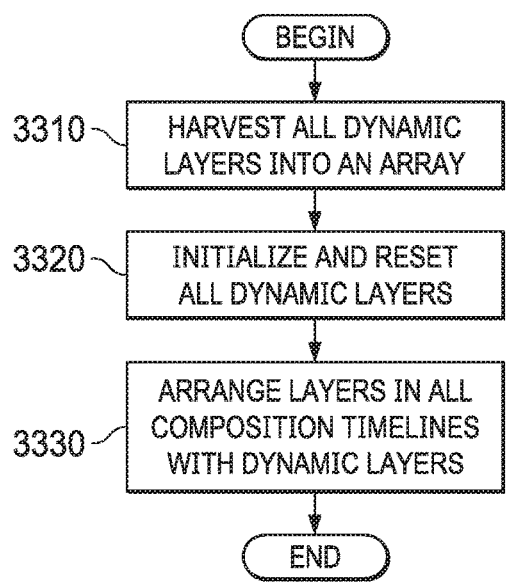
FIG. 33 is a flow diagram for one embodiment of method for configuring and sequencing layers within a digital video composition.

Looking first at FIG. 33, a flow diagram for one embodiment of method for configuring and sequencing layers within a digital video composition is depicted. Embodiments of such methods may be employed by a digital compositing platform including a temporal sculpting module. Initially, then, a digital video composition may include a project including a set of named layers (which may themselves be a (nested) composition) and a template defining a set of time-sculpting rules, each rule associated with one or more of the set of layers. When one or more layers of a composition changes or it is desired to change one or more layers, (e.g., when a timeline invalidation is initiated or occurs) all the dynamic layers of the composition may be harvested into a data structure (referred to without loss of generality as an array) (STEP 3310). Again, a dynamic layer is a layer of the composition which has a time-sculpting rule assigned to it, or associated with it. Thus, the harvesting may include determining from the template of the project all the layers referenced by the set of rules of the template and these layers placed into the array. The array thus includes references to each dynamic layer of the composition and the associated data or properties of that layer such as the start time, end time, in-point, out-point, playback speed, etc.

Using the array, then, each of the dynamic layers may be initialized and reset if needed (STEP 3320). Based on the set of rules of the template, the resetting process may (re)set the playback speed of all the dynamic layers to 100% (e.g., normal playback speed) for all layers (e.g., if a layer's playback speed it not already at 100%). During this step it can also be determined if any of the rules for a layer specify that the end point or start point of a layer is to be preserved. If so, the in-point of the layer may be set to the start time (if the start of the layer is to be preserved) or the out-point of the layer set to the end point of the layer (if the start of the layer is to be preserved).

Once the dynamic layers are initialized and reset, the layers may be arranged according to the set of rules of the template (STEP 3330). The arrangement of the layers may be done according to a nested depth of the composition of the project (referred to as the top-most or overall composition). In particular, in one embodiment, the maximum nested depth of the overall composition can be determined. For each level of depth, the layers can then be arranged according to the rules defined for those layers according to the template. This arrangement may include trimming one or more of the layers (e.g., setting a layer's in-point or out-point in the project based on a target layer's in-point or out-point); shifting one or more of the layers (e.g., setting a layer's start time or end time in the project so the layer's in-point or out-point reaches a target layer's in-point or out-point); cropping one or more layers (which may be compositions) (e.g., by adjusting the duration of the a containing composition where the beginning of a composition starts at a layer's in-point or the end of a composition ends at a layer's out-point, or both); or stretching one or more layers (e.g., by changing the duration of a layer in the project by adjusting the layer's playback speed until the layer's out-point reached the in-point or out-point of a target layer, or the end of the layer's containing composition).

Figure 34:
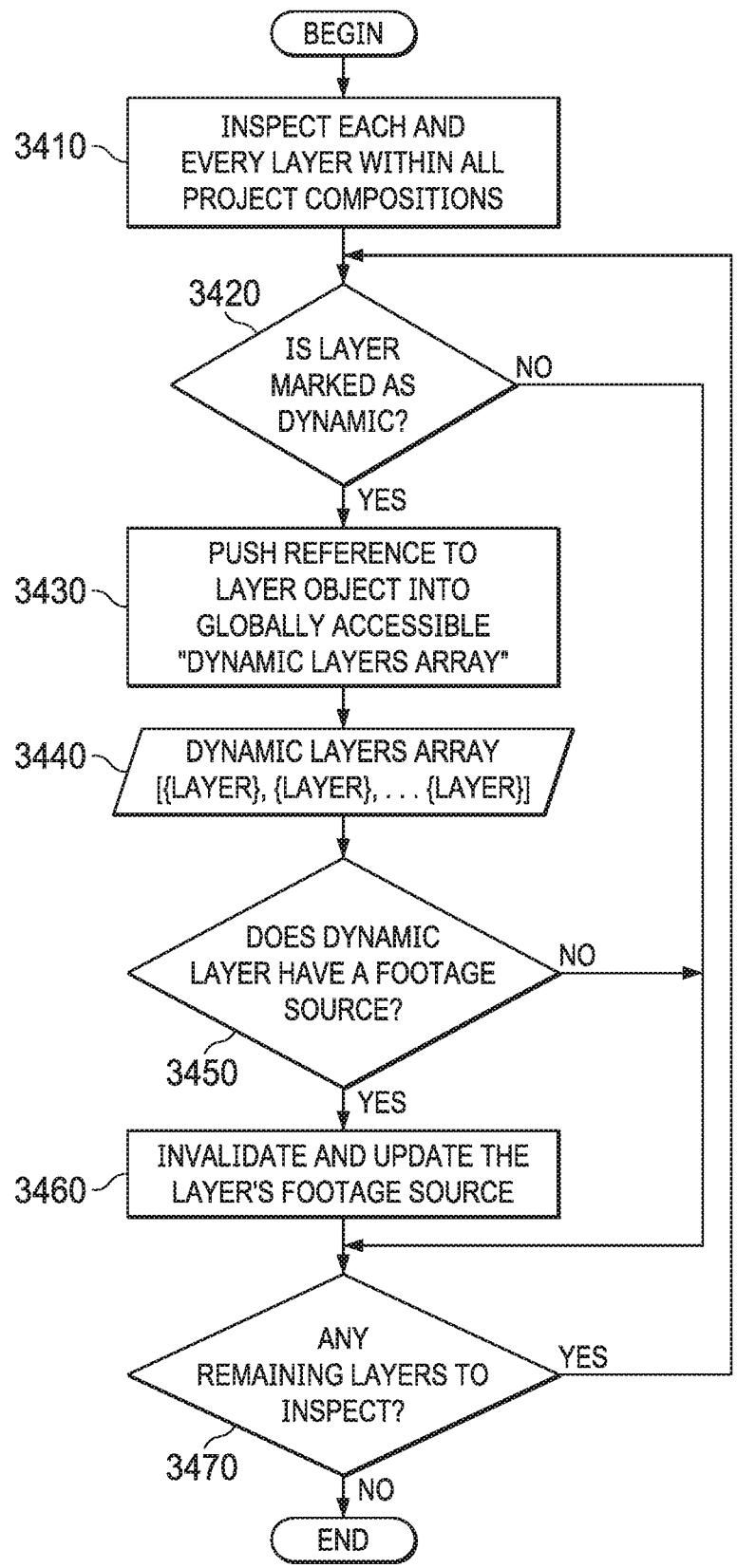
FIG. 34 is a flow diagram for one embodiment of a method for harvesting layers.
Figure 35:
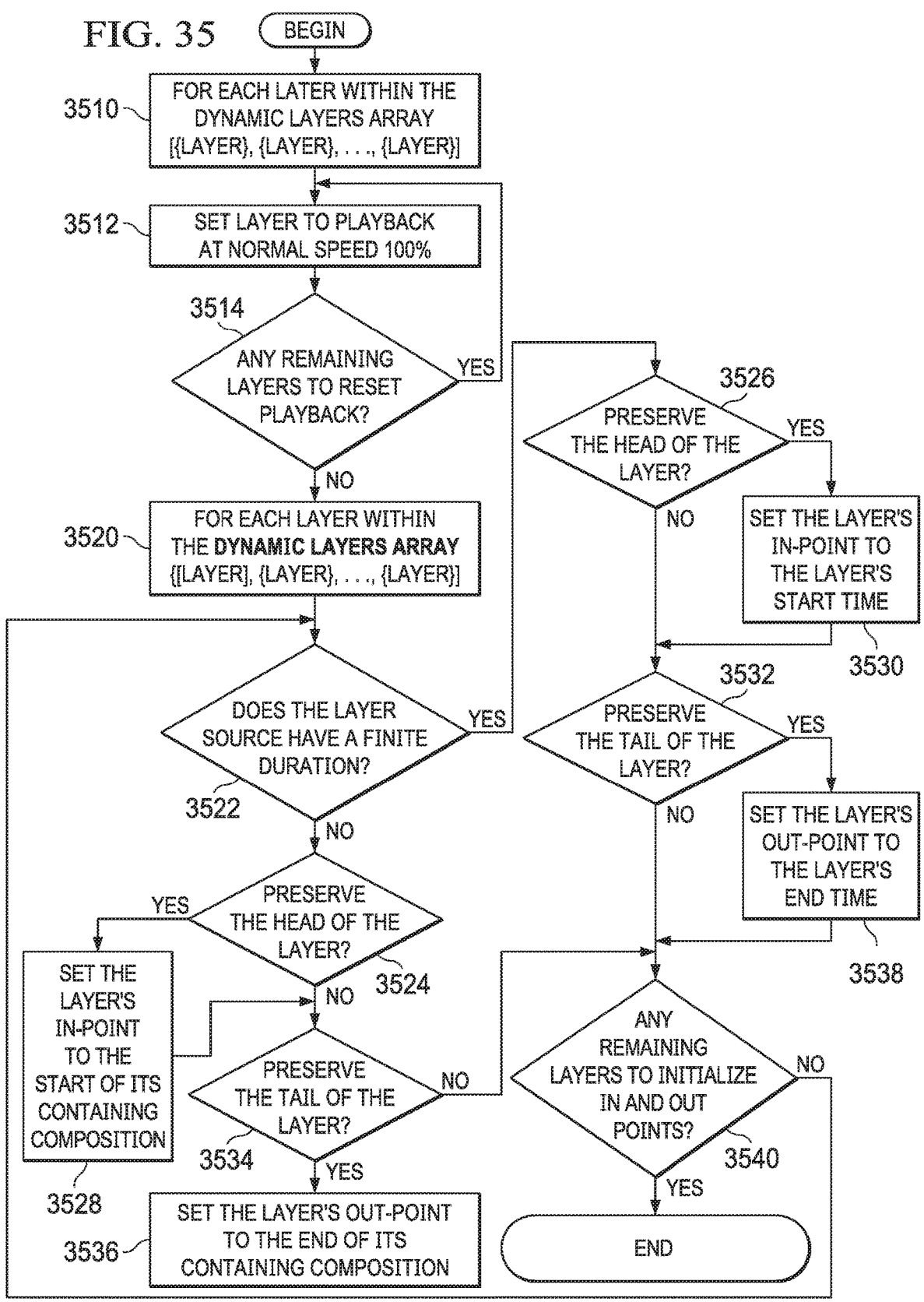
FIG. 35 is a flow diagram for one embodiment of a method for initializing and resetting layers.
Figure 36:
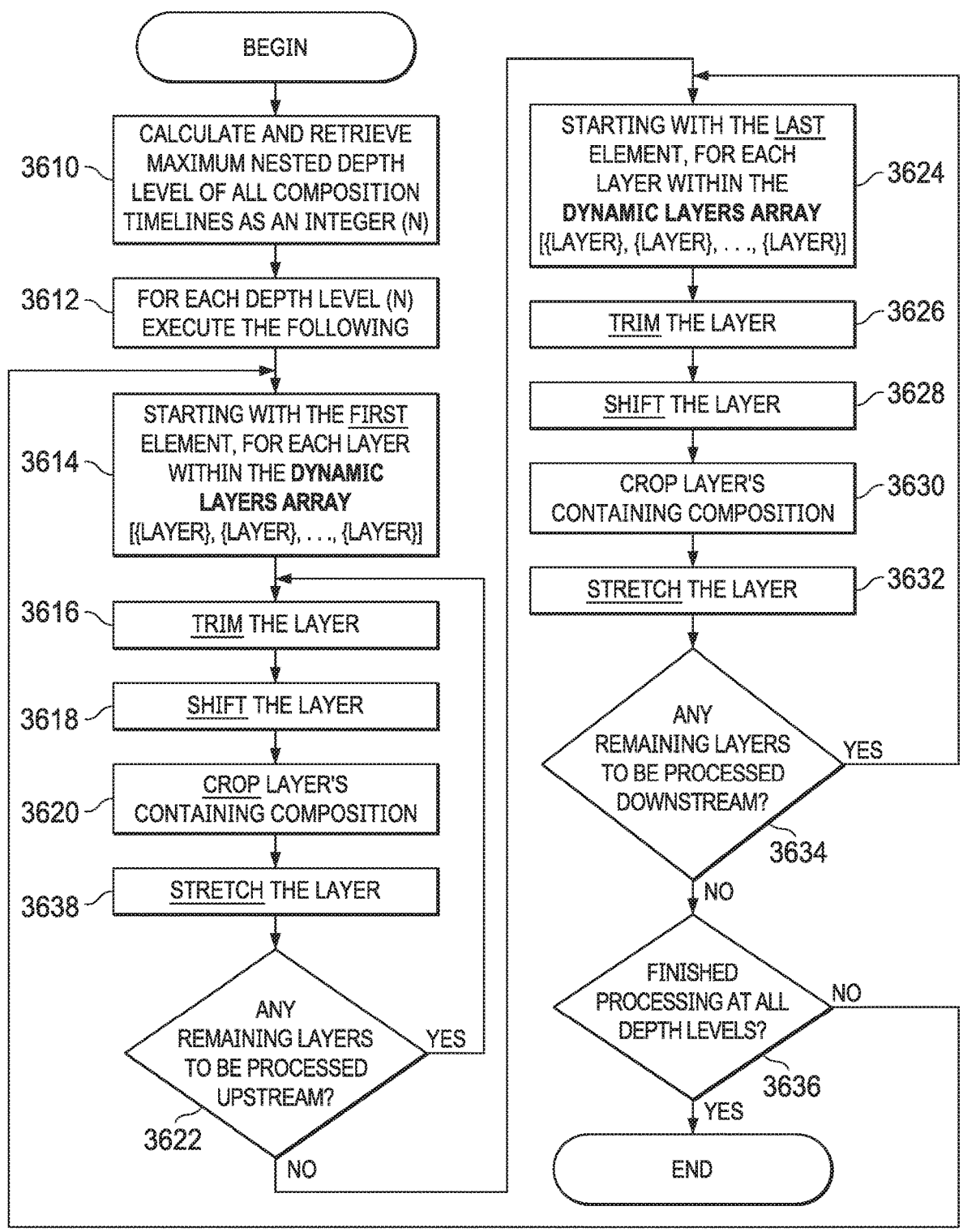
FIG. 36 is a flow diagram for one embodiment of a method for arranging the layers of a composition.

Each of the steps of FIG. 33 will now be explained in more detail. FIG. 34 depicts one embodiment of a method for harvesting layers; FIG. 35 depicts one embodiment of a method for initializing and resetting layers; and FIG. 36 depicts one embodiment of a method arranging the layers of the composition. Referring to FIG. 34, initially, then, a digital video composition may include a project including a set of named layers (which may themselves be a (nested) composition) and a template defining a set of time-sculpting rules, each rule associated with one or more of the set of layers. When one or more layers of a composition changes or it is desired to change one or more layers, (e.g., when a timeline invalidation is initiated or occurs) all the dynamic layers of the composition may be harvested into a data structure (referred to without loss of generality as an array).

Each layer of the project may be inspected (STEP 3410) to determine if that layer is a dynamic layer (STEP 3420). In one embodiment, for a particular layer the rules of the template may be obtained and evaluated to determine if that layer is referenced by any of the rules of the template. If the layer is referenced it can be determined that the layer is marked as dynamic, while if no rule of the template references that layer it can be determined that the layer is not dynamic. If the layer is determined not to be a dynamic layer (NO branch of STEP 3420), it can be determined if the last layer of the project has been evaluated (STEP 3470). If it is the last layer, the harvesting of the layers may be complete (NO branch of STEP 3470), otherwise (YES branch of STEP 3470) the next layer of the project may be evaluated to determine if it is a dynamic layer (STEP 3420).

If, however, the layer is determined to be dynamic (e.g., is referenced by a rule) (YES branch of STEP 3420) the layer may be added to an array of dynamic layers (referred to in the following FIGURES as the "Dynamic Layers Array") (STEPS 3430, 3440). In one embodiment, the adding of the layer as a dynamic layer to the Dynamic Layer Array may comprise pushing or putting an object for that layer into the array. This object may be a reference to the layer in the project and thus may reference or include the associated data or properties of that layer, including, for example, the start time, end time, in-point, out-point, playback speed, containing or sub compositions or layers (composition(s) which contain the layer or compositions or layers which the layer includes), etc.

Once layer is determined to be dynamic and added to the Dynamic Layer Array, it can further be determined if that dynamic layer has a footage (e.g., not a still image) source (STEP 3450). If the layer has a footage source (YES branch of STEP 3450) the layer's footage source may be invalidated and updated to the new source (STEP 3460). In one embodiment, this determination may entail determining if the footage source for that layer has changed or been altered from a source of content currently associated with that layer in the project. Thus, for example, as discussed above a data file may include footage sources for one or more layers of the composition of the project or the user may have otherwise specified footage sources for one or more layers of the composition. From the footage sources specified (e.g., the data file, row of the data file, user specification, etc.) it can be determined if there is a footage source for the layer different than the footage source currently associated with the layer in the project. In one embodiment, if the dynamic layer has a footage source (regardless of whether the source has changed or not), the footage source of the layer may be invalidated and updated (e.g., in the Dynamic Layer Array), such that any changes in the footage source may be accounted for (e.g., duration, location, etc.). It will be understood, that, in some embodiments, as the Dynamic Layer Array may include objects that reference the corresponding layer in the project, an update of the data associated with the layer in the Dynamic Layer Array may serve to (or may actually be) an update of the data associated with the layer in the project itself.

If the dynamic layer is determined not to have a footage source (NO branch of STEP 3450), it can be determined if the last layer of the project has been evaluated (STEP 3470). If it is the last layer of the project, the harvesting of the layers may be complete (NO branch of STEP 3470), otherwise (YES branch of STEP 3470) the next layer may be evaluated to determine if it is a dynamic layer (STEP 3420).

Using the Dynamic Layer Array, then, each of the dynamic layers found may be initialized and reset if needed. FIG. 35 depicts one embodiment of a method for initializing and resetting layers Based on the set of rules of the template, the resetting process may (re)set the playback speed of all the dynamic layers to 100% (e.g., normal playback speed) for all layers (e.g., if a layer's playback speed it not already at 100%). It can also be determined if any of the rules for a layer specify that the end point or start point of a layer is to be preserved. If so, the in-point of the layer may be set to the start time (if the start of the layer is to be preserved) or the out-point of the layer set to the end point of the layer (if the start of the layer is to be preserved).

More specifically, in one embodiment, each dynamic layer of the Dynamic Layer Array (STEP 3510) may be iterated through to (re)set the playback speed of that dynamic layers to 100% (STEP 3512) (e.g., each layer's associated playback speed in the Dynamic Layer Array may be set to 100%). Once the last layer of the Dynamic Layer Array has been processed (YES branch of STEP 3514), each layer of the Dynamic Layer Array may be iterated through again (STEP 3520). In this loop, for each layer, it can be determined if the layer has a finite duration (STEP 3522). For example, videos or compositions may be of a finite duration, while still images may not have a finite duration. Other examples are possible. If the dynamic layer has a finite duration (YES branch of STEP 3522) it can be determined if a rule of the template for the project indicates that the head of that layer is to be preserved (e.g., a user has checked the "Preserve Start" box when setting the control parameter for that layer in the Trim menu of an interface) (STEP 3526). If a rule indicates that the head (or start) of the layer is to be preserved, the layer's associated in-point may be set to the layer's start time (e.g., the layer's associated in-point in the Dynamic Layer Array may be set to the layer's start time) (STEP 3530).

Similarly, it can be determined if a rule of the template for the project indicates that the tail of that layer is to be preserved (e.g., a user has checked the "Preserve End" box when setting the control parameter for that layer in the Trim menu of an interface). If a rule indicates that the tail (or end) of the layer is to be preserved (YES branch of STEP 3532), the layer's associated out-point may be set to the layer's end time (e.g., the layer's associated out-point in the Dynamic Layer Array may be set to the layer's end time) (STEP 3538). If the last layer in the Dynamic Layer Array has been processed, the reset and initialization of the layers may end (YES branch of STEP 3540). Otherwise, the next layer may be processed (NO branch of STEP 3540).

If a dynamic layer does not have a finite duration (NO branch of STEP 3522) it can be determined if a rule of the template for the project indicates that the head of that layer is to be preserved (e.g., a user has checked the "Preserve Start" box when setting the control parameter for that layer in the Trim menu of an interface) (STEP 3524). If a rule indicates that the head (or start) of the layer is to be preserved, in this case the layer's associated in-point may be set to the start time of the composition that contains that layer (e.g., the layer's associated in-point in the Dynamic Layer Array may be set to the containing composition's start time) (STEP 3528).

It can also be determined if a rule of the template for the project indicates that the tail of that layer is to be preserved (e.g., a user has checked the "Preserve End" box when setting the control parameter for that layer in the Trim menu of an interface). If a rule indicates that the tail (or end) of the layer is to be preserved (YES branch of STEP 3534), the layer's associated out-point may be set to the end time or the composition that contains that layer (e.g., the layer's associated out-point in the Dynamic Layer Array may be set to the containing composition's end time) (STEP 3536). If the last layer in the Dynamic Layer Array has been processed, the reset and initialization of the layers may end (YES branch of STEP 3540). Otherwise, the next layer may be processed (NO branch of STEP 3540).

Once the dynamic layers are initialized and reset, the layers may be arranged according to the set of rules of the template. The arrangement of the layers may be done according to a nested depth of the composition of the project (referred to as the top-most or overall composition). In particular, in one embodiment, the maximum nested depth of the overall composition can be determined. For each level of depth, the layers can then be arranged according to the rules defined for those layers according to the template. In one embodiment, this may include iterating through the layers in both a forward direction and performing arrangement of the layers, followed by iterating through the layers at that depth in the reverse direction and performing arrangement of the layers. The arrangement of the layers in each direction may include trimming, shifting; cropping or stretching one or more layers.

FIG. 36 depicts one embodiment of a method for arranging the layers of the composition. Initially, the maximum depth (N) of the composition may be determined (STEP 3610). As discussed, nesting is the inclusion of one composition within another where the nested composition appears as a layer in the containing composition. A nested composition may, itself, contain nested compositions, etc. Therefore, a composition may be thought of as a tree structure, where the root node of the corresponding tree structure is the topmost composition (or the composition corresponding to the project), each layer of the composition that is not itself a composition may be thought of as a leaf node, and each composition may be thought of as an internal node (inode or node of the tree that has any children) of the tree that will have one or more child nodes corresponding to the layers that the composition contains (where these child nodes may be leaf nodes or other inodes). The maximum depth of a composition may therefore be thought of as the maximum depth of any inode of the tree structure corresponding to the composition. Thought of another way, the maximum depth of the composition may be the greatest length of any path from the root node of the tree structure corresponding to the composition to any inode of that tree structure.

Once the depth level (N) is determined, a loop may be executed for each depth level (e.g., 1 to N) (STEP 3612), where for each level the layers (e.g., all layers at each level) can be arranged in a forward direction and arranged in a reverse direction. Accordingly, as will be recalled from the above discussion, the layers may be ordered according to depth in the Dynamic Layer Array, with layers a higher depth (e.g., less nested) appearing before those at a greater depth (more nested). In other words, using the tree structure of a composition for analogy again, the layers of a composition may be ordered in the Dynamic Layer Array such that layers at a higher level of the tree (e.g., shorter length path to the root node) appear before layers at a lower level of the tree (e.g. longer length path to the root node). The layers are thus initially iterated through for a depth level starting with the first layer in the Dynamic Layer Array and iterating through them sequentially (STEP 3614) (referred to as being processed in an "upstream" or forward direction). For each layer, that layer can then be trimmed (if needed) (STEP 3616) by setting the layer's in-point or out-point based on a target layer's in-point or out-point; shifted (if needed) (STEP 3618) by setting the layer's start time or end time so the layer's in-point or out-point reaches a target layer's in-point or out-point; cropped (if needed) (STEP 3620) by adjusting the duration of the a containing composition; or stretched (if needed) (STEP 3638) by changing the duration of a layer in the project by adjusting the layer's playback speed until the layer's out-point reached the in-point or out-point of a target layer, or the end of the layer's containing composition. Each layer of the Dynamic Layer Array can thus be iterated through sequentially until it is determined (STEP 3622) that there are no more layers in the Dynamic Layer Array to be arranged in an upstream order (NO branch of STEP 3622).

When it is determined that all the layers of the Dynamic Layer Array have been iterated through in an upstream or forward direction (e.g., from higher level to lower levels) ((NO branch of STEP 3622) the layers of the Dynamic Layer Array can then be iterated through in a downstream or reverse direction (e.g., from lower levels to higher levels). Again, remember the layers may be in the order according to depth in the Dynamic Layer Array, with layers at a higher depth (e.g., less nested) appearing before those at a greater depth (more nested). Thus, in this embodiment, the layers are now iterated through for the depth level starting with the last layer in the Dynamic Layer Array and iterating through them in reverse sequential order (STEP 3624) (referred to as being processed in a "downstream" direction). Again, for each layer, that layer can then be trimmed (if needed) (STEP 3626); shifted (if needed) (STEP 3628); cropped (if needed) (STEP 3630); or stretched (if needed) (STEP 3632). Each layer of the Dynamic Layer Array can thus be iterated through in reverse sequential order until it is determined (STEP 3634) that there are no more layers in the Dynamic Layer Array to be arranged in an downstream order (NO branch of STEP 3622). If, at this point it is determined that a number of iterations equal to the depth level (N) have been performed (YES branch of STEP 3636) the arrangement of the layers according to the time-sculpting rules may be complete. If, however, a number of iterations is not equal to the depth level (N), the Dynamic Layer Array may again be iterated through in a forward and reverse direction (NO branch of STEP 3636).

Figure 37:
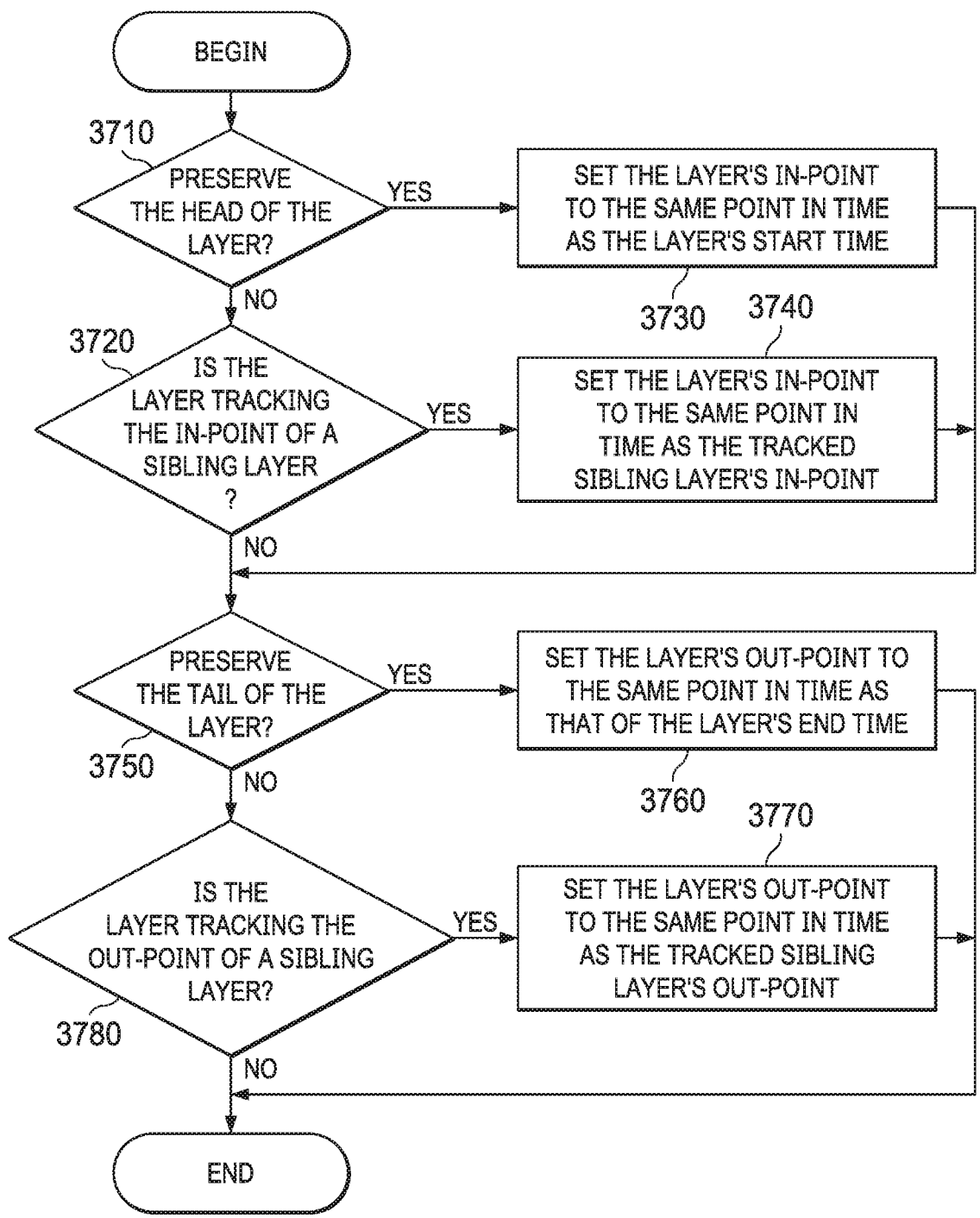
FIG. 37 is a flow diagram for one embodiment of a method for trimming a layer.

FIGS. 37-40 depict embodiments of methods for the trimming, shifting, cropping or stretching of a layer that may be employed when arranging the layers of a composition. Referring first to FIG. 37, one embodiment of a method for trimming a layer is depicted. For the layer being trimmed, it can be determined if a rule of the template for the project indicates that the head of that layer is to be preserved (e.g., a user has checked the "Preserve Start" box when setting the control parameter for that layer in the Trim menu of an interface) (STEP 3710). If a rule indicates that the head (or start) of the layer is to be preserved (YES branch of STEP 3710), in this case the layer's associated in-point may be set to the same point in time as the layer's start time (e.g., the layer's associated in-point in the Dynamic Layer Array may be set to the start time of the layer) (STEP 3730). It will be noted that in certain embodiments, these steps or similar steps may occur in the reset and initialization of layers of the composition and may not need to be repeated when trimming the layer.

If no rule indicates that the head (or start) of the layer is to be preserved (NO branch of STEP 3710), it can be determined if a rule of the template specifies that the in-point of this layer is to be trimmed to in-point of a target (sibling) layer. If such a rule exists (YES branch of STEP 3720) the layer's associated in-point may be set to the same point in time as the sibling layer's in-point (e.g., the layer's associated in-point in the Dynamic Layer Array may be set to the sibling layer's in-point) (STEP 3740). At this point, any overlap designated in the rule may also be accounted for (e.g., if an overlap of a number of frames is specified in the rule, the layer's associated in-point may be set to the same point in time as the sibling layer's in-point with the amount of overlap designated by the rule). While not shown, similar steps may be performed for the in-point of the layer and the out-point of any sibling layer.

It can then be determined if a rule of the template for the project indicates that the tail; of that layer is to be preserved (e.g., a user has checked the "Preserve End" box when setting the control parameter for that layer in the Trim menu of an interface) (STEP 3750). If a rule indicates that the tail (or end) of the layer is to be preserved (YES branch of STEP 3750), the layer's associated out-point may be set to the same point in time as the layer's end time (e.g., the layer's associated out-point in the Dynamic Layer Array may be set to the end time of the layer) (STEP 3760). It will be noted here again, that in certain embodiments, these steps or similar steps may occur in the reset and initialization of layers of the composition and may not need to be repeated when trimming the layer.

If no rule indicates that the tail (or end) of the layer is to be preserved (NO branch of STEP 3750), it can be determined if a rule of the template specifies that the out-point of this layer is to be trimmed to an out-point of a target (sibling) layer. If such a rule exists (YES branch of STEP 3780) the layer's associated out-point may be set to the same point in time as the sibling layer's out-point (e.g., the layer's associated out-point in the Dynamic Layer Array may be set to the sibling layer's out-point) (STEP 3770). At this point, any overlap designated in the rule may also be accounted for (e.g., if an overlap of a number of frames is specified in the rule, the layer's associated out-point may be set to the same point in time as the sibling layer's out-point with the amount of overlap designated by the rule). While not shown, similar steps may be performed for the out-point of the layer and the in-point of any sibling layer.

Figure 38:
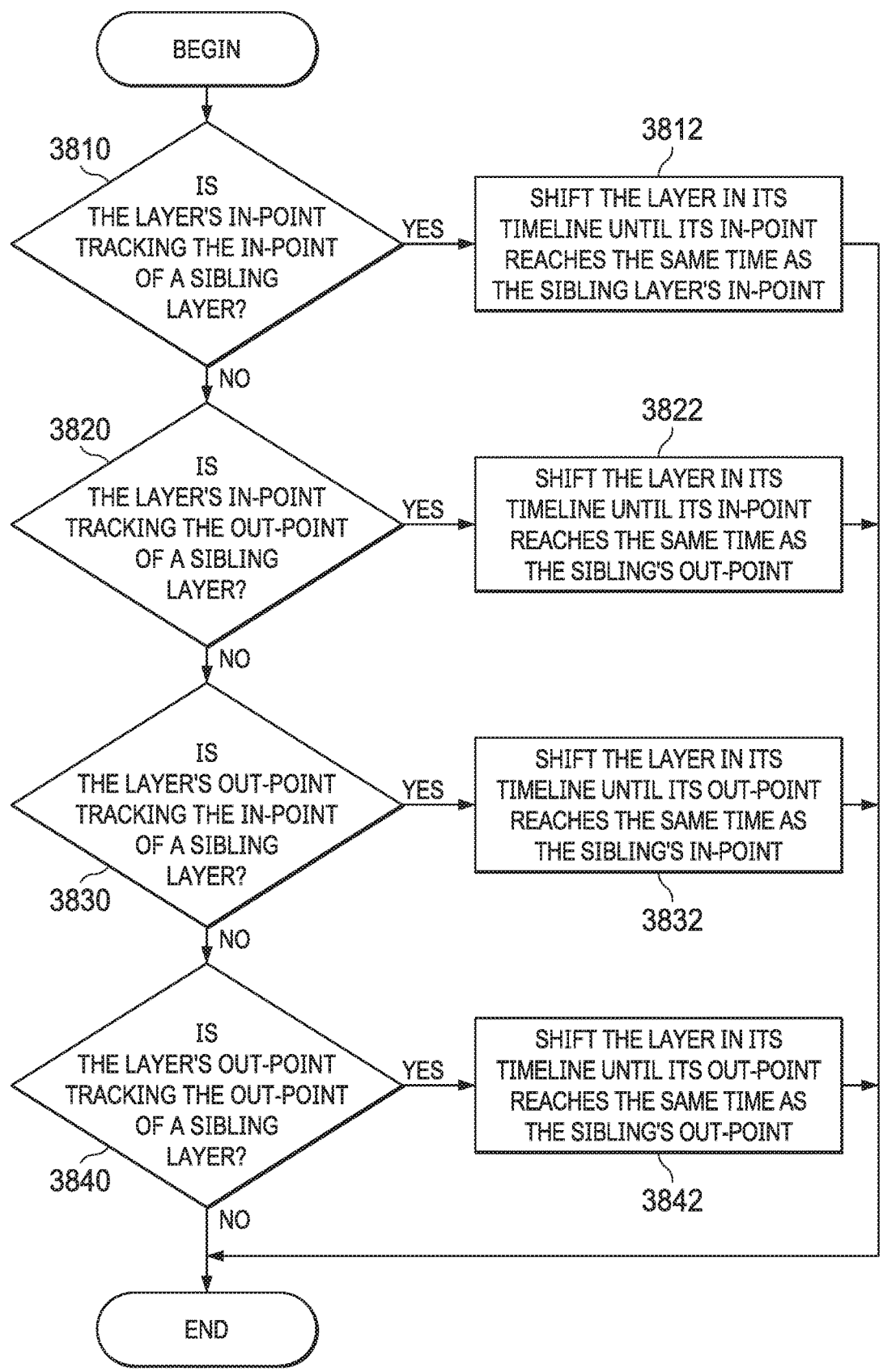
FIG. 38 is a flow diagram for one embodiment of a method for shifting a layer.

Moving now to FIG. 38, one embodiment of a method for shifting a layer is depicted. Here, it can be determined if a rule specifies that the in-point of this layer is to be trimmed to an in-point of a target (sibling) layer. If such a rule exists (YES branch of STEP 3810) the layer may be shifted with respect to the time line of the containing composition until the layer's in-point is the same time as the sibling layer's in-point (STEP 3812). In one embodiment, the amount of time needed to add (or subtract) to (or from) the current in-point of the layer to cause the in-point of the layer to be the same as the in-point of the sibling layer may be determined and this amount of time added to (or subtracted from) both the in-point and the out-point of the layer (e.g., the amount of time added to (or subtracted from) the layer's associated in-point and out-point in the Dynamic Layer Array). At this point, any overlap designated in the rule may also be accounted for (e.g., if an overlap of a number of frames is specified in the rule, the associated amount of time added (or subtracted) may account for the amount of overlap designated by the rule).

If no rule specifies that the in-point of this layer is to be trimmed to an in-point of a target (sibling) layer (NO branch of STEP 3810), it can be determined if a rule specifies that the in-point of this layer is to be trimmed to an out-point of a sibling layer. If such a rule exists (YES branch of STEP 3820) the layer may be shifted with respect to the time line of the containing composition until the layer's in-point is the same time as the sibling layer's out-point (STEP 3822). In one embodiment, the amount of time needed to add (or subtract) to (or from) the current in-point of the layer to cause the in-point of the layer to be the same as the out-point of the sibling layer may be determined and this amount of time added to (or subtracted from) both the in-point and the out-point of the layer (e.g., the amount of time added to (or subtracted from) the layer's associated in-point and out-point in the Dynamic Layer Array). At this point, any overlap designated in the rule may also be accounted for (e.g., if an overlap of a number of frames is specified in the rule, the amount of time added (or subtracted) may account for the amount of overlap designated by the rule).

If no rule specifies that the in-point of this layer is to be trimmed to an out-point of a target (sibling) layer (NO branch of STEP 3820), it can be determined if a rule specifies that the out-point of this layer is to be trimmed to an in-point of a sibling layer. If such a rule exists (YES branch of STEP 3830) the layer may be shifted with respect to the time line of the containing composition until the layer's out-point is the same time as the sibling layer's in-point (STEP 3832). In one embodiment, the amount of time needed to add (or subtract) to (or from) the current out-point of the layer to cause the out-point of the layer to be the same as the in-point of the sibling layer may be determined and this amount of time added to (or subtracted from) both the in-point and the out-point of the layer (e.g., the amount of time added to (or subtracted from) the layer's associated in-point and out-point in the Dynamic Layer Array). At this point, any overlap designated in the rule may also be accounted for (e.g., if an overlap of a number of frames is specified in the rule, the amount of time added (or subtracted) may account for the amount of overlap designated by the rule).

If no rule specifies that the out-point of this layer is to be trimmed to an in-point of a sibling layer (NO branch of STEP 3830), it can be determined if a rule specifies that the out-point of this layer is to be trimmed to an out-point of a sibling layer. If such a rule exists (YES branch of STEP 3840) the layer may be shifted with respect to the time line of the containing composition until the layer's out-point is the same time as the sibling layer's out-point (STEP 3842). In one embodiment, the amount of time needed to add (or subtract) to (or from) the current out-point of the layer to cause the out-point of the layer to be the same as the out-point of the sibling layer may be determined and this amount of time added to (or subtracted from) both the in-point and the out-point of the layer (e.g., the amount of time added to (or subtracted from) the layer's associated in-point and out-point in the Dynamic Layer Array). At this point, any overlap designated in the rule may also be accounted for (e.g., if an overlap of a number of frames is specified in the rule, the amount of time added (or subtracted) may account for the amount of overlap designated by the rule).

Figure 39:
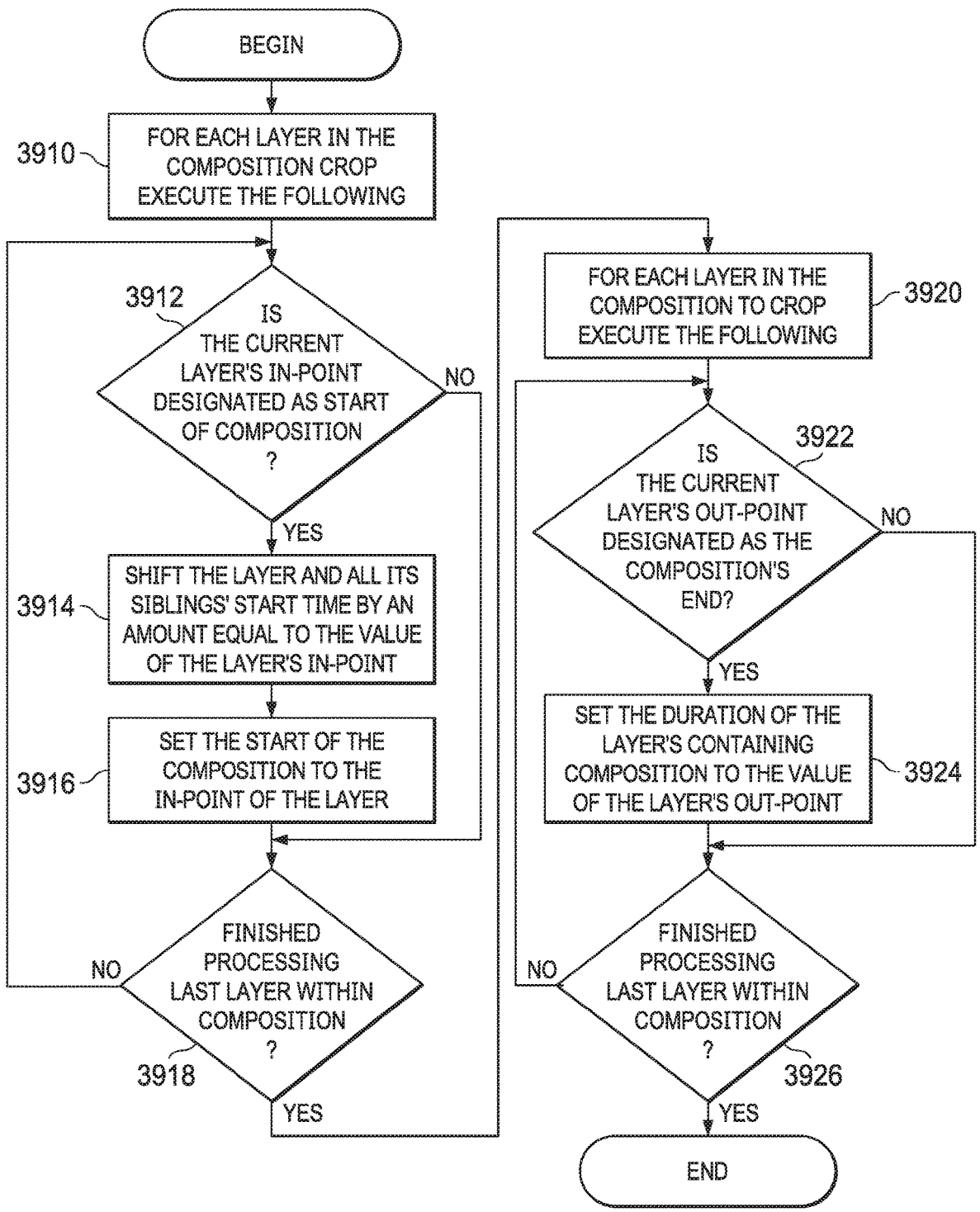
FIG. 39 is a flow diagram for one embodiment of a method for cropping a composition.

FIG. 39 depicts one embodiment of a method for cropping a composition. Each of the layers in a composition can be iterated through (STEP 3910). For each of the layers, it can be determined if there is a rule designating that layer's in-point as the start of the containing composition (STEP 3912). If there is such a rule (YES branch of STEP 3912), the start time of that layer and all the sibling layers may be shifted based on the layer's in-point (STEP 3914) (e.g., the layers' associated start time may be shifted in the Dynamic Layer Array). In one embodiment, an amount of time equal to the layer's in-point may be added to the in-point of the layers. The start of the containing composition may then be set to the in-point of that layer (STEP 3916) (e.g., the composition's associated start time may be set to the in-point of that layer in the Dynamic Layer Array). If the last layer of the composition has been processed at this point (YES branch of STEP 3918), the layers can then be iterated through again (STEP 3920).

For each of the layers, it can be determined if there is a rule designating that layer's out-point as the end of the containing composition (STEP 3922). If there is such a rule (YES branch of STEP 3922), the duration or end time of the containing composition may be set to the out-point of that layer (STEP 3924) (e.g., the composition's associated end time may be set to the same time as the out-point of that layer in the Dynamic Layer Array). If the last layer of the composition has been processed at this point (YES branch of STEP 3926) the cropping of the composition may be complete.

Figure 40:
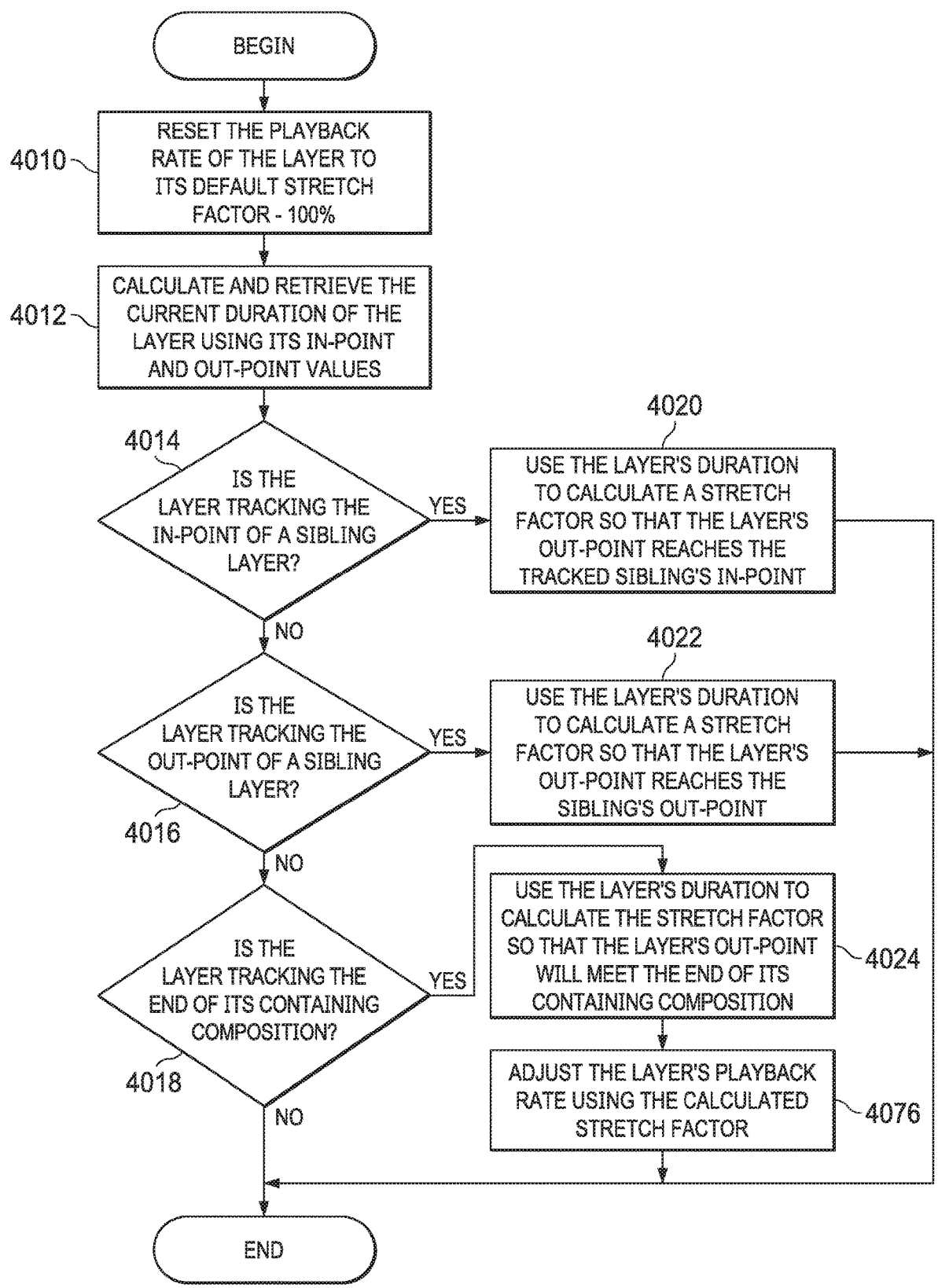
FIG. 40 is a flow diagram for one embodiment of a method for stretching a layer.

FIG. 40 depicts one embodiment of a method for stretching a layer. For the layer being stretched the playback rate of the layer may be reset to the default stretch factor (e.g., 100% or normal playback rate) (STEP 4010). It will be noted that in certain embodiments, these steps or similar steps may occur in the reset and initialization of layers of the composition and may not need to be repeated when stretching the layer. The current in-points and outpoints of the layers can then be determined using the in-point and out-point layer (e.g., which may be determined from the Dynamic Layer Array entry associated with the layer) (STEP 4012). It can then be determined if a rule of the template for the project indicates that the layer is to be stretched to the in-point of a target layer (STEP 4014). If a rule indicates that the layer is to be stretched to an in-point of a target layer a stretch factor may be calculated. This stretch factor may include, or may be used to determine, a playback speed (e.g., a percentage) based on the layer's duration and the target layer's in-point, such that the layer's out-point is the same as the target layer's in-point (STEP 4020). The layer's playback speed can then be set to the determined playback speed (e.g., the layer's associated playback speed in the Dynamic Layer Array may be set to the determined playback speed) (STEP 4076).

If no rule indicates that the layer is to be stretched to the in-point of a target layer (NO branch of STEP 4014), it can be determined if a rule of the template for the project indicates that the layer is to be stretched to the out-point of a target layer (STEP 4016). If a rule indicates that the layer is to be stretched to an out-point of a target layer a stretch factor may be calculated. This stretch factor may include, or may be used to determine, a playback speed (e.g., a percentage) based on the layer's duration and the target layer's out-point, such that the layer's out-point is the same as the target layer's out-point (STEP 4022). The layer's playback speed can then be set to the determined playback speed (e.g., the layer's associated playback speed in the Dynamic Layer Array may be set to the determined playback speed) (STEP 4076).

If no rule indicates that the layer is to be stretched to an out-point of a target layer (NO branch of STEP 4016), it can be determined if a rule of the template for the project indicates that the layer is to be stretched to the end time of the composition which contains the layer (STEP 4018). If a rule indicates that the layer is to be stretched to an end of the containing composition, a stretch factor may be calculated. This stretch factor may include, or may be used to determine, a playback speed (e.g., a percentage) based on the layer's duration and the containing composition's end time, such that the layer's out-point is the same as the composition's end time (STEP 4024). The layer's playback speed can then be set to the determined playback speed (e.g., the layer's associated playback speed in the Dynamic Layer Array may be set to the determined playback speed) (STEP 4076).

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, the meaning of "in" includes "in" and "on" unless the context clearly dictates otherwise.

What is claimed is:

1. A digital video compositing system for automatic temporal adjustment of a digital composition, comprising:
   a data store, including a project defining a composition arranged according to a first temporal arrangement including a timeline and having a set of layers, wherein the set of layers of the composition are arranged according to the first temporal arrangement and each layer is associated with corresponding digital content;
   a non-transitory computer readable medium comprising instructions for temporal sculpting, the instructions for:
      allowing a user to define a set of temporal sculpting rules including a first temporal sculpting rule associated with a first layer of the composition, where the first temporal rule is a target rule establishing a link between the first layer and a target associated with the composition; and
      storing the set of temporal rules in the data store in association with the composition, including storing the first temporal sculpting rule in association with the first layer; and
   a rules engine for:
      determining that digital content corresponding to the composition has changed; and
      automatically adjusting the composition from the first temporal arrangement to a second temporal arrangement to conform with the first temporal sculpting rule without user involvement, wherein adjusting the temporal arrangement comprises modifying the project to temporally arrange the first layer within the composition based on the link between the first layer and target by preserving a set of properties of the first layer during a first time period corresponding to the target based on the link between the first layer and the target associated with the composition.

2. The digital video compositing system of claim 1, wherein modifying the project to temporally arrange the first layer within the composition based on the link between the first layer and target comprises modifying the set of properties of the first layer during a second time period that does not overlap with the first time period corresponding to the target based on the link between the first layer and the target associated with the composition.

3. The digital video compositing system of claim 1, wherein the target is one or more of a time stamp, a second layer, a user defined marker or a keyframe.

4. The digital video compositing system of claim 3, wherein the time stamp is defined with respect to the composition or the second layer.

5. The digital video compositing system of claim 3, wherein the keyframe is defined with respect to the second layer.

6. The digital video compositing system of claim 1, wherein the temporal sculpting instructions are integrated into the digital compositing platform system.

7. The digital video compositing system of claim 1, wherein determining that digital content corresponding to the composition has changed comprises determining that a time duration of a second layer of the composition has changed.

8. A method for automatic temporal adjustment of a digital composition, comprising:
   storing a set of temporal sculpting rules in association with a composition arranged according to a first temporal arrangement including a timeline and having a set of layers, wherein a project defines the composition, the set of layers of the composition are arranged according to the first temporal arrangement, and each layer is associated with corresponding digital content, and wherein the set of temporal sculpting rules includes a first temporal sculpting rule associated with a first layer of the composition, where the first temporal rule is a target rule establishing a link between the first layer and a target associated with the composition;
   determining that digital content corresponding to the composition has changed; and
   automatically adjusting the composition from the first temporal arrangement to a second temporal arrangement to conform with the first temporal sculpting rule without user involvement, wherein adjusting the temporal arrangement comprises modifying the project to temporally arrange the first layer within the composition based on the link between the first layer and target by preserving a set of properties of the first layer during a first time period corresponding to the target based on the link between the first layer and the target associated with the composition.

9. The method of claim 8, wherein modifying the project to temporally arrange the first layer within the composition based on the link between the first layer and target comprises modifying the set of properties of the first layer during a second time period that does not overlap with the first time period corresponding to the target based on the link between the first layer and the target associated with the composition.

10. The method of claim 8, wherein the target is one or more of a time stamp, a second layer, a user defined marker or a keyframe.

11. The method of claim 10, wherein the time stamp is defined with respect to the composition or the second layer.

12. The method of claim 10, wherein the keyframe is defined with respect to the second layer.

13. The method of claim 8, wherein the temporal sculpting instructions are integrated into the digital compositing platform system.

14. The method of claim 8, wherein determining that digital content corresponding to the composition has changed comprises determining that a time duration of a second layer of the composition has changed.

15. A non-transitory computer readable medium comprising instructions for automatic temporal adjustment of a digital composition, the instructions executable for:
   storing a set of temporal sculpting rules in association with a composition arranged according to a first temporal arrangement including a timeline and having a set of layers, wherein a project defines the composition, the set of layers of the composition are arranged according to the first temporal arrangement, and each layer is associated with corresponding digital content, and wherein the set of temporal sculpting rules includes a first temporal sculpting rule associated with a first layer of the composition, where the first temporal rule is a target rule establishing a link between the first layer and a target associated with the composition;
   determining that digital content corresponding to the composition has changed; and
   automatically adjusting the composition from the first temporal arrangement to a second temporal arrangement to conform with the first temporal sculpting rule without user involvement, wherein adjusting the temporal arrangement comprises modifying the project to temporally arrange the first layer within the composition based on the link between the first layer and target by preserving a set of properties of the first layer during a first time period corresponding to the target based on the link between the first layer and the target associated with the composition.

16. The non-transitory computer readable medium of claim 15, wherein modifying the project to temporally arrange the first layer within the composition based on the link between the first layer and target comprises modifying the set of properties of the first layer during a second time period that does not overlap with the first time period corresponding to the target based on the link between the first layer and the target associated with the composition.

17. The non-transitory computer readable medium of claim 15, wherein the target is one or more of a time stamp, a second layer, a user defined marker or a keyframe.

18. The non-transitory computer readable medium of claim 17, wherein the time stamp is defined with respect to the composition or the second layer.

19. The non-transitory computer readable medium of claim 17, wherein the keyframe is defined with respect to the second layer.

20. The non-transitory computer readable medium of claim 15, wherein the temporal sculpting instructions are integrated into the digital compositing platform system.

21. The non-transitory computer readable medium of claim 15, wherein determining that digital content corresponding to the composition has changed comprises determining that a time duration of a second layer of the composition has changed.

* * * * *